US011906712B2

(12) United States Patent
Togino

(10) Patent No.: US 11,906,712 B2
(45) Date of Patent: Feb. 20, 2024

(54) WIDE-ANGLE OPTICAL SYSTEM, IMAGE PICKUP APPARATUS, AND IMAGE PICKUP SYSTEM

(71) Applicant: OLYMPUS CORPORATION, Tokyo (JP)

(72) Inventor: Takayoshi Togino, Koganei (JP)

(73) Assignee: OLYMPUS CORPORATION, Tokyo (JP)

( * ) Notice: Subject to any disclaimer, the term of this patent is extended or adjusted under 35 U.S.C. 154(b) by 115 days.

(21) Appl. No.: 17/517,071

(22) Filed: Nov. 2, 2021

(65) Prior Publication Data

US 2022/0057611 A1 Feb. 24, 2022

Related U.S. Application Data

(63) Continuation of application No. PCT/JP2019/018643, filed on May 9, 2019.

(51) Int. Cl.
*G02B 13/06* (2006.01)
*H04N 13/207* (2018.01)
*G02B 17/08* (2006.01)

(52) U.S. Cl.
CPC ......... *G02B 13/06* (2013.01); *G02B 17/0856* (2013.01); *H04N 13/207* (2018.05)

(58) Field of Classification Search
CPC .. G02B 13/006; G02B 13/0065; G02B 13/06; G02B 17/0856; G02B 30/20;
(Continued)

(56) References Cited

U.S. PATENT DOCUMENTS 7,538,956 B2 5/2009 Toyoda et al.
9,101,279 B2 8/2015 Ritchey et al.
(Continued)

FOREIGN PATENT DOCUMENTS

JP S61-98316 A 5/1986
JP H03-047737 B2 7/1991
(Continued)

OTHER PUBLICATIONS

International Search Report and Written Opinion of the International Searching Authority dated Jul. 30, 2019 received in PCT/JP2019/018643.
(Continued)

*Primary Examiner* — Behrooz M Senfi
(74) *Attorney, Agent, or Firm* — Scully, Scott, Murphy & Presser, P.C.

(57) ABSTRACT

A wide-angle optical system includes a pair of front side lens units, an optical member, and a pair of rear side lens units. Each of the pair of front side lens units has a negative refractive power. The optical member has a pair of inclined surfaces and a bottom surface, and the pair of inclined surfaces is disposed such that a line of intersection is formed on an object side. Each of the pair of rear side lens units includes a positive lens, and in the pair of rear side lens units, two axes of rotational symmetry are parallel. With respect to two light rays, intersection and reflection occur at the optical member, and the intersection and the reflection occur after the two light rays are transmitted through the pair of inclined surfaces and before two light rays are transmitted through the bottom surface.

20 Claims, 43 Drawing Sheets

(58) Field of Classification Search
CPC .. H04N 13/207; H04N 13/218; H04N 13/239; H04N 13/243; H04N 13/282; H04N 23/698
USPC .......................................................... 348/49
See application file for complete search history.

(56) References Cited

U.S. PATENT DOCUMENTS

| | | | | |
|---|---|---|---|---|
| 9,344,612 | B2 | 5/2016 | Ritchey et al. | |
| 9,451,899 | B2 | 9/2016 | Ritchey et al. | |
| 10,274,717 | B2 | 4/2019 | Togino | |
| 10,447,966 | B2 | 10/2019 | Ritchey et al. | |
| 11,055,356 | B2 | 7/2021 | Ritchey et al. | |
| 2010/0045773 | A1 | 2/2010 | Ritchey | |
| 2017/0235132 | A1 * | 8/2017 | Mizusawa | G02B 15/143507 359/754 |
| 2017/0351086 | A1 * | 12/2017 | Takahashi | A61B 1/00101 |
| 2020/0150415 | A1 * | 5/2020 | Uchida | H04N 13/207 |
| 2022/0236553 | A1 * | 7/2022 | Baba | A61B 1/00163 |

FOREIGN PATENT DOCUMENTS

| | | | | |
|---|---|---|---|---|
| JP | H9-288240 | A | 11/1997 | |
| JP | 2000-089301 | A | 3/2000 | |
| JP | 3542167 | B2 | 7/2004 | |
| JP | 3566100 | B2 | 9/2004 | |
| JP | 2007-288569 | A | 11/2007 | |
| JP | 2011-017824 | A | 1/2011 | |
| JP | 2014-174390 | A | 9/2014 | |
| JP | 6280749 | B2 | 2/2018 | |
| WO | 2017/110351 | A1 | 6/2017 | |
| WO | WO-2019064515 | A1 * | 4/2019 | A61B 1/00193 |

OTHER PUBLICATIONS

International Preliminary Report on Patentability dated Nov. 18, 2021 received in PCT/JP2019/018643.

* cited by examiner

X DIRECTION

Y DIRECTION

X DIRECTION

Y DIRECTION

X DIRECTION

Y DIRECTION

X DIRECTION

Y DIRECTION

X DIRECTION

Y DIRECTION

X DIRECTION

Y DIRECTION

WIDE-ANGLE OPTICAL SYSTEM, IMAGE PICKUP APPARATUS, AND IMAGE PICKUP SYSTEM

CROSS-REFERENCE TO RELATED APPLICATION

The present application is a continuation application of International Application No. PCT/JP2019/018643 filed on May 9, 2019, the entire contents of which are incorporated herein by reference.

BACKGROUND

Technical Field

The present disclosure relates to a wide-angle optical system, an image pickup apparatus, and an image pickup system.

Description of the Related Art

As an optical system having a wide angle of view, an optical system of an endoscope or an optical system of a monitoring camera has been known. In these optical systems, a prism is disposed in the optical system. A conversion of a visual-field direction is carried out by the prism.

In Japanese Patent Publication after Examination Hei 3-47737, an optical system which includes a prism and an objective lens has been disclosed. Light is incident on the optical system from a rightward direction and a leftward direction. Light incident from the rightward direction and light incident from the leftward direction intersect inside the prism. Two optical images are formed on an image plane by the optical system.

In Japanese Patent No. 3542167 Publication, a fundus camera which includes an image forming optical system, an image sensor, and an observation optical system has been disclosed. The image forming optical system includes one objective lens, a pair of prisms, a pair of relay lenses, a pair of focusing lenses, a pair of image forming lenses, a pair of matching prisms, a declination prism, and a second image forming lens. Two optical images are formed on an image plane by the image forming optical system.

In Japanese Patent No. 3566100 Publication, a camera which includes a prism and an imaging lens has been disclosed. Light is incident on the camera from a rightward direction, a leftward direction, and a downward direction. Light incident from the rightward direction and light incident from the leftward direction intersect inside the prism. Three optical images are formed on an image plane by an optical system.

In Japanese Patent Application Laid-open Publication No. Sho 61-98316, an oblique-viewing optical system has been disclosed. The oblique-viewing optical system includes a negative lens and a field conversion prism. One optical image is formed on an image plane by the optical system.

In Japanese Patent Application Laid-open Publication No. Hei 9-288240, a visual-field direction conversion optical system has been disclosed. The visual-field direction conversion optical system includes a negative lens unit and a stabilizing optical element. One optical image is formed on an image plane by the optical system.

In Japanese Patent No. 6280749 Publication, an optical system for stereoscopic vision has been disclosed. The optical system includes a pair of front units and one rear unit. Two optical images are formed on an image plane by the optical system.

SUMMARY

A wide-angle optical system according to at least some embodiments of the present disclosure includes at least a pair of front side lens units, an optical member, and at least a pair of rear side lens units, wherein each of the pair of first lens units has a negative refractive power, the optical member has at least a pair of inclined surfaces and a bottom surface, the pair of inclined surfaces is disposed such that a line of intersection is formed on an object side, each of the pair of rear side lens units includes at least one positive lens, the positive lens is positioned on an axis of rotational symmetry of the rear side lens unit, in the pair of rear side lens units, two axes of rotational symmetry are parallel, the wide-angle optical system has at least two optical paths, in the two optical paths, each of two light rays is transmitted through a different front side lens unit, then transmitted through a different inclined surface, then transmitted through the bottom surface, then transmitted through a different rear side lens unit, and reaches an image plane, intersection of the two light rays and reflection of the two light rays occur at the optical member, and the intersection and the reflection occur after the two light rays are transmitted through the pair of inclined surfaces and before the two light rays are transmitted through the bottom surface.

Moreover, an image pickup apparatus according to at least some embodiments of the present disclosure includes the abovementioned wide-angle optical system, and an image sensor.

Furthermore, an image pickup system according to at least some embodiments of the present disclosure includes the abovementioned image pickup apparatus, a processing apparatus, and a display apparatus.

DETAILED DESCRIPTION

Figure 1:
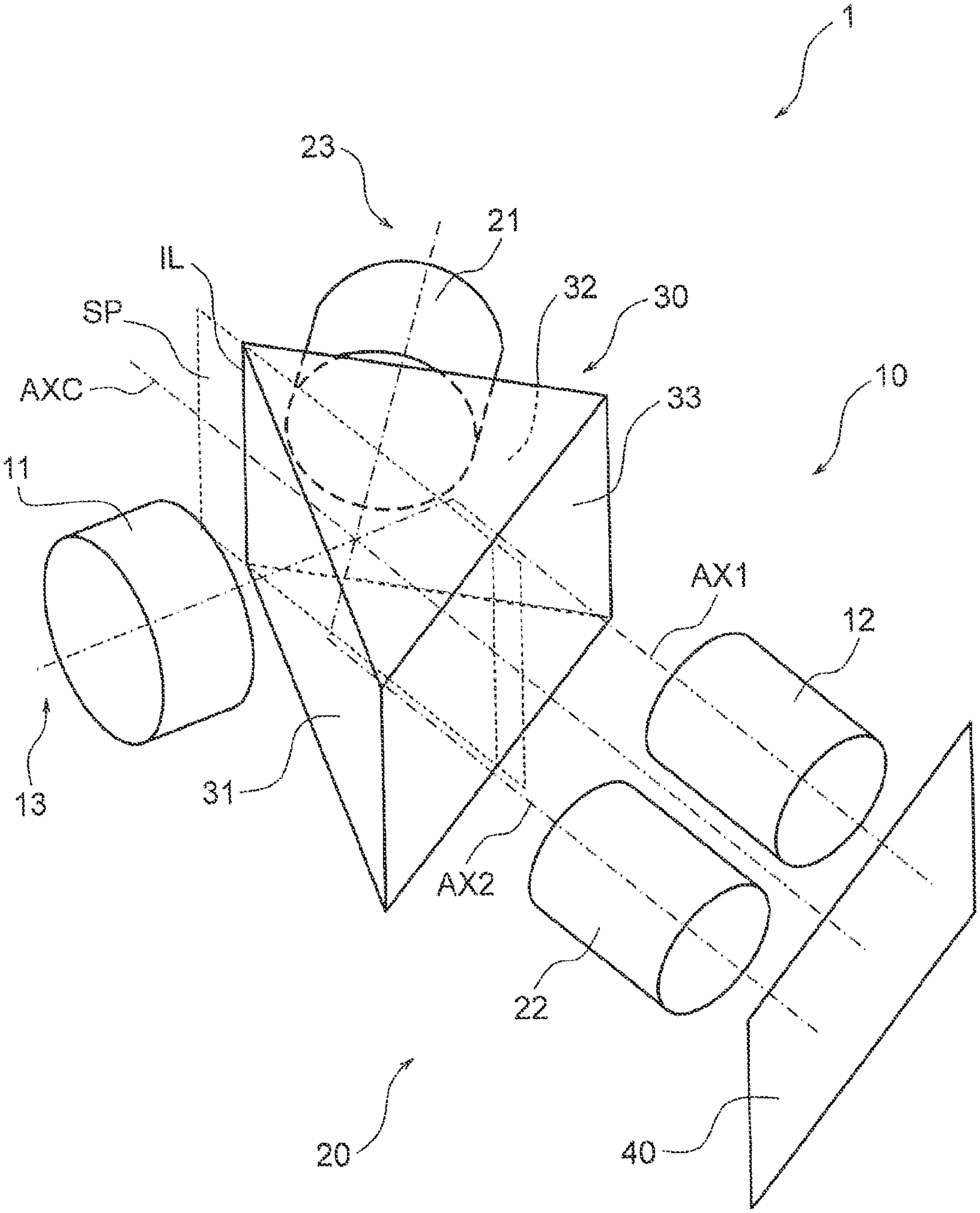
FIG. 1 is a schematic view of a wide-angle optical system of the present embodiment.

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

A wide-angle optical system of the present embodiment includes at least a pair of front side lens units, an optical member, and at least a pair of rear side lens units. Each of the pair of front side lens units has a negative refractive power, and the optical member has at least a pair of inclined surfaces and a bottom surface. The pair of inclined surfaces is disposed such that a line of intersection is formed on the object side. Each of the pair of rear side lens units includes at least one positive lens, and the positive lens is positioned on an axis of rotational symmetry of the rear side lens unit. In the pair of rear side lens units, two axes of rotational symmetry are parallel. The wide-angle optical system has at least two optical paths. In the two optical paths, each of two light rays is transmitted through a different front side lens unit, then transmitted through a different inclined surface, then transmitted through the bottom surface, then transmitted through a different rear side lens unit, and reaches an image plane. Intersection of the two light rays and reflection of the two light rays occur at the optical member, and the intersection and the reflection occur after the two light rays are transmitted through the pair of inclined surfaces and before the two light rays are transmitted through the bottom surface.

The wide-angle optical system of the present embodiment includes at least the pair of front side lens units, the optical member, and at least the pair of rear side lens units. Each of the pair of front side lens units has a negative refractive power. Accordingly, it is possible to achieve a wide field of view. Moreover, each of the pair of rear side lens units includes at least one positive lens. Accordingly, it is possible to correct various aberrations favorably.

The wide-angle optical system of the present embodiment has at least two optical paths, and in the two optical paths, intersection of the two light rays and reflection of the two light rays occur. Moreover, the intersection and the reflection occur after the two light rays are transmitted through the pair of inclined surfaces and before the two light rays are transmitted through the bottom surface. Accordingly, it is possible to reduce a size of the optical system.

One light ray of the two light rays is a light ray which travels along one optical path of the two optical paths. The other light ray of the two light rays is a light ray which travels along the other optical path of the two optical paths. The two light rays are two principal light rays or two axial light rays for instance. An axial light ray is light emerged from an object point on an optical axis, and travelling along the optical axis.

In the wide-angle optical system of the present embodiment, it is preferable that the reflection of one light ray of the two light rays occur at the inclined surface through which the other light ray is transmitted, and the reflection of the other light ray of the two light rays occur at the inclined surface through which the one of the two light rays is transmitted.

Figure 2A:
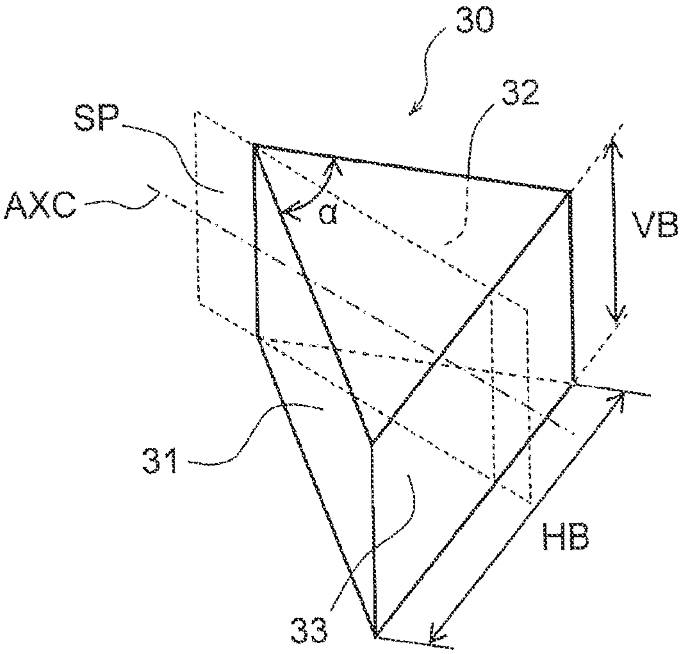
FIG. 2A and FIG. 2B are diagrams showing an optical member of a first example.
Figure 2B:
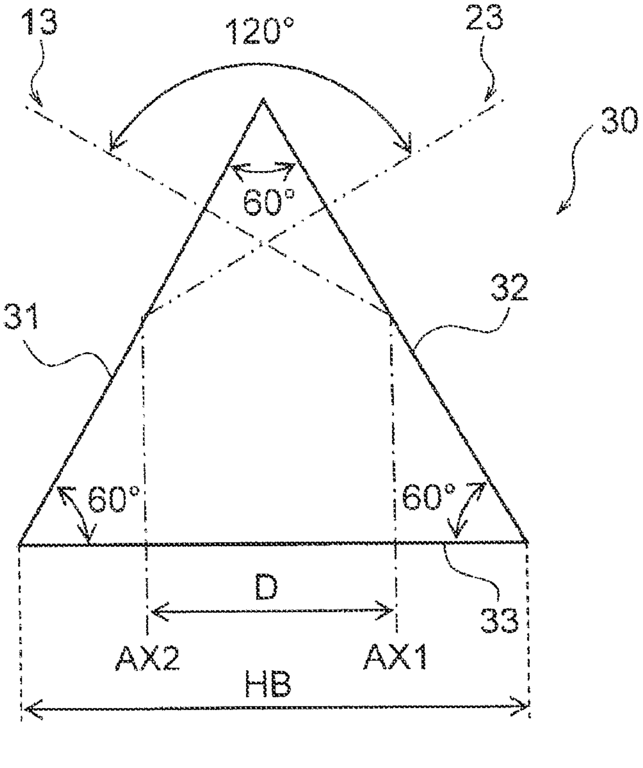

FIG. 1 is a schematic diagram of the wide-angle optical system of the present embodiment. FIG. 2A and FIG. 2B are diagrams showing an optical member of a first example. FIG. 2A is a perspective view and FIG. 2B is a plan view.

A wide-angle optical system 1 includes a first optical system 10, a second optical system 20, and an optical member 30.

The first optical system 10 includes a first front side lens unit 11 and a first rear side lens unit 12. The first front side lens unit 11 has a negative refractive power. The first rear side lens unit 12 includes at least one positive lens.

The second optical system 20 includes a second front side lens unit 21 and a second rear side lens unit 22. An optical system same as for the first front side lens unit 11 is used for the second front side lens unit 21. An optical system same as for the first rear side lens unit 12 is used for the second rear side lens unit 22.

As just described, the wide-angle optical system includes at least a pair of front side lens units, an optical member, and at least a pair of rear side lens units. Each of the pair of front side lens units has a negative refractive power. Each of the pair of rear side lens units includes at least one positive lens.

The wide-angle optical system 1 has a first optical path 13 and a second optical path 23. On an image side of the optical member 30, an axis of rotational symmetry AX1 is located in the first optical path 13 and an axis of rotational symmetry AX2 is located in the second optical path 23.

A central axis AXC is located between the axis of rotational symmetry AX1 and the axis of rotational symmetry AX2. The central axis AXC intersects an intersection line IL. A predetermined plane SP is a plane which includes the central axis AXC.

The predetermined plane SP, the central axis AXC, the intersection line IL, the axis of rotational symmetry AX1, and the axis of rotational symmetry AX2 will be described later.

The optical member 30 is formed of a medium having a refractive index larger than 1, and has a plurality of optical surfaces. The plurality of optical surfaces includes a first object-side surface 31, a second object-side surface 32, and an image-side surface 33. The image-side surface 33 is positioned nearest to an image.

As shown in FIG. 2A, a shape of the optical member 30 is a triangular prism shape. The triangular prism has an upper surface, a lower surface, and three side surfaces. The three side surfaces are located between the upper surface and the lower surface. A shape of the upper surface and a shape of the lower surface is a triangular shape. A shape of the three side surfaces is rectangular.

The first object-side surface 31, the second object-side surface 32, and the image-side surface 33 correspond to the three side surfaces. When the image-side surface 33 is deemed as a bottom surface, an inclined surface is formed on both sides of the bottom surface by the first object-side surface 31 and the second object-side surface 32. As just described, the optical member 30 has at least a pair of inclined surfaces, and a bottom surface.

In FIG. 2A, an angle α, a length HB, and a length VB are indicated. The angle α is an angle made by the first object-side surface 31 and the second object-side surface 32. The first object-side surface 31 and the second object-side surface 32 form the pair of inclined surfaces. Accordingly, the angle α is an angle made by the pair of inclined surfaces.

The length HB is a length in a transverse direction of the image-side surface 33. The length VB is a length in a longitudinal direction of the image-side surface 33. The image-side surface 33 being the bottom surface, the length HB is a length in the transverse direction of the bottom surface, and the length VB is a length in the longitudinal direction of the bottom surface.

A distance D is indicated in FIG. 2B. The distance D is a distance between the two axes of rotational symmetry, or in other words, a distance between the axis of rotational symmetry AX1 and the axis of rotational symmetry AX2.

As it is evident from FIG. 2B, the transverse direction is a direction orthogonal to both the axis of rotational symmetry AX1 and the axis of rotational symmetry AX2. As it is evident from FIG. 2A, the longitudinal direction is a direction orthogonal to the transverse direction.

In the optical member 30, a shape of the upper surface and a shape of the lower surface is an equilateral triangular shape. Accordingly, the angle α is 60°. Moreover, an angle made by the first object-side surface 31 and the image-side surface 33 is also 60°, and an angle made by the second object-side surface 32 and the image-side surface 33 is also 60°.

The first optical path 13 is orthogonal to the first object-side surface 31. The second optical path 23 is orthogonal to the second object-side surface 32. The angle α being 60°, an angle made the first optical path 13 and the second optical path 23 on the object side (hereinafter, referred to as 'predetermined angle') is 120°.

The predetermined angle being 120°, the first optical path 13 and the second optical path 23 intersect at an interior of the optical member 30. Moreover, at least a part of a field of view in the first optical path 13 differs from a part of a field of view in the second optical path 23.

The description will be continued returning back to FIG. 1. Light travelling along the first optical path 13 (hereinafter, referred to as 'first image forming light'), light travelling along the second optical path 23 (hereinafter, referred to as 'second image forming light') are incident on the first object-side surface 31. The first image forming light is incident on the first object-side surface 31 from an outer side of the optical member 30, and is transmitted through the first object-side surface 31. The second image forming light is incident on the first object-side surface 31 from an inner side of the optical member 30, and is totally reflected at the first object-side surface 31.

The second image forming light and the first image forming light are incident on the second object-side surface 32. The second image forming light is incident on the second object-side surface 32 from the outer side of the optical member 30, and is transmitted through the second object-side surface 32. The first image forming light is incident on the second object-side surface 32 from the inner side of the optical member 30, and is totally reflected at the second object-side surface 32.

At the first object-side surface 31, the first image forming light is transmitted through, and the second image forming light is reflected. Accordingly, reflection of the second image forming light occurs at the first object-side surface 31 through which the first image forming light is transmitted. At the second object-side surface 32, the second image forming light is transmitted through, and the first image forming light is reflected. Accordingly, reflection of the first image forming light occurs at the second object-side surface 32 through which the second image forming light is transmitted.

As just described, the transmission of the light and the reflection of the light occur at the first object-side surface 31 and the second object-side surface 32. Accordingly, each of the first object-side surface 31 and the second object-side surface 32 has a transmission effect and a reflection effect.

Both the first image forming light and the second image forming light are incident on the image-side surface 33. The first image forming light and the second image forming light are both transmitted through the image-side surface 33. Accordingly, the image-side surface 33 has the transmission effect.

As mentioned above, the pair of inclined surfaces is formed by the first object-side surface 31 and the second object-side surface 32. Moreover, the image-side surface 33 is the bottom surface which is in contact with the pair of inclined surfaces. Accordingly, in the optical member 30, each of the pair of inclined surfaces has the transmission effect and the reflection effect. The bottom surface has the transmission effect.

In the optical member 30, the inclined surface through which the light is transmitted and the inclined surface at which the light is reflected, are different. Each of the first image forming light and the second image forming light is transmitted through a different inclined surface. Subsequently, each of the first image forming light and the second image forming light is reflected at the inclined surface different from the inclined surface through which the light was transmitted. Moreover, the first image forming light and the second image forming light are transmitted through the bottom surface, and emerge from the optical member 30.

In the optical member 30, the intersection of the first image forming light and the second image forming light occurs once. Moreover, the reflection of the first image forming light and the reflection of the second image forming light occur once for each light. The intersection of the first image forming light and the second image forming light, the reflection of the first image forming light, and the reflection of the second image forming light occur after the first image forming light and the second image forming light are transmitted through the pair of inclined surfaces and before the first image forming light and the second image forming light are transmitted through the bottom surface.

The first object-side surface 31 and the second object-side surface are face-to-face. A distance between the first object-side surface 31 and the second object-side surface 32 becomes narrow as moving away from the image-side surface 33. The intersection line IL is formed by the first object-side surface 31 and the second object-side surface 32.

With the image-side surface 33 in between, the first object-side surface 31 and the second object-side surface 32 are located on one side, and the first rear side lens unit 12 and the second rear side lens unit 22 are located on the other side. As it will be described later, the first rear side lens unit 12 and the second rear side lens unit 22 are disposed on an image side of the image-side surface 33. Therefore, the intersection line IL is located not on the image side of the image-side surface 33, but on the object side of the image-side surface 33.

As just described, in the wide-angle optical system 1, the pair of inclined surfaces is disposed such that the intersection line IL is formed on the object side.

On the image side of the image-side surface 33, the first rear side lens unit 12 is disposed in the first optical path 13, and the second rear side lens unit 22 is disposed in the second optical path 23. The first rear side lens unit 12 being a rotationally symmetric optical system, has the axis of rotational symmetry AX1. The second rear side lens unit 22 being a rotationally symmetric optical system, has the axis of rotational symmetry AX2.

As mentioned above, the first rear side lens unit 12 includes at least one positive lens. Accordingly, in the first rear side lens unit 12, the positive lens is positioned on the axis of rotational symmetry AX1. The second rear side lens unit 22 has at least one positive lens. Accordingly, in the second rear side lens unit 22, the positive lens is positioned on the axis of rotational symmetry AX2.

A pair of aperture stops may be disposed on the image side of the image-side surface 33. In this case, one aperture stop is to be positioned on the axis of rotational symmetry AX1, and the other aperture stop is to be positioned on the axis of rotational symmetry AX2.

On the image side of the image-side surface 33, the first optical path 13 and the second optical path 23 being parallel, the first rear side lens unit 12 and the second rear side lens unit 22 are disposed in parallel. Accordingly, the axis of rotational symmetry AX1 and the axis of rotational symmetry AX2 are parallel.

As just described, in the rear side lens unit, the positive lens is positioned on the axis of rotational symmetry of the rear side lens unit, and in the pair of rear side lens units, the two axes of rotational symmetry are parallel.

In the first optical path 13, the first front side lens unit 11, the first object-side surface 31, the second object-side surface 32, the image-side surface 33, and the first rear side lens unit 12 are positioned in order from the object side. In the second optical path 23, the second front side lens unit 21, the second object-side surface 32, the first object-side surface 31, the image-side surface 33, and the second rear side lens unit 22 are positioned in order from the object side.

Both the first image forming light and the second image forming light reach an image plane 40. A first optical image is formed by the first optical system 10, and a second optical image is formed by the second optical system 20. As mentioned above, on the image side of the image-side surface 33, the first optical path 13 and the second optical path 23 are parallel. Accordingly, the first optical image and the second optical image are formed in parallel.

As just described, the wide-angle optical system 1 has at least two optical paths. In the two optical paths, each light ray is transmitted through a different front side lens unit, then transmitted through a different inclined surface, then intersects inside the optical member, then reflected at the inclined surface which is facing, then transmitted through the bottom surface, then transmitted through a different rear side lens unit, and reaches the image plane 40.

The field of view in the first optical path 13 is a field of view in the first optical system 10. The field of view in the second optical path 23 is a field of view in the second optical system 20. As mentioned above, the field of view in the first optical path 13 differs from the field of view in the second optical path 23. Accordingly, the field of view in the first optical system 10 also differs from the field of view in the second optical system 20. The field of view being different in the two optical paths, the first optical image differs from the second optical image.

The first image forming light and the second image forming light are reflected at an interior of the optical member 30. Therefore, in the wide-angle optical system 1, both the first optical image and the second optical image are mirror images. In the first optical image and the second optical image, an inversion in a horizontal direction occurs.

It is possible to undo the inversion in the horizontal direction by image processing. For carrying out the image processing, an image is to be generated from the optical image by using an image sensor. By carrying out an inversion processing on the generated image, it is possible to achieve an image with no horizontal inversion occurred.

The field of view in the first optical system 10 and the field of view in the second optical system 20 may overlap partly. In this case, by using the overlapped portion, it is possible to carry out image processing (stitching) in which images are stitched.

The wide-angle optical system of the present embodiment has at least two optical paths, and in the two optical paths, an intersection of two light rays occurs once, and a reflection of the two light rays occurs once. Moreover, the intersection and the reflection occur after the two light rays are transmitted through the pair of inclined surfaces and before the two light rays are transmitted through the bottom surface. Accordingly, it is possible to reduce the size of the optical system.

In the first optical system 10, the first front side lens unit 11 has a negative refractive power. In the second optical system 20, an optical system same as that for the first front side lens unit 11 is used for the second front side lens unit 21. Therefore, in the second optical system 20, the second front side lens unit 21 has a negative refractive power. Accordingly, it is possible to achieve a wide field of view in each of the first optical system 10 and the second optical system 20.

Each of the first optical system 10 and the second optical system 20 includes two lens units. Accordingly, it is possible to correct various aberrations favorably.

The field of view in the first optical system 10 and the field of view in the second optical system 20 may differ totally or may overlap partly. In any of the cases, it is possible to achieve a wide field of view by the field of view in the first optical system 10 and the field of view in the second optical system 20.

As just described, in the wide-angle optical system of the present embodiment, while the size is small, it is possible to achieve a wide field of view in which an aberration is corrected favorably. Therefore, it is possible to use the wide-angle optical system of the present embodiment for an optical system of an endoscope.

As a method for achieving the wide field of view, a method using a plurality of optical systems has been known. In this method, lenses and an optical member not being shared among the plurality of optical systems, an overall size becomes large. Therefore, it is difficult to use this method for an optical system of an endoscope.

In the wide-angle optical system of the present embodiment, the optical member is shared among the plurality of optical systems. In other words, a pair of optical paths is formed inside the optical member, and moreover, the pair of optical paths intersect inside the optical member. In the wide-angle optical system of the present embodiment, since it is possible to reduce the size of the optical system, it is possible to use the wide-angle optical system of the present embodiment for an optical system of an endoscope.

Figure 3:
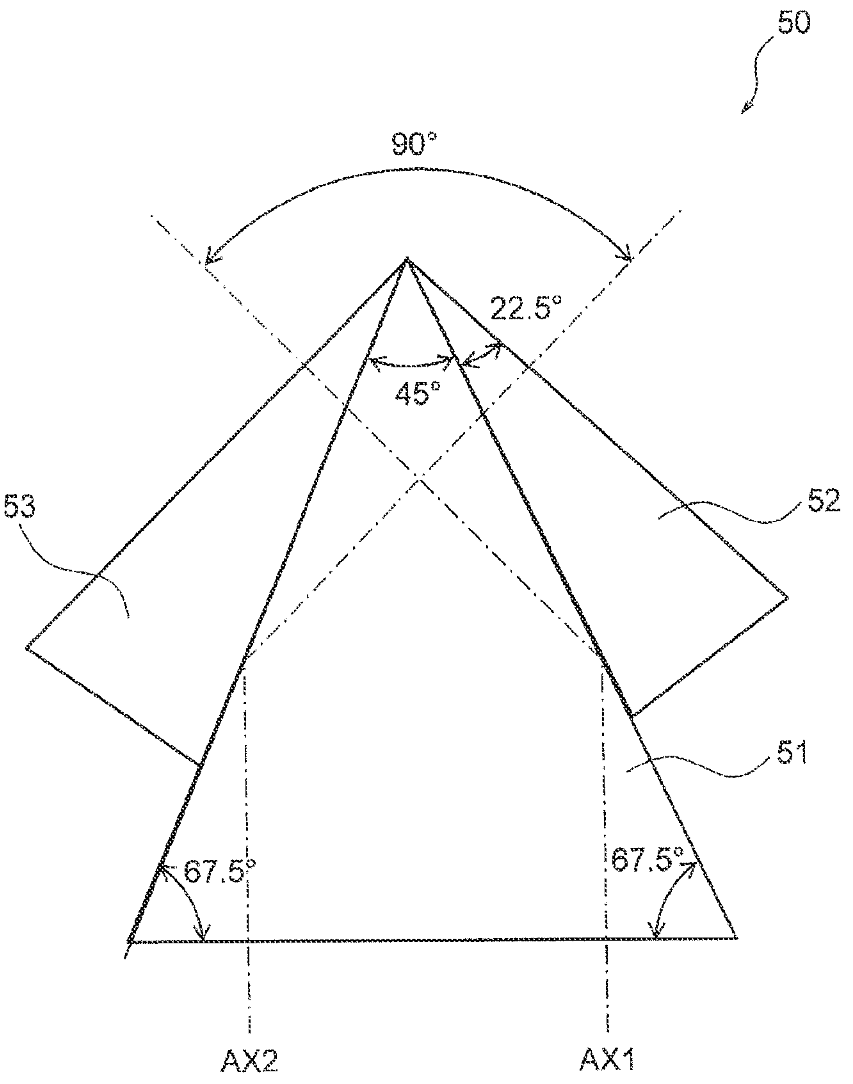
FIG. 3 is a diagram showing another example of the optical member.

FIG. 3 is a diagram showing another example of the optical member. An optical member 50 includes a first triangular prism 51, a second triangular prism 52, and a third triangular prism 53.

In the first triangular prism 51, the angle α is 45°. Moreover, the angle made by the first object-side surface 31 and the image-side surface 33 is 67.5° and an angle made by the second object-side surface 32 and the image-side surface 33 is 67.5°. In the second triangular prism 52 and the third triangular prism 53, the angle α is 22.5°. The predetermined angle is 90°. Even in this case, the first optical path 13 and the second optical path 23 intersect at the interior of the optical member 50.

Figure 4:
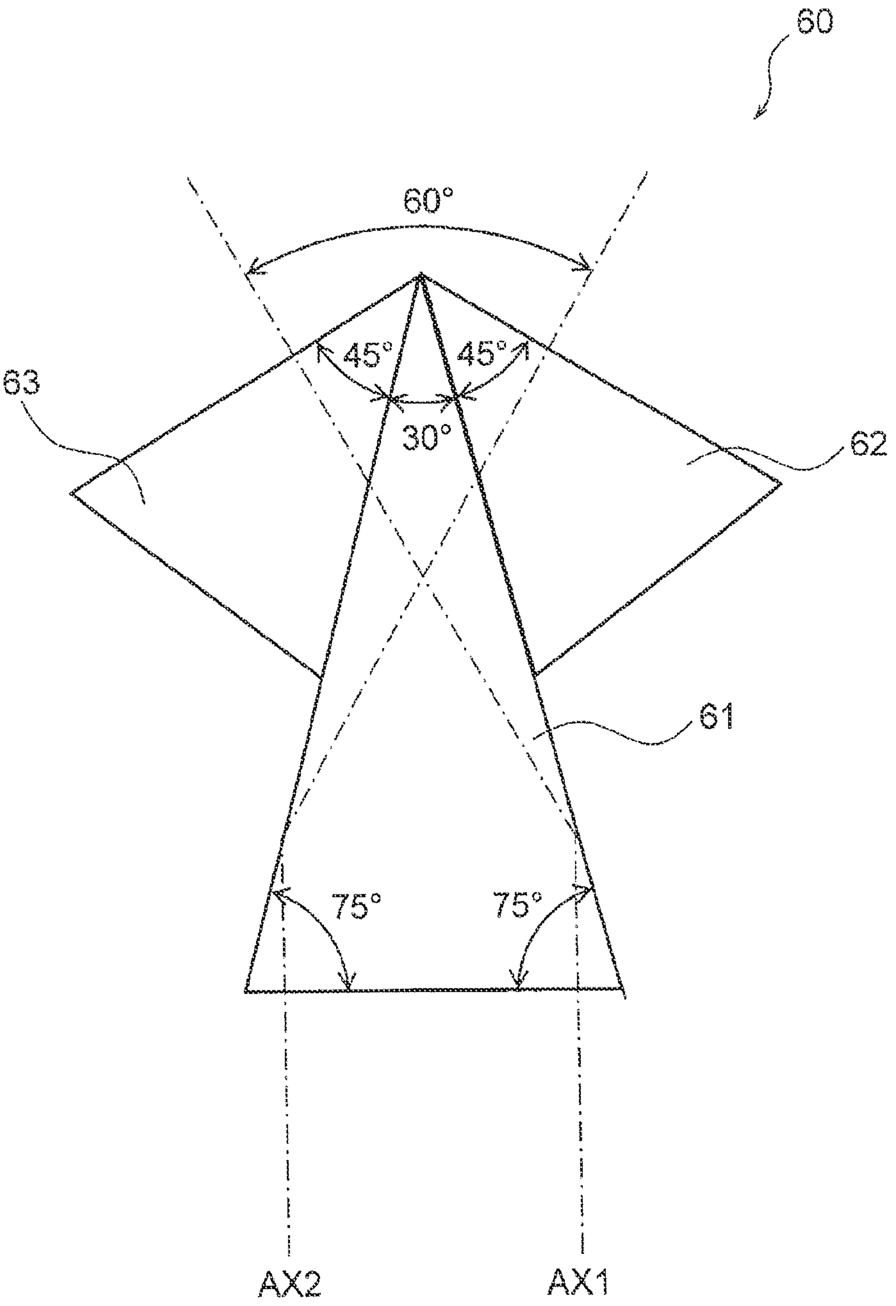
FIG. 4 is a diagram showing still another example of the optical member.

FIG. 4 is a diagram showing still another example of the optical member. An optical member 60 includes a first triangular prism 61, a second triangular prism 62, and a third triangular prism 63.

In the first triangular prism 61, the angle α is 30°. Moreover, the angle made by the first object-side surface 31 and the image-side surface 33 is 75°, and the angle made by the second object-side surface 32 and the image-side surface 33 is 75°. In the second triangular prism 62 and the third triangular prism 63, the angle α is 45°. The predetermined angle is 60°. Even in this case, the first optical path 13 and the second optical path 23 intersect at the interior of the optical member 60.

In the wide-angle optical system of the present embodiment, it is preferable that the optical member have a pair of intermediate surfaces, reflection of one light ray occur at one intermediate surface in the pair of intermediate surfaces, and reflection of the other light ray occur at the other intermediate surface in the pair of intermediate surfaces. Moreover, it is preferable that reflection of the one light ray occur at the one intermediate surface, before the reflection of the light ray occurs at the inclined surface through which the other light ray is transmitted, and reflection of the other light ray occur at the other intermediate surface, before the reflection of the other light ray occurs at the inclined surface through which the one light ray is transmitted.

Figure 5:
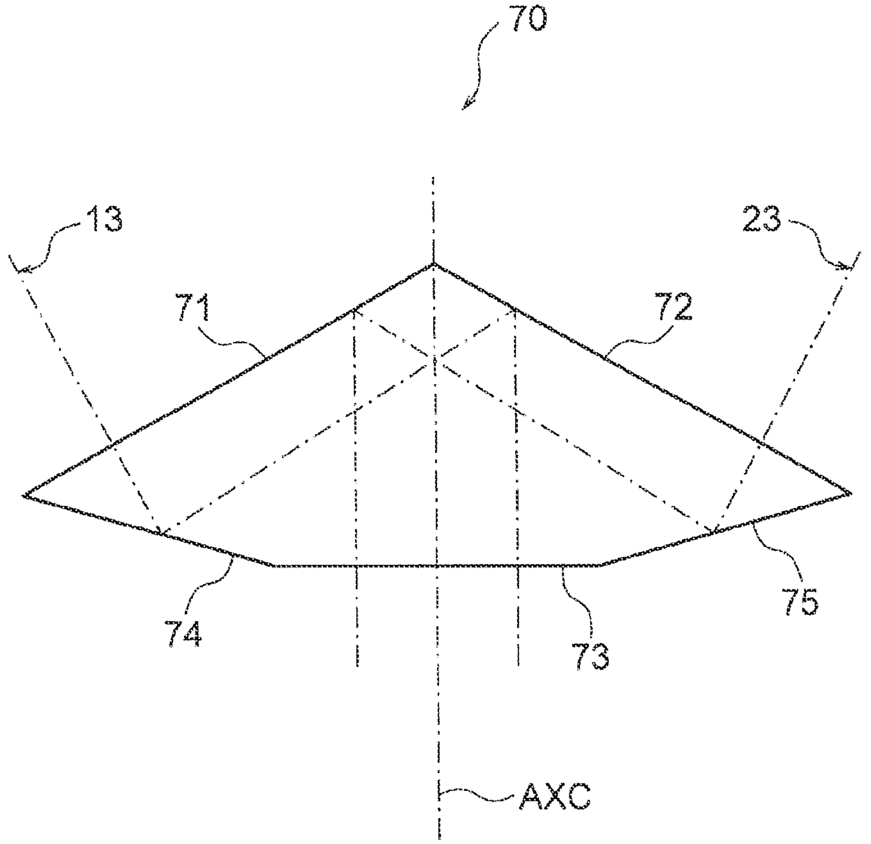
FIG. 5 is a diagram sowing an optical member of a second example.

FIG. 5 is a diagram showing an optical member of a second example. An optical member 70 includes a first object-side surface 71, a second object-side surface 72, and an image-side surface 73. When the image-side surface 73 is deemed as the bottom surface, an inclined surface is formed on both sides of the bottom surface by the first object-side surface 71 and the second object-side surface 72. As just described, the optical member 70 has at least a pair of inclined surfaces and the bottom surface.

The optical member 70 further has a pair of intermediate surfaces. The pair of intermediate surfaces includes a first intermediate surface 74 and a second intermediate surface 75.

In a direction along the central axis AXC, the pair of intermediate surfaces is located between the pair of inclined surfaces and the bottom surface. In a direction orthogonal to the central axis AXC, the pair of intermediate surfaces is located to have the bottom surface in between.

The first object-side surface 71 is in contact with one end of the first intermediate surface 74. The image-side surface 73 is in contact with the other end of the first intermediate surface 74. The second object-side surface 72 is in contact with one end of the second intermediate surface 75. The image-side surface 73 is in contact with the other end of the second intermediate surface 75.

The first image forming light is transmitted through the first object-side surface 71, and reaches the first intermediate surface 74. Reflection of the first image forming light occurs at the first intermediate surface 74. The first image forming light reflected at the first intermediate surface 74 reaches the second object-side surface 72. Reflection of the first image forming light occurs at the second object-side surface 72.

The first image forming light reflected at the second object-side surface 72 reaches the image-side surface 73. The first image forming light is transmitted through the image-side surface 73.

The second image forming light is transmitted through the second object-side surface 72 and reaches the second intermediate surface 75. Reflection of the second image forming light occurs at the second intermediate surface 75. The second image forming light reflected at the second intermediate surface 75 reaches the first object-side surface 71. Reflection of the second image forming light occurs at the first object-side surface 71. The second image forming light reflected at the first object-side surface 71 reaches the image-side surface 73. The second image forming light is transmitted through the image-side surface 73.

Intersection of the first image forming light and the second image forming light occurs once in the optical member 30. Moreover, reflection of the first image forming light and reflection of the second image forming light occur twice for each light. The intersection of the first image forming light and the second image forming light, the reflection of the first image forming light, and the reflection of the second image forming light occur after the first image forming light and the second image forming light are transmitted through the pair of inclined surfaces and before the first image forming light and the second image forming light are transmitted through the bottom surface.

The reflection of the first image forming light occurs in order of reflection at the first intermediate surface 74 and reflection at the second object-side surface 72. Before the reflection of the first image forming light occurs at the second object-side surface 72, the reflection of the first image forming light occurs at the first intermediate surface 74. As mentioned above, the second object-side surface 72 is the inclined surface through which the second image forming light is transmitted. Accordingly, the reflection of the first image forming light occurs at the first intermediate surface 74 before the reflection of the first image forming light occurs at the inclined surface through which the second image forming light is transmitted.

The reflection of the second image forming light occurs in order of reflection at the second intermediate surface 75 and reflection at the first object-side surface 71. Before the reflection of the second image forming light occurs at the first object-side surface 71, the reflection of the second image forming light occurs at the second intermediate surface 75. As mentioned above, the first object-side surface 71 is the inclined surface through which the first image forming light is transmitted. Accordingly, the reflection of the second image forming light occurs at the second intermediate surface 75 before the reflection of the second image forming light occurs at the inclined surface through which the first image forming light is transmitted.

Intersection of the first image forming light and the second image forming light occurs three times in the optical member 70. Moreover, reflection of the first image forming light and reflection of the second image forming light occurs twice for each light. The intersection of the first image forming light and the second image forming light, the reflection of the first image forming light, and the reflection of the second image forming light occur after the first image forming light and the second image forming light are transmitted through the pair of inclined surfaces and before the first image forming light and the second image forming light are transmitted through the bottom surface.

The wide-angle optical system of the present embodiment has at least two optical paths, and in the two optical paths, intersection of two light rays occurs three times, and reflection of the two light rays occurs twice. Moreover, the intersection and the reflection occur after the two light rays are transmitted through the pair of inclined surfaces and before the two light rays are transmitted through the bottom surface. Accordingly, it is possible reduce the size of the optical system.

In the wide-angle optical system of the present embodiment, it is preferable that the optical member has a pair of intermediate surfaces, reflection of one light ray occur at one intermediate surface in the pair of intermediate surfaces, and reflection of the other light ray occur at the other intermediate surface in the pair of intermediate surfaces. Moreover, it is preferable that reflection of the one light ray occur at the bottom surface, before reflection of the one light ray occurs at the one intermediate surface, and reflection of the other light ray occur at the bottom surface, before reflection of the other light ray occurs at the other intermediate surface.

Figure 6:
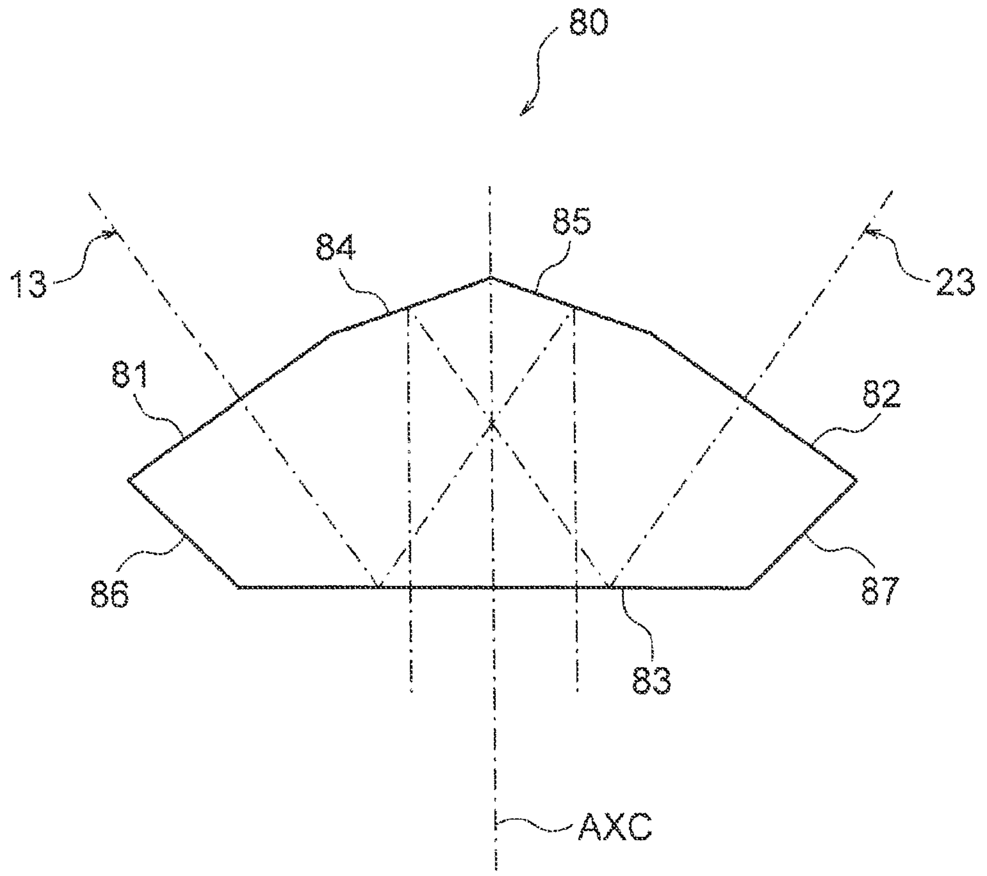
FIG. 6 is a diagram showing an optical member of a third example.

FIG. 6 is a diagram showing an optical member of the third example. An optical member 80 has a first object-side surface 81, a second object-side surface 82, and an image-side surface 83. When the image-side surface 83 is deemed as the bottom surface, an inclined surface is formed on both sides of the bottom surface by the first object-side surface 81 and the second object-side surface 82. As just described, the optical member 80 has at least a pair of inclined surfaces and a bottom surface.

The optical member 80 further has a pair of intermediate surfaces. The pair of intermediate surfaces includes a first intermediate surface 84 and a second intermediate surface 85.

In a direction along the central axis AXC, the pair of intermediate surfaces is located on an opposite side of the bottom surface, with the pair of inclined surfaces in between. In other words, the pair of intermediate surfaces is located on the object side of the pair of inclined surfaces. In a direction orthogonal to the central axis AXC, the pair of intermediate surfaces is located with the pair inclined surfaces in between the intermediate surfaces.

A pair of side surfaces is formed in the optical member 80. The pair of side surfaces includes a first side surface 86 and a second side surface 87. In a direction along the central axis AXC, the pair of side surfaces is located between the pair of inclined surfaces and the bottom surface. In a direction orthogonal to the central axis AXC, the pair of side surfaces is located to have the bottom surface in between. By forming the pair of side surfaces, it is possible to reduce a size of the optical member 80.

The first object-side surface 81 is in contact with one end of the first intermediate surface 84. The second intermediate surface 85 is in contact with the other end of the first intermediate surface 84. The second object-side surface 82 is in contact with one end of the second intermediate surface 85. The first intermediate surface 84 is in contact with the other end of the second intermediate surface 85.

First image forming light is transmitted through the first object-side surface 81, and reaches the image-side surface 83. Reflection of the first image forming light occurs at the image-side surface 83. The first image forming light reflected at the image-side surface 83 reaches the second intermediate surface 85. Reflection of the first image forming light occurs at the second intermediate surface 85. The first image forming light reflected at the second intermediate surface 85 reaches the image-side surface 83. The first image forming light is transmitted through the image-side surface 83.

The second image forming light is transmitted through the second object-side surface 82, and reaches the image-side surface 83. Reflection of the second image forming light occurs at the image-side surface 83. The second image forming light reflected at the image-side surface 83 reaches the first intermediate surface 84. Reflection of the second image forming light occurs at the first intermediate surface 84. The second image forming light reflected at the first intermediate surface 84 reaches the image-side surface 83. The second image forming light is transmitted through the image-side surface 83.

The reflection of the first image forming light occurs in order of reflection at the image-forming surface 83 and reflection at the second intermediate surface 85. Before the reflection of the first image forming light occurs at the second intermediate surface 85, the reflection of the first image forming light occurs at the image-side surface 83.

The reflection of the second image forming light occurs in order of reflection at the image-forming surface 83 and reflection at the first intermediate surface 84. Before the reflection of the second image forming light occurs at the first intermediate surface 84, the reflection of the second image forming light occurs at the image-side surface 83.

Intersection of the first image forming light and the second image forming light occurs three times in the optical member 80. Moreover, reflection of the first image forming light and reflection of the second image forming light occurs twice for each light. The intersection of the first image forming light and the second image forming light, the reflection of the first image forming light, and the reflection of the second image forming light occur after the first image forming light and the second image forming light are transmitted through the pair of inclined surfaces and before the first image forming light and the second image forming light are transmitted through the bottom surface.

The wide-angle optical system of the present embodiment has at least two optical paths, and in the two optical paths, the intersection of the two light rays occurs three times, and the reflection of the two light rays occurs twice. Moreover, the intersection and the reflection occur after the two light rays are transmitted through the pair of inclined surfaces and before the two light rays are transmitted through the bottom surface. Accordingly, it is possible to reduce the size of the optical system.

In the wide-angle optical system of the present embodiment, it is preferable that the pair of front side lens units, the pair of rear side lens units, and the pair of inclined surfaces be disposed symmetrically with respect to a predetermined plane, and the predetermined plane is a plane which is orthogonal to the bottom surface, and which includes the line of intersection.

In the optical member 30, an upper surface and a lower surface have an equilateral-triangular shape. In this case, as shown in FIG. 1, it is possible to dispose the first object-surface 31 and the second object-side surface 32 to be symmetrical with respect to a predetermined plane SP. The predetermined plane SP is a plane which is orthogonal to the image-side surface 33, and which includes the intersection line IL.

In a case in which the first object-side surface 31 and the second object-side surface 32 are symmetrical with respect to the predetermined plane SP, the first front side lens unit 11 and the second front side lens unit 21 are to be disposed symmetrical with respect to the predetermined plane SP. Moreover, the first rear side lens unit 12 and the second rear side lens unit 22 as well, are to be disposed symmetrical with respect to the predetermined plane SP.

The pair of front side lens units is formed by the first front side lens unit 11 and the second front side lens unit 21. The pair of rear side lens units is formed by the first rear side lens unit 12 and the second rear side lens unit 22. The pair of inclined surfaces is formed by the first object-side surface 31 and the second object-side surface 32.

Moreover, the image-side surface 33 is the bottom surface which is in contact with the pair of inclined surfaces. Accordingly, the predetermined plane SP is the plane which is orthogonal to the bottom surface and which includes the intersection line.

As just described, in the wide-angle optical system 1, the pair of front side lens units, the pair of rear side lens units, and the pair of inclined surfaces are disposed symmetrically with respect to the predetermined plane. Accordingly, in the wide-angle optical system of the present embodiment, it is possible to reduce the size of the optical system.

The central axis AXC is included in the predetermined plane SP. In a case in which the predetermined plane SP is a plane of symmetry, the central axis AXC can be deemed as an axis of symmetry. As mentioned above, the angle made by the first optical path 13 and the second optical path 23 is 120°. Therefore, both the first optical path 13 and the second optical path 23 make an angle of 60° with respect to the central axis AXC.

A direction of viewing the first front side lens unit 11 from the predetermined plane SP is set to be a front-left direction and a direction of viewing the second front side lens unit 21 from the predetermined plane SP is set to be a front-right direction. In the wide-angle optical system 1, light from an object is incident on the wide-angle optical system from two different directions, or in other words, from the front-right direction and the front-left direction. Accordingly, it is possible to achieve a wide field of view.

In the wide-angle optical system of the present embodiment, it is preferable that the front side lens unit include a negative meniscus lens of which a convex surface is directed toward the object side, the rear side lens unit include at least one cemented lens having a positive refractive power, and the cemented lens include the positive lens and a negative lens.

By disposing the negative meniscus lens of which the convex surface is directed toward the object side in the front side lens unit, it is possible to make a light ray with a large angle of view incident on the wide-angle optical system 1. In this case, an angle of view for the inclined surface of the optical member becomes smaller than an angle of view for an incidence surface of the front side lens unit. Thus, it can be said that the angle of view is narrowed by the negative meniscus lens.

The optical member has a relatively long optical path. Therefore, a light beam passing through the optical member is susceptible to become large. By the angle of view being narrowed, it is possible to make small an effective aperture for the pair of inclined surfaces and an effective aperture for the bottom surface. As a result, it is possible to reduce the size of the optical system. In the wide-angle optical system of the present embodiment, it is possible to narrow the angle of view of 180° to the angle of view of approximately 30°.

Moreover, by using the negative meniscus lens, it is possible to reduce a distortion. As mentioned above, in the wide-angle optical system of the present embodiment, two optical images are formed. By using an image sensor, an image is generated from the optical image. By using the generated image, it is possible to carry out various image processing.

In the image to be used for the image processing, it is preferable that the distortion be small. The smaller the distortion of the image, easier it is to carry out the image processing. By using the negative meniscus lens, it is possible to reduce the distortion of the image. The negative meniscus lens of which the convex surface is directed toward the object side may be disposed nearest to an object. By making such arrangement, it is possible to further reduce the distortion of the image.

It is possible to use the wide-angle optical system of the present embodiment for an optical system of an endoscope. In the optical system of the endoscope, taking into consideration an ease of cleaning and a shock resistance, a surface nearest to the object is a flat surface in many cases. Accordingly, when only the ease of cleaning and the shock resistance are taken into consideration, even in the wide-angle optical system of the present embodiment, it is preferable that the surface nearest to the object side be a flat surface.

However, in the endoscope, it is assumed that the image processing is to be carried out. In an optical system in which it is assumed that the image processing is to be carried out, reducing the distortion of an image is given priority. Taking into consideration not only the ease of cleaning and the shock resistance but also carrying out the image processing, in the wide-angle optical system of the present embodiment, it is preferable to dispose the negative meniscus lens of which the convex surface is directed toward the object side, nearest to the object.

The rear side lens unit includes at least one cemented lens having a positive refractive power. The cemented lens includes the positive lens and the negative lens. Accordingly, it is possible to correct a chromatic aberration favorably.

In the wide-angle optical system of the present embodiment, it is preferable that the rear side lens unit include the positive lens and one cemented lens having a positive refractive power.

By making such arrangement, it is possible to suppress an occurrence of a longitudinal chromatic aberration and an occurrence of a chromatic aberration of magnification. In a wide-angle optical system, the occurrence of the longitudinal chromatic aberration and the occurrence of the chromatic aberration of magnification cause a degradation of resolution. In the wide-angle optical system of the present embodiment, it is possible to realize securing a wide angle of view and suppressing the degradation of resolution.

Furthermore, another cemented lens having a positive refractive power may be used. By using two cemented lenses, it is possible to suppress the occurrence of the longitudinal chromatic aberration and the occurrence of the chromatic aberration of magnification. As a result, it is possible to correct the longitudinal chromatic aberration and the chromatic aberration of magnification effectively.

In the wide-angle optical system of the present embodiment, it is preferable that following conditional expression (1) be satisfied:

$$0.1 < D5/L < 0.35 \quad (1)$$

where,

D5 denotes a distance when a predetermined distance is subjected to air conversion, and L denotes an overall length of the wide-angle optical system, where the predetermined distance is a distance from a lens surface nearest to an image in the front side lens unit up to a lens surface nearest to an object in the rear side lens unit, and the overall length is a distance from an optical surface positioned nearest to the object up to the image plane.

Conditional expression (1) is a conditional expression for securing a space for disposing the optical member.

In a case of falling below a lower limit value of conditional expression (1), the distance between the front side lens unit and the rear side lens unit becomes excessively narrow. In this case, it becomes difficult to secure adequately the space for disposing the optical member. Consequently, securing a wide field of view becomes difficult.

In a case of exceeding an upper limit value of conditional expression (1), the distance between the front side lens unit and the rear side lens unit becomes excessively wide. In this case, correcting an aberration favorably becomes difficult. Consequently, the resolution is degraded.

In the wide-angle optical system of the present embodiment, it is preferable that the image plane on which the pair of optical images is formed be a single plane.

It is possible to dispose an image sensor on the image plane. In the wide-angle optical system of the present embodiment, two optical images are formed on the image plane. It is possible to capture the two optical images by the image sensor. In this case, it is possible to use two image sensors for capturing the images. When the image plane is a single plane, it is possible to dispose the two image sensors easily.

It is possible to use one image sensor for capturing an image. Even in this case, when the image plane is a single plane, it is possible to dispose the image sensor even more easily.

In the wide-angle optical system of the present embodiment, it is preferable that the rear side lens unit include a lens which moves along the axis of rotational symmetry.

In an optical system, as a F-number becomes small, the resolution becomes high and a depth of field becomes narrow. When a location of the object is within the depth of field, a focused optical image is formed. However, when the location of the object is away from the depth of field, a focused optical image is not formed.

The wide-angle optical system of the present embodiment includes a lens which moves along the axis of rotational symmetry. The lens which moves functions as a focusing lens. Therefore, even when a distance up to the object varies, it is possible to form a focused optical image.

In the wide-angle optical system of the present embodiment, a lens in the rear side lens unit is moved. The pair of rear side lens units being disposed in parallel, it is possible to simplify the moving mechanism.

In the wide-angle optical system of the present embodiment, it is preferable that following conditional expression (2) be satisfied:

$$2\ \text{mm} < HB < 10\ \text{mm} \quad (2)$$

where,

HB denotes a length in a transverse direction of the bottom surface, where the transverse direction is a direction orthogonal to the two axes of rotational symmetry.

Conditional expression (2) is a conditional expression related to the size of the optical system.

In a case of falling below a lower limit value of conditional expression (2), it becomes difficult to secure a light beam diameter of an adequate size. Particularly, since the light beam diameter becomes small at a periphery of a field of view, the F-number at the periphery of the field of view becomes large. In this case, both a brightness and the resolution are degraded at the periphery of the field of view.

In a case of exceeding an upper limit value of conditional expression (2), the optical system becomes large.

In the wide-angle optical system of the present embodiment, it is preferable that following conditional expression (3) be satisfied:

$$0.5<HB/VB<2 \quad (3)$$

where,

HB denotes the length in a transverse direction of the bottom surface, and

VB denotes a length in a longitudinal direction of the bottom surface, where the transverse direction is a direction orthogonal to the two axes of rotational symmetry, and the longitudinal direction is a direction orthogonal to the transverse direction.

Conditional expression (3) is conditional expression related to the size of the optical system.

In a case of falling below a lower limit value of conditional expression (3), the optical member becomes large in the longitudinal direction. In a case of exceeding an upper limit value of conditional expression (3), the optical member becomes large in the transverse direction.

In the wide-angle optical system of the present embodiment, it is preferable that following conditional expression (4) be satisfied:

$$1<HB/D<3 \quad (4)$$

where,

HB denotes the length in a transverse direction of the bottom surface, and

D denotes a distance between the two axes of rotational symmetry, where the transverse direction is a direction orthogonal to the two axes of rotational symmetry.

The inclined surface of the optical member is to be used as an optical surface. Conditional expression (4) is a conditional expression related to an efficient use of the inclined surface, or in other words, an efficient use of the optical surface.

In a case of falling below a lower limit value of conditional expression (4), a position of a light beam incident on the inclined surface is excessively close to the bottom surface. In this case, in order to make all light beams incident on the inclined surface, a distance between the front side lens unit and the inclined surface has to be widened. As a result, the optical system becomes large.

In a case of exceeding an upper limit value of conditional expression (4), it is possible to make a size of the optical member small. However, the position of the light beam incident on the inclined surface is excessively close to the intersection line IL (refer to FIG. 1). In this case, either it becomes difficult to achieve a wide angle of view or a flare is susceptible to occur.

In the wide-angle optical system of the present embodiment, it is preferable that the front side lens unit include at least two negative meniscus lenses.

As mentioned above, by disposing the negative meniscus lens in the front side lens unit, it is possible to reduce the distortion. By disposing at least two negative meniscus lenses in the front side lens unit, it is possible to further reduce the distortion.

By using at least two negative meniscus lenses, it is possible to make a light ray with a large angle of view be refracted gradually. Accordingly, it is possible to suppress an occurrence of various aberrations.

By using at least two negative meniscus lenses, it is possible to let the negative refractive power of the front side lens unit be shared by at least two negative meniscus lenses. Consequently, even when the negative refractive power of the front side lens unit is made large, it is possible to suppress the occurrence of various aberrations.

When it is possible to make the negative refractive power of the front side lens unit large, it is possible to make small a diameter of a light beam incident on the optical member. Consequently, it is possible to make the optical member small. The pair of rear side lens units is disposed on the image side of the optical member. When it is possible to make the optical member small, it is possible to make a distance between the two axes of rotational symmetry narrow. As a result, it is possible to make the optical system small.

In the wide-angle optical system of the present embodiment, it is preferable that a common lens unit which includes at least one cemented lens be disposed on an image side of the rear side lens unit, and an axis of rotational symmetry of the common lens unit be in a plane which includes the two axes of rotational symmetry and be located to be equidistant from each of the two axes of rotational symmetry.

By disposing the common lens unit on the image side of the rear side lens unit, it is possible to correct various aberrations favorably. Moreover, by disposing at least one cemented lens in the common lens unit, it is possible to correct the chromatic aberration favorably.

The common lens unit being a rotationally symmetrical optical system, the common lens has an axis of rotational symmetry. The central axis AXC shown in FIG. 1 is the axis of rotational symmetry of the common lens unit. Hereinafter, the central axis AXC will be referred to as the axis of rotational symmetry AXC.

The axis of rotational symmetry AXC is located in a plane which includes the axis of rotational symmetry AX1 and the axis of rotational symmetry AX2. The axis of rotational symmetry AX1 and the axis of rotational symmetry AX2 are axes of rotational symmetry of the first rear side lens unit 12 and the second rear side lens unit 22 respectively. Accordingly, the axis of rotational symmetry of the common lens unit is located in the plane which includes the axis axes of rotational symmetry of the pair of rear side lens units.

A distance between the axis of rotational symmetry AXC and the axis of rotational symmetry AX1 is equal to a distance between the axis of rotational symmetry AXC and the axis of rotational symmetry AX2. Accordingly, the axis of rotational symmetry of the common lens unit is located to be equidistance from each of the axis of rotational symmetry of the pair of rear side lens units.

On an object side of the common lens unit, the axis of rotational symmetry AX1 and the axis of rotational symmetry AX2 are parallel. Whereas, on an image side of the common lens unit, the axis of rotational symmetry AX1 and the axis of rotational symmetry AX2 are nonparallel. Due to a refraction effect in the common lens unit, the axis of rotational symmetry AX1 and the axis of rotational symmetry AX2 are turned toward the axis of rotational symmetry AXC.

As mentioned above, the distance D is the distance between the axis of rotational symmetry AX1 and the axis of rotational symmetry AX2. As the common lens unit is disposed, the distance D on the image side of the common lens unit becomes narrower than the distance D on the object side of the common lens unit. Accordingly, in a case in which the common lens unit is disposed, it is possible to narrow a distance between the two optical images as compared to a case in which the common lens unit is not disposed. As a result, it is possible to reduce a size of the image sensor.

At least one cemented lens is used in the common lens unit. In this case, it is preferable to use a positive cemented lens for the cemented lens. By using the positive cemented lens, it is possible to suppress the occurrence of the chromatic aberration and an occurrence of a coma aberration.

In the wide-angle optical system of the present embodiment, it is preferable that following conditional expression (5) is satisfied:

$$40° < \alpha < 70° \quad (5)$$

where, $\alpha$ denotes an angle made by the pair of inclined surfaces.

In a case of falling below a lower limit value of conditional expression (5), the optical path length in the optical member becomes excessively long. In this case, it is not possible to carry out adequately an aberration correction in the front side lens unit and an aberration correction in the rear side lens unit. As a result, it is not possible to achieve a high resolution.

In a case of exceeding an upper limit value of conditional expression (5), light incident on the optical member cannot be made to be emerged from the optical member by a one-time reflection. When reflection for a plurality of times is carried out inside the optical member, it is possible to make the light to be emerged from the optical member. However, in this case, the optical member becomes large.

In the wide-angle optical system of the present embodiment, it is preferable that a shape of the optical member be a regular quadrangular pyramid.

By making a shape of the optical member regular to be a regular quadrangular pyramid, it is possible to form four optical paths. It is possible to further widen the field of view as compared to a case in which the optical member has a triangular prism shape.

An image pickup apparatus of the present embodiment includes the abovementioned wide-angle optical system and an image sensor.

According to the image pickup apparatus of the present embodiment, it is possible acquire an image having a wide field of view, in which an aberration is corrected favorably.

The image pickup apparatus of the present embodiment may have an insertion portion and a holding portion, and abovementioned image pickup apparatus may have been disposed in the insertion portion.

The image pickup apparatus of the present embodiment is an endoscope for instance. The endoscope has an insertion portion and a holding portion. A rigid endoscope has a hard and tube-shaped insertion portion. A flexible endoscope has a flexible and tube-shaped insertion portion. In the flexible endoscope, an operating section is provided to the holding portion. By an operation on the operating section, it is possible to change a direction of a front end of the insertion portion for example.

The image pickup apparatus of the present embodiment is disposed in a front end of the insertion portion. The wide-angle optical system of the present embodiment is disposed in the image pickup apparatus. Therefore, while being a small size endoscope, it is possible to observe a wide field of view in which an aberration is corrected favorably. Moreover, by capturing an optical image by the image sensor, it is possible to acquire an image having a wide field of view, in which an aberration is corrected favorably.

An image pickup system of the present embodiment includes the abovementioned image pickup apparatus, a processing apparatus, and a display apparatus.

The image pickup system of the present embodiment is an endoscope system for instance. The endoscope system includes an endoscope, a processing apparatus, and a display apparatus. By disposing the image sensor and the wide-angle optical system of the present embodiment in the insertion portion of the endoscope, it is possible to acquire an image having a wide field of view, in which an aberration is corrected favorably.

It is possible to display the acquired image on the display apparatus as it is. Moreover, various image processing may be carried out by the processing apparatus, and the image after processing may be displayed on the display apparatus.

In the image pickup system of the present embodiment, it is preferable that two images having a parallax be acquired by the image sensor, and an image for stereoscopic vision is generated from the two images by the processing apparatus.

In a case in which the shape of the optical member is a triangular prism shape, two optical images are formed in the wide-angle optical system of the present embodiment. As mentioned above, in the wide-angle optical system of the present embodiment, it is possible to make the predetermined angle small. Accordingly, by capturing the two optical images by the image sensor, it is possible to acquire two images having a parallax.

From the two images, it is possible to generate an image for stereoscopic vision. The image for stereoscopic vision is to be generated by the processing apparatus. As just described, in the image pickup system of the present embodiment, it is possible to view an object stereoscopically.

It is possible to make the shape of the optical member a quadrangular pyramid shape. In this case, in the wide-angle optical system of the present embodiment, two sets of a pair of optical images are formed. A first image is generated from one set of the optical images, and a second image is generated from the other set of optical images.

Both the first image and the second image are images for stereoscopic vision. However, a parallax direction for the first image and a parallax direction for the second image are orthogonal. Therefore, by using the first image and the second image, it is possible to carry out stereoscopic vision more easily.

Examples will be described below. A wide-angle optical system of each example includes a first optical system and a second optical system. The first optical system includes a first front side lens unit and a first rear side lens unit. The second optical system includes a second front side lens unit and a second rear side lens unit.

An optical system same as the first front side lens unit is used for the second front side lens unit. An optical system same as the first rear side lens unit is used for the second rear side lens unit. Therefore, a description of the second front side lens unit and a description of the second rear side lens unit will be omitted.

In an example 13, a wide-angle optical system includes a third optical system and a fourth optical system. The third optical system includes a third front side lens unit and a third rear side lens unit. The fourth optical system includes a fourth front side lens unit and a fourth rear side lens unit.

The optical system same as the first front side lens unit is used for the third front side lens unit and the fourth front side lens unit. The optical system same as the first rear side lens unit is used for the third rear side lens unit and the fourth rear side lens unit. Therefore, a description of the third front side lens unit, description of the third rear side lens unit, a description of the fourth front side lens unit, and a description of a fourth rear side lens unit will be omitted.

In aberration diagrams, a spherical aberration, an astigmatism, a distortion, and a transverse aberration are shown. Regarding the astigmatism and the distortion, an aberration for a d-line is shown in examples 8, 9, and 10, and an aberration for an e-line is shown in examples 14 and 15.

FIG. 27A, FIG. 29A, FIG. 31A, FIG. 33A, FIG. 35A, FIG. 37A, FIG. 39A, and FIG. 40A are diagrams showing the spherical aberration.

FIG. 27B, FIG. 29B, FIG. 31B, FIG. 33B, FIG. 35B, FIG. 37B, FIG. 39B, and FIG. 40B are diagram showing the astigmatism FIG. 27C, FIG. 29C, FIG. 31C, FIG. 33C, FIG. 35C, FIG. 37C, FIG. 39C, and FIG. 40C are diagrams showing the distortion.

FIG. 28A, FIG. 28B, FIG. 28C, FIG. 30A, FIG. 30B, FIG. 30C, FIG. 32A, FIG. 32B, FIG. 32C, FIG. 34A, FIG. 34B, FIG. 34C, FIG. 36A, FIG. 36B, FIG. 36C, FIG. 38A, FIG. 38B, and FIG. 38C are diagrams showing the transverse aberration in an X-direction.

FIG. 28D, FIG. 28E, FIG. 28F, FIG. 30D, FIG. 30E, FIG. 30F, FIG. 32D, FIG. 32E, FIG. 32F, FIG. 34D, FIG. 34E, FIG. 34F, FIG. 36D, FIG. 36E, FIG. 36F, FIG. 38D, FIG. 38E, and FIG. 38F are diagrams showing the transverse aberration in a Y-direction.

Figure 7:
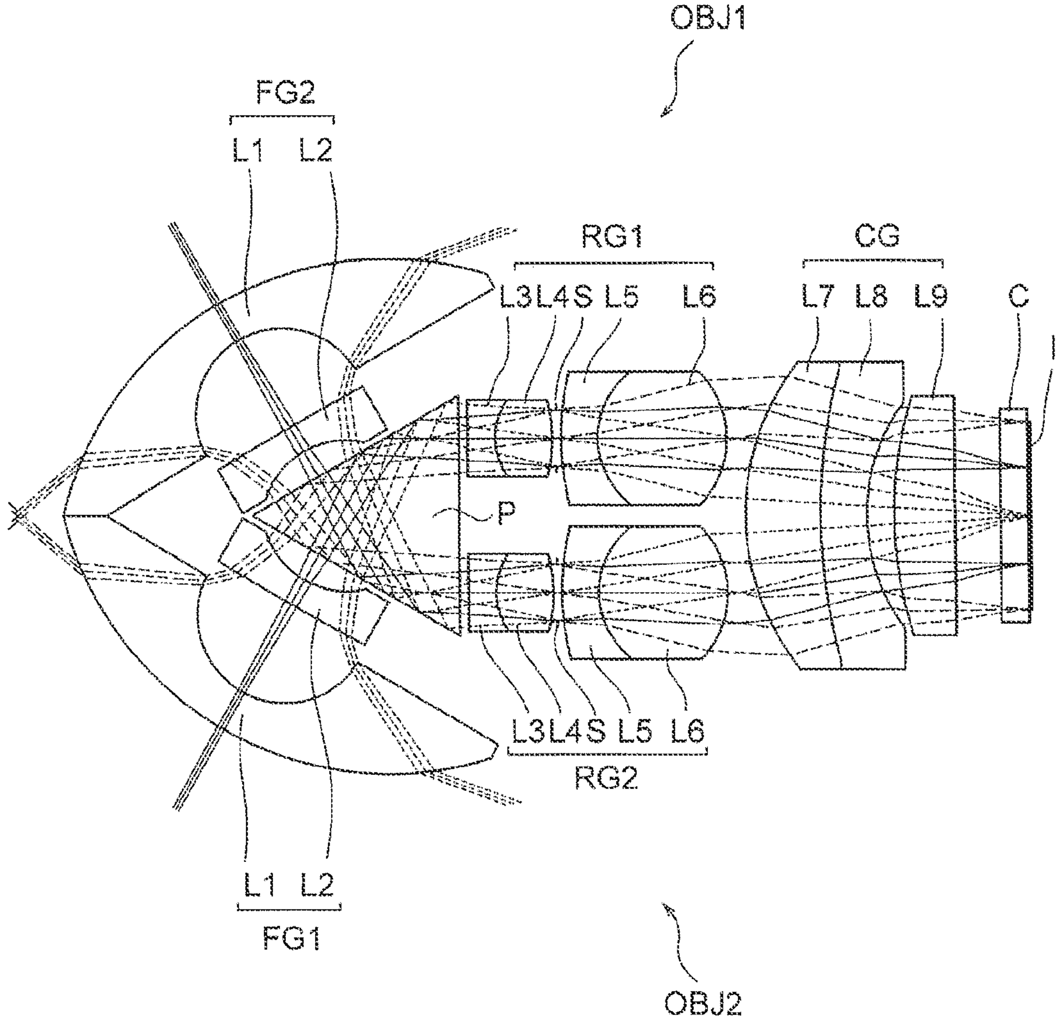
FIG. 7 is a cross-sectional view of a lens arrangement of a wide-angle optical system of an example 1.
Figure 8:
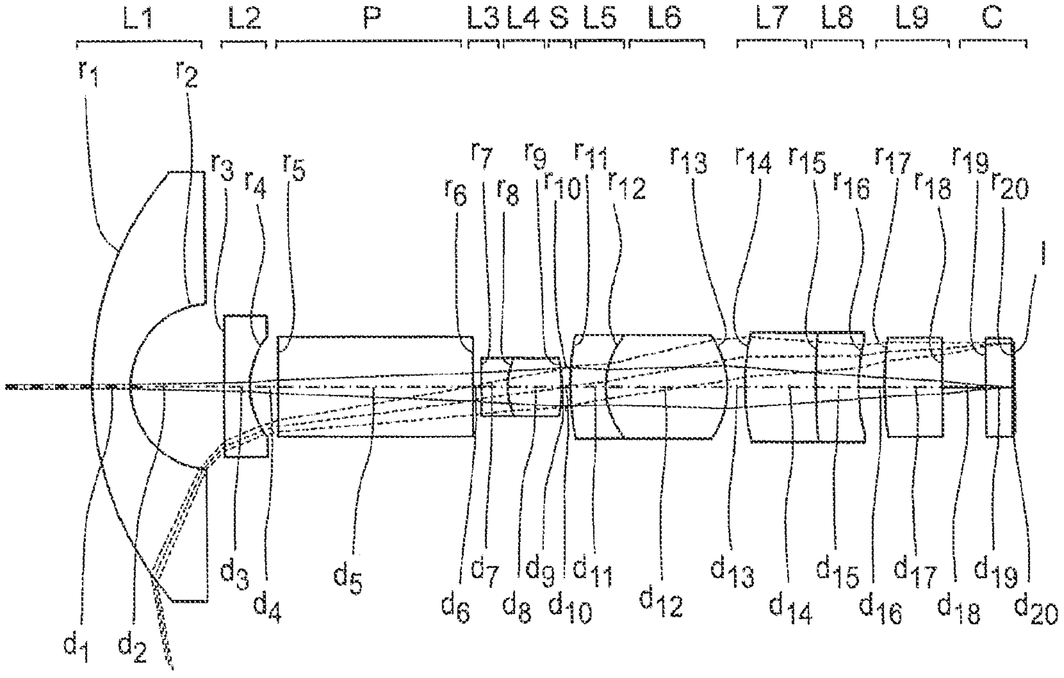
FIG. 8 is a cross-sectional view of a lens arrangement of the wide-angle optical system of the example 1.

A wide-angle optical system of an example 1 will be described below. FIG. 7 and FIG. 8 are cross-sectional views showing a lens arrangement of the wide-angle optical system of the example 1.

The wide-angle optical system of the example 1 includes a first optical system OBJ1, a second optical system OBJ2, an optical member P, a common lens unit CG, and a cover glass C.

The first optical system OBJ1 includes a first front side lens unit FG1 and a first rear side lens unit RG1. The second optical system OBJ2 includes a second front side lens unit FG2 and a second rear side lens unit RG2.

The first front side lens unit FG1 includes a negative meniscus lens L1 of which a convex surface is directed toward an object side and a negative meniscus lens L2 of which a convex surface is directed toward the object side.

The first rear side lens unit RG1 includes a biconcave negative lens L3, a biconvex positive lens L4, a negative meniscus lens L5 of which a convex surface is directed toward the object side, and a biconvex positive lens L6. The biconcave negative lens L3 and the biconvex positive lens L4 are cemented. The negative meniscus lens L5 and the biconvex positive lens L6 are cemented.

The common lens unit CG includes a positive meniscus lens L7 of which a convex surface is directed toward the object side, a negative meniscus lens L8 of which a convex surface is directed toward the object side, and a positive meniscus lens L9 of which a convex surface is directed toward the object side. The positive meniscus lens L7 and the negative meniscus lens L8 are cemented.

The optical member P is disposed between the first front side lens unit FG1 and the first rear side lens unit RG1. The optical member 30 shown in FIG. 2B is used for the optical member P.

An aperture stop S is disposed at an interior of the first rear side lens unit RG1. More specifically, the aperture stop S is disposed between the biconvex positive lens L4 and the negative meniscus lens L5.

The cover glass C is disposed on an image side of the common lens unit CG. In other words, the cover glass C is disposed between the positive meniscus lens L9 and an image plane I.

Figure 9:
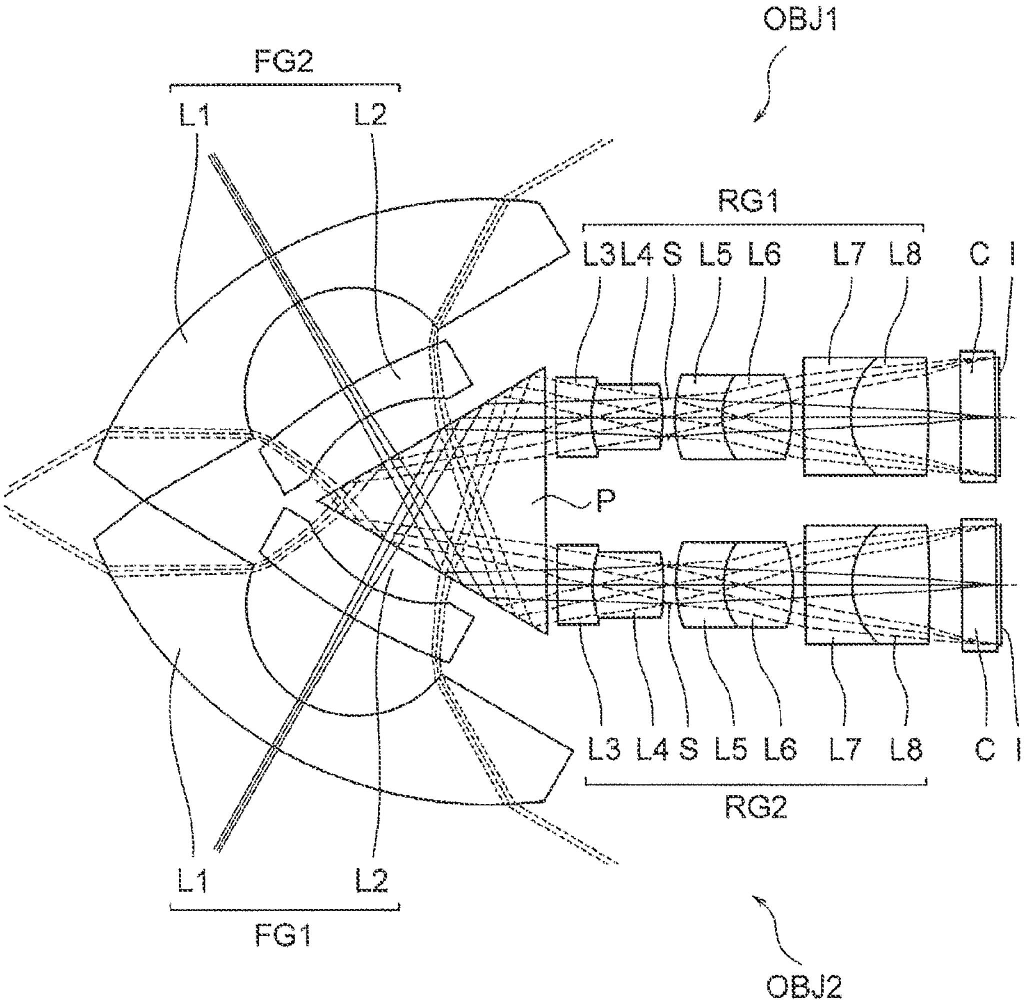
FIG. 9 is a cross-sectional view of a lens arrangement of a wide-angle optical system of an example 2.
Figure 10:
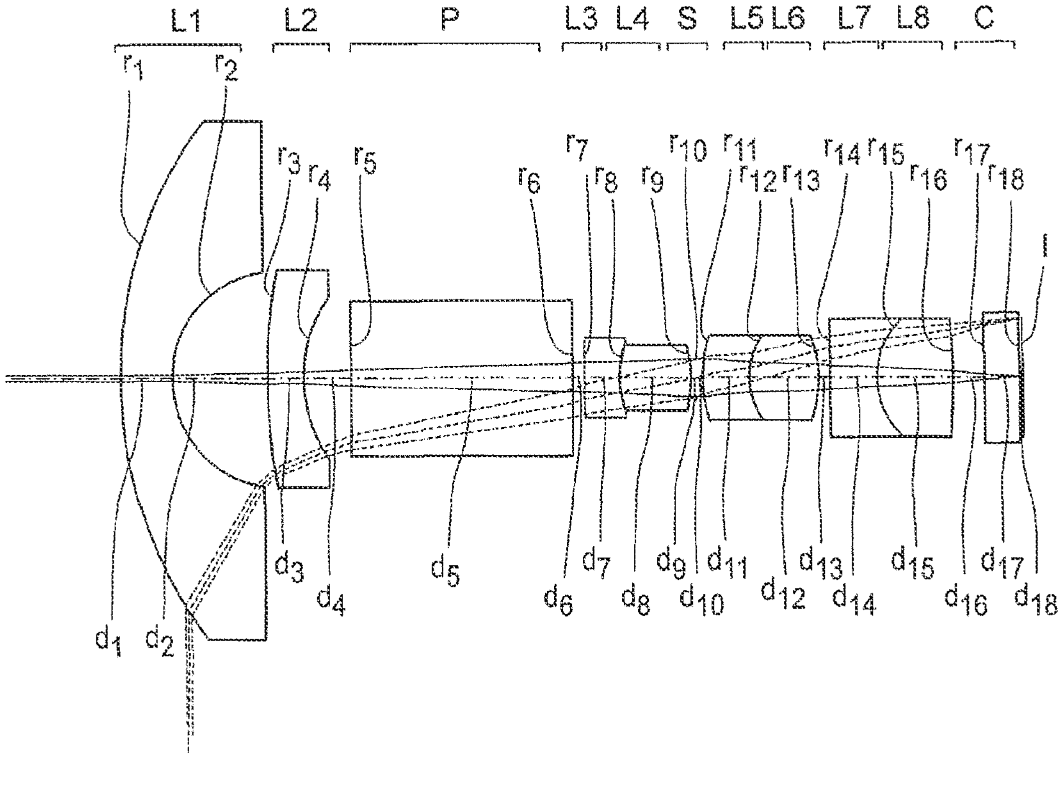
FIG. 10 is a cross-sectional view of a lens arrangement of the wide-angle optical system of the example 2.

A wide-angle optical system of an example 2 will be described below. FIG. 9 and FIG. 10 are cross-sectional views of a lens arrangement of the wide-angle optical system of the example 2.

The wide-angle optical system of the example 2 includes a first optical system OBJ1, a second optical system OBJ2, an optical member P, and a cover glass C.

The first optical system OBJ1 includes a first front side lens unit FG1 and a first rear side lens unit RG1. The second optical system OBJ2 includes a second front side lens unit FG2 and a second rear side lens unit RG2.

The first front side lens unit FG1 includes a negative meniscus lens L1 of which a convex surface is directed toward an object side and a negative meniscus lens L2 of which a convex surface is directed toward the object side.

The first rear side lens unit RG1 includes a negative meniscus lens L3 of which a convex surface directed toward the object side, a biconvex positive lens L4, a negative meniscus lens L5 of which a convex surface is directed toward the object side, a biconvex positive lens L6, a negative meniscus lens L7 of which a convex surface is directed toward the object side, and a biconvex positive lens L8.

The negative meniscus lens L3 and the biconvex positive lens L4 are cemented. The negative meniscus lens L5 *h* and the biconvex positive lens L6 are cemented. The negative meniscus lens L7 and the biconvex positive lens L8 are cemented.

The optical member P is disposed between the first front side lens unit FG1 and the first rear side lens unit RG1. The optical member 30 shown in FIG. 2B is used for the optical member P.

An aperture stop S is disposed at an interior of the first rear side lens unit RG1. More specifically, the aperture stop S is disposed between the biconvex positive lens L4 and the negative meniscus lens L5.

The cover glass C is disposed on an image side of the first rear side lens unit RG1. In other words, the cover glass C is disposed between the biconvex positive lens L8 and an image plane I.

Figure 11:
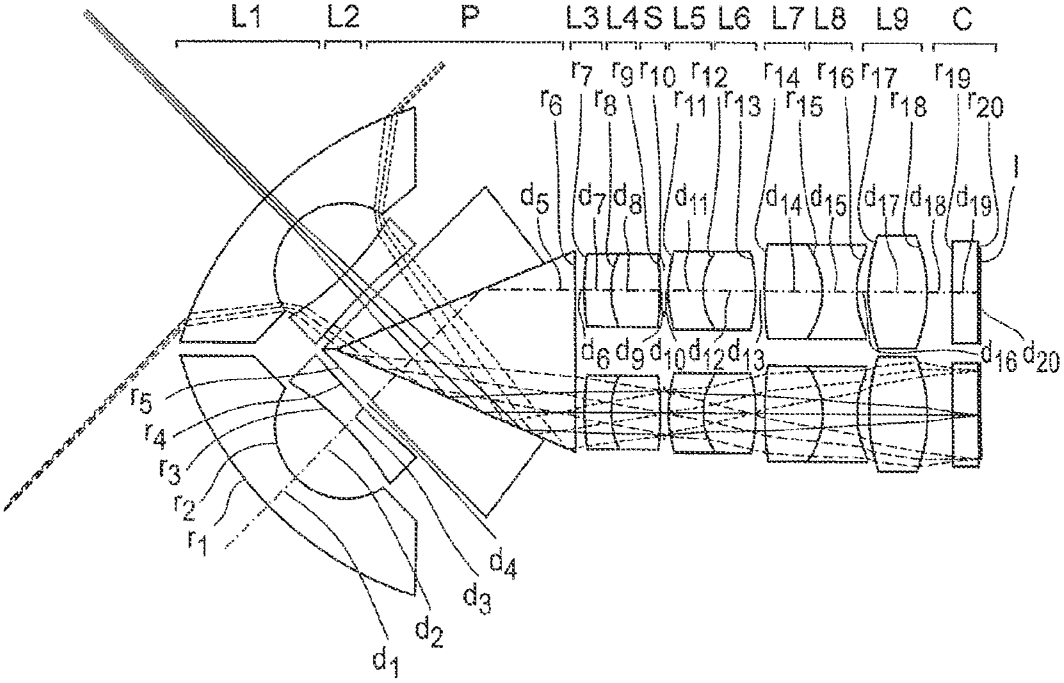
FIG. 11 is a cross-sectional view of a lens arrangement of a wide-angle optical system of an example 3.

A wide-angle optical system of an example 3 will be described below. FIG. 11 is a cross-section view of a lens arrangement of the wide-angle optical system of the example 3.

The wide-angle optical system of the example 3 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a biconcave negative lens L2.

The first rear side lens unit includes a negative meniscus lens L3 of which a convex surface is directed toward the object side, a biconvex positive lens L4, a negative meniscus lens L5 of which a convex surface is directed toward the object side, a biconvex positive lens L6, a biconvex positive lens L7, a biconcave negative lens L8, and a biconvex positive lens L9.

The negative meniscus lens L3 and the biconvex positive lens L4 are cemented. The negative meniscus lens L5 and the biconvex positive lens L6 are cemented. The biconvex positive lens L7 and the biconcave negative lens L8 are cemented.

The optical member P is disposed between the first front side lens unit and the first rear side lens unit. The optical member 50 shown in FIG. 3 is used for the optical member P.

An aperture stop S is disposed at an interior of the first rear side lens unit. More specifically, the aperture stop S is disposed between the biconvex positive lens L4 and the negative meniscus lens L5.

The cover glass C is disposed on an image side of the first rear side lens unit. In other words, the cover glass C is disposed between the biconvex positive lens L9 and an image plane I.

Figure 12:
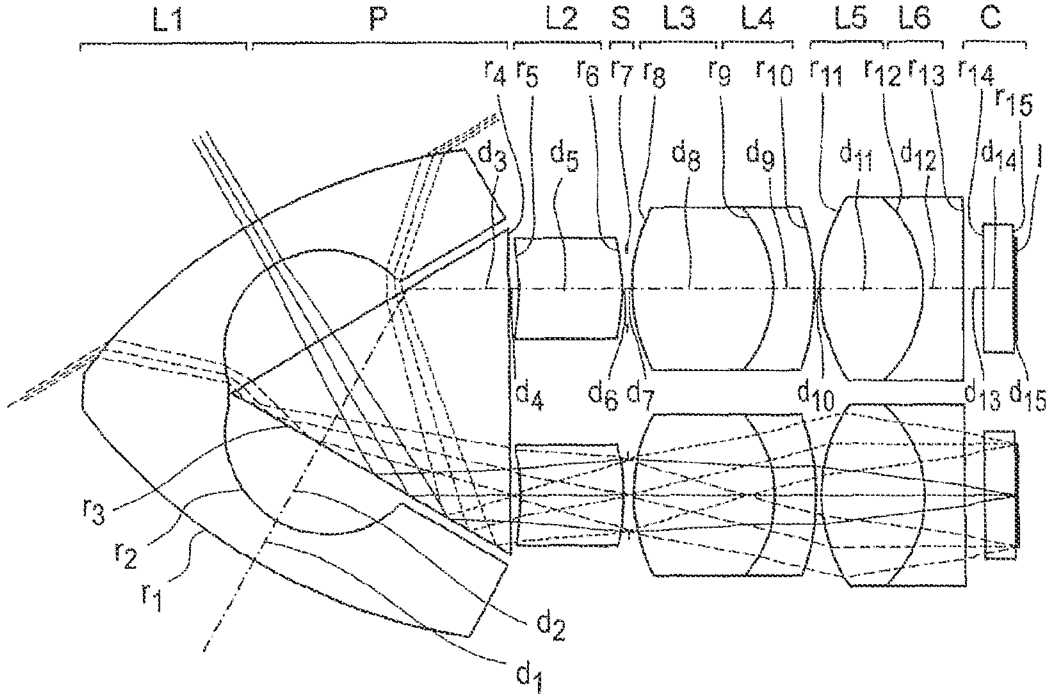
FIG. 12 is a cross-sectional view of a lens arrangement of a wide-angle optical system of an example 4.

A wide-angle optical system of an example 4 will be described below. FIG. 12 is a cross-sectional view of a lens arrangement of the wide-angle optical system of the example 4.

The wide-angle optical system of the example 4 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side.

The first rear side lens unit includes a positive meniscus lens L2 of which a convex surface is directed toward an image side, a biconvex positive lens L3, a negative meniscus lens L4 of which a convex surface is directed toward the image side, a biconvex positive lens L5, and a planoconcave negative lens L6.

The biconvex positive lens L3 and the negative meniscus lens L4 are cemented. The biconvex positive lens L5 and the planoconcave negative lens L6 are cemented.

The optical member P is disposed between the first front side lens unit and the first rear side lens unit. The optical member 30 shown in FIG. 2B is used for the optical member P.

An aperture stop S is disposed at an interior of the first rear side lens unit. More specifically, the aperture stop S is disposed between the positive meniscus lens L2 and the biconvex positive lens L3.

The cover glass C is disposed on the image side of the first rear side lens unit. In other words, the cover glass C is disposed between the planoconcave negative lens L6 and an image plane I.

Figure 13:
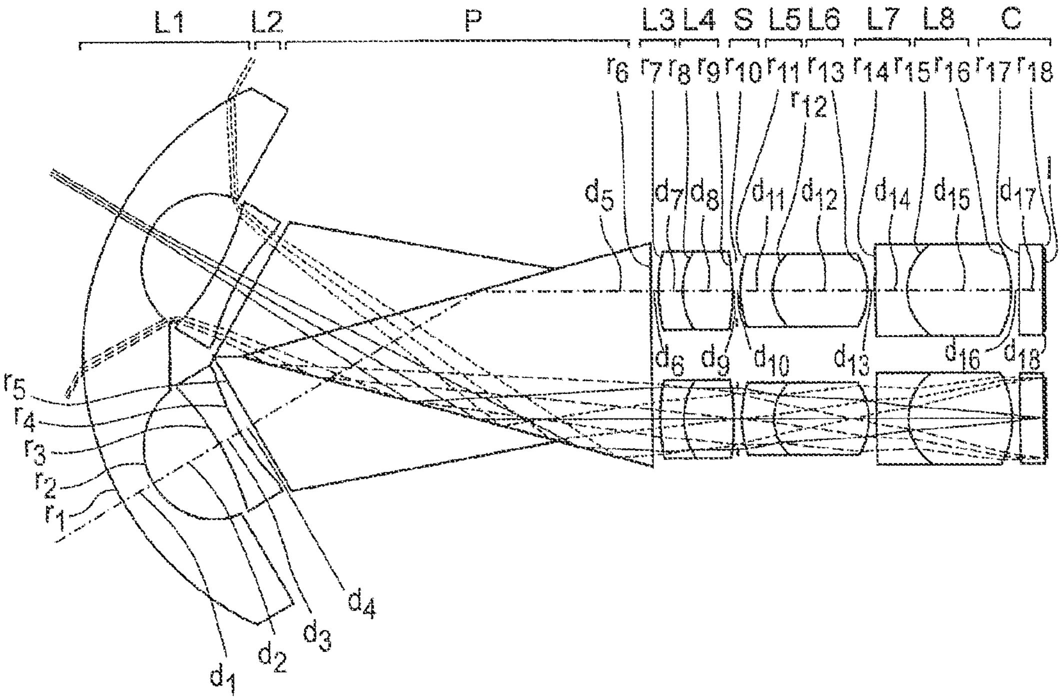
FIG. 13 is a cross-sectional view of a lens arrangement of a wide-angle optical system of an example 5.

A wide-angle optical system of an example 5 will be described below. FIG. 13 is a cross-sectional view of a lens arrangement of the wide-angle optical system of the example 5.

The wide-angle optical system of the example 5 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a biconcave negative lens L2.

The first rear side lens unit includes a negative meniscus lens L3 of which a convex surface is directed toward the object side, a biconvex positive lens L4, a negative meniscus lens L5 of which a convex surface is directed toward the object side, a biconvex positive lens L6, a negative meniscus lens L7 of which a convex surface is directed toward the object side, and a biconvex positive lens L8.

The negative meniscus lens L3 and the biconvex positive lens L4 are cemented. The negative meniscus lens L5 and the biconvex positive lens L6 are cemented. The negative meniscus lens L7 and the biconvex positive lens L8 are cemented.

The optical member P is disposed between the first front side lens unit and the first rear side lens unit. The optical member 60 shown in FIG. 4 is used for the optical member P.

An aperture stop S is disposed at an interior of the first rear side lens unit. More specifically, the aperture stop S is disposed between the biconvex positive lens L4 and the negative meniscus lens L5.

The cover glass C is disposed on an image side of the first rear side lens unit. In other words, the cover glass C is disposed between the biconvex positive lens L8 and an image plane I.

Figure 14:
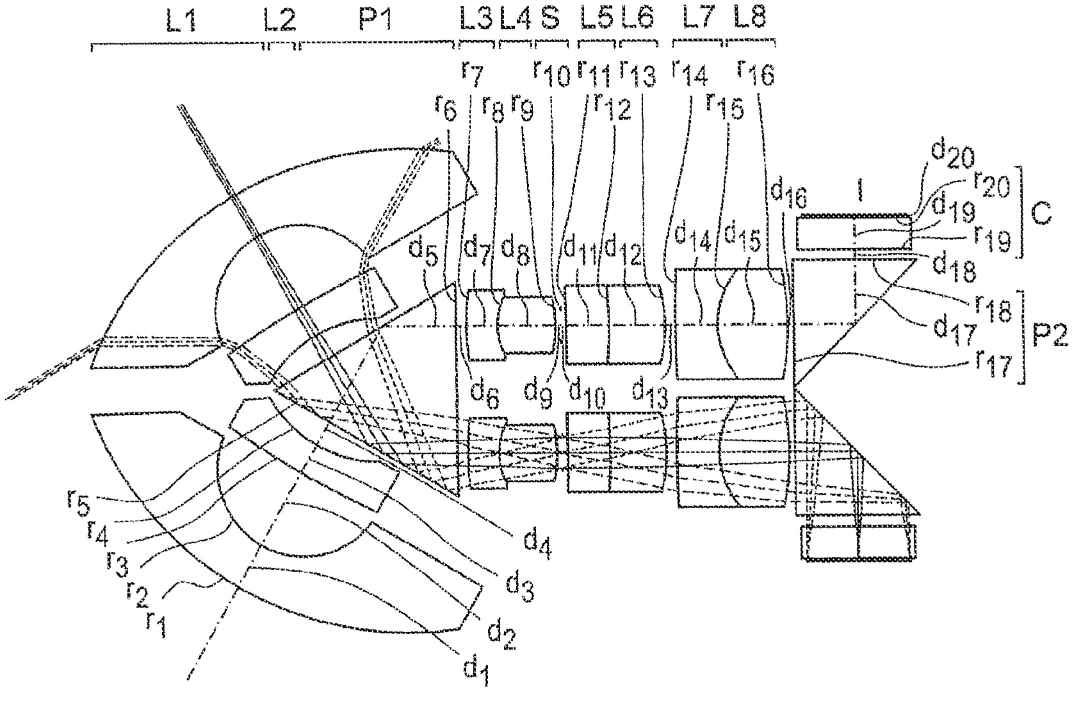
FIG. 14 is a cross-sectional view of a lens arrangement of a wide-angle optical system of an example 6.

A wide-angle optical system of an example 6 will be described below. FIG. 14 is a cross-sectional view of a lens arrangement of the wide-angle optical system of the example 6.

The wide-angle optical system of the example 6 includes a first optical system, a second optical system, an optical member P1, a prism P2, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a negative meniscus lens L2 of which a convex surface is directed toward the object side.

The first rear side lens unit includes a negative meniscus lens L3 of which a convex surface is directed toward the object side, a biconvex positive lens L4, a positive meniscus lens L5 of which a convex surface is directed toward an image side, a positive meniscus lens L6 of which a convex surface is directed toward the image side, a negative meniscus lens L7 of which a convex surface is directed toward the object side, and a biconvex positive lens L8.

The negative meniscus lens L3 and the biconvex positive lens L4 are cemented. The positive meniscus lens L5 and the positive meniscus lens L6 are cemented. The negative meniscus lens L7 and the biconvex positive lens L8 are cemented.

The optical member P1 is disposed between the first front side lens unit and the first rear side lens unit. The optical member 30 shown in FIG. 2B is used for the optical member P1.

An aperture stop S is disposed at an interior of the first rear side lens unit. More specifically, the aperture stop S is disposed between the biconvex positive lens L4 and the negative meniscus lens L5.

The prism P2 is a triangular prism. The prism P2 is disposed on the image side of the first rear side lens unit. In other words, the prism P2 is disposed between the biconvex positive lens L8 and the cover glass C.

The cover glass C is disposed on the image side of the first rear side lens unit. In other words, the cover glass C is disposed between the prism P2 and an image plane I.

An image sensor is disposed on the image plane I. In a case of the wide-angle optical system of the example 5, when an image sensor is large, it becomes difficult to dispose the image sensors side-by-side. In the wide-angle optical system of the example 6, the prism P2 is disposed on the image side of the rear side lens unit. It is possible to fold the optical path 90° by the prism P2. Accordingly, it is possible to dispose a large image sensor easily.

Figure 15:
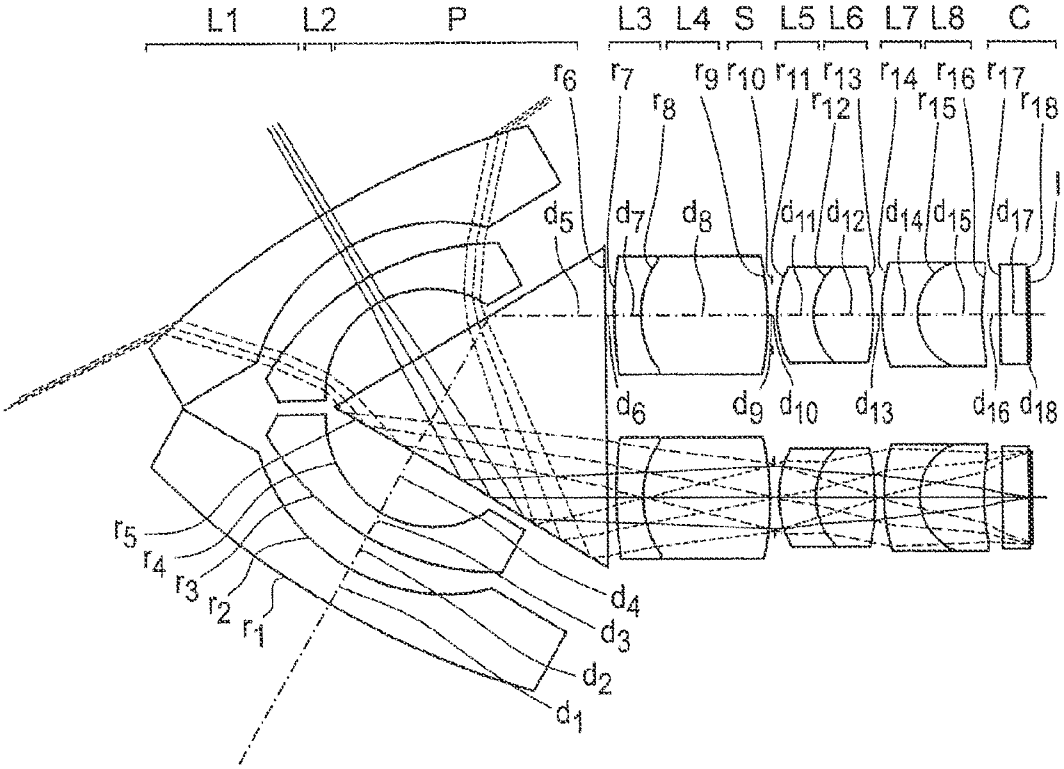
FIG. 15 is a cross-sectional view of a lens arrangement of a wide-angle optical system of an example 7.

A wide-angle optical system of an example 7 will be described below. FIG. 15 is a cross-sectional view of a lens arrangement of the wide-angle optical system of the example 7.

The wide-angle optical system of the example 7 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a negative meniscus lens L2 of which a convex surface is directed toward the object side.

The first rear side lens unit includes a negative meniscus lens L3 of which a convex surface is directed toward the object side, a biconvex positive lens L4, a negative meniscus lens L5 of which a convex surface is directed toward the object side, a biconvex positive lens L6, a negative meniscus lens L7 of which a convex surface is directed toward the object side, and a positive meniscus lens L8 of which a convex surface is directed toward the object side.

The negative meniscus lens L3 and the biconvex positive lens L4 are cemented. The negative meniscus lens L5 and the biconvex positive lens L6 are cemented. The negative meniscus lens L7 and the positive meniscus lens L8 are cemented.

The optical member P is disposed between the first front side lens unit and the first rear side lens unit. The optical member 30 shown in FIG. 2B is used for the optical member P.

An aperture stop S is disposed at an interior of the first rear side lens unit. More specifically, the aperture stop S is disposed between the biconvex positive lens L4 and the negative meniscus lens L5.

The cover glass C is disposed on an image side of the first rear side lens unit. In other words, the cover glass C is disposed between the meniscus lens L8 having a positive refractive power and an image plane I.

In the wide-angle optical system of the example 7, an object-side surface of the negative meniscus lens L1 is made to be a surface with a large radius of curvature. In a case in which the wide-angle optical system of the example 7 is used for an optical system of an endoscope, it is possible to reduce an amount of a lens protruding from a front-end portion of the endoscope. Therefore, the object-side surface of the negative meniscus lens L1 is even harder to get a scratch.

Figure 16:
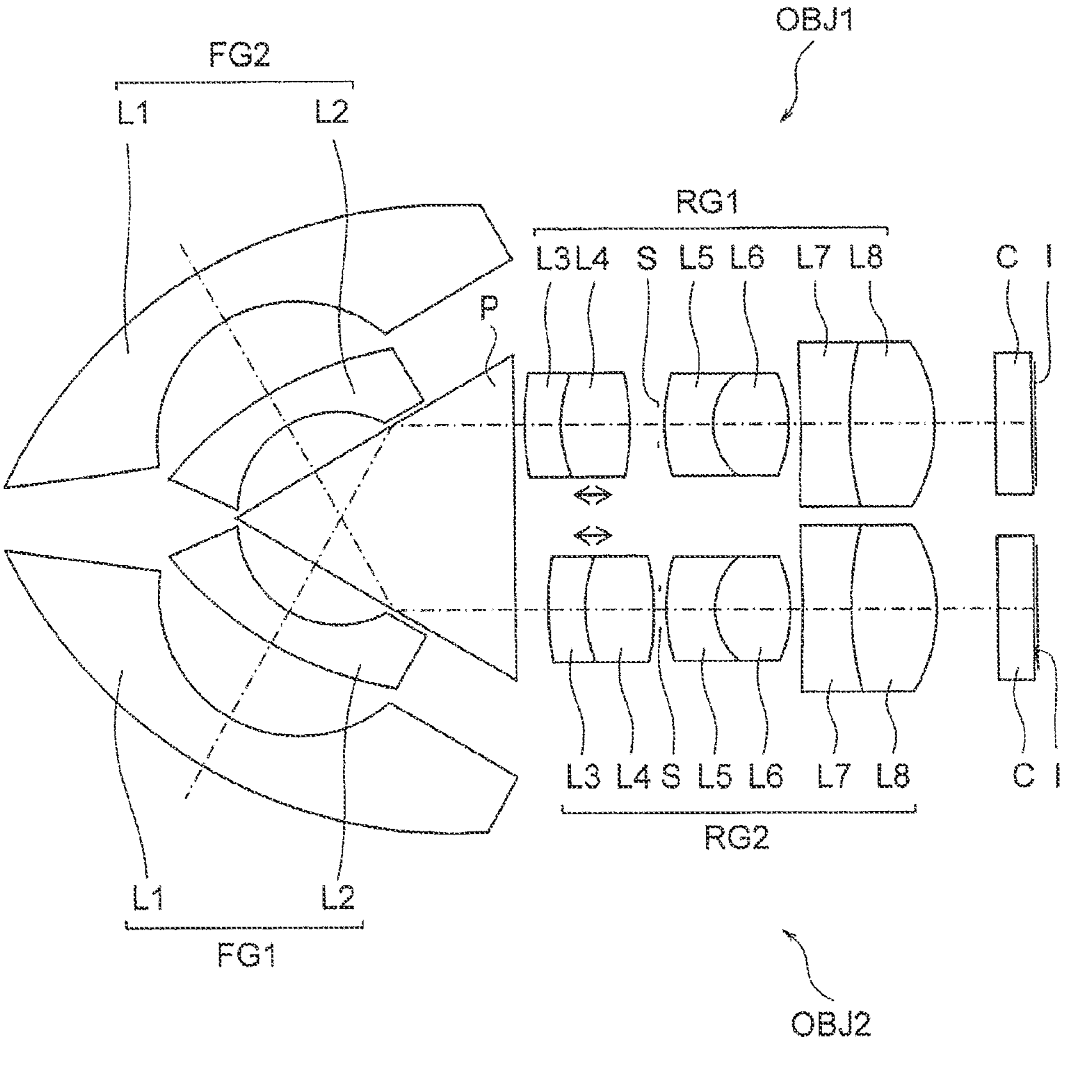
FIG. 16 is a cross-sectional view of a lens arrangement of a wide-angle optical system of an example 8.
Figure 17A:
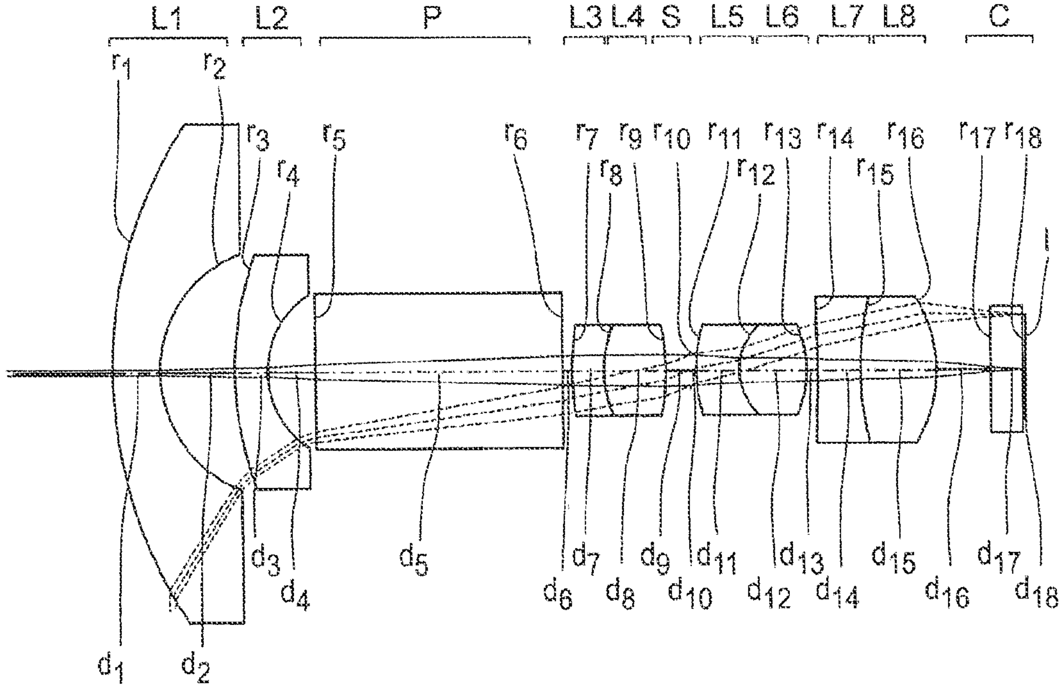
FIG. 17A and FIG. 17B are cross-sectional views of a lens arrangement of the wide-angle optical system of the example 8.
Figure 17B:
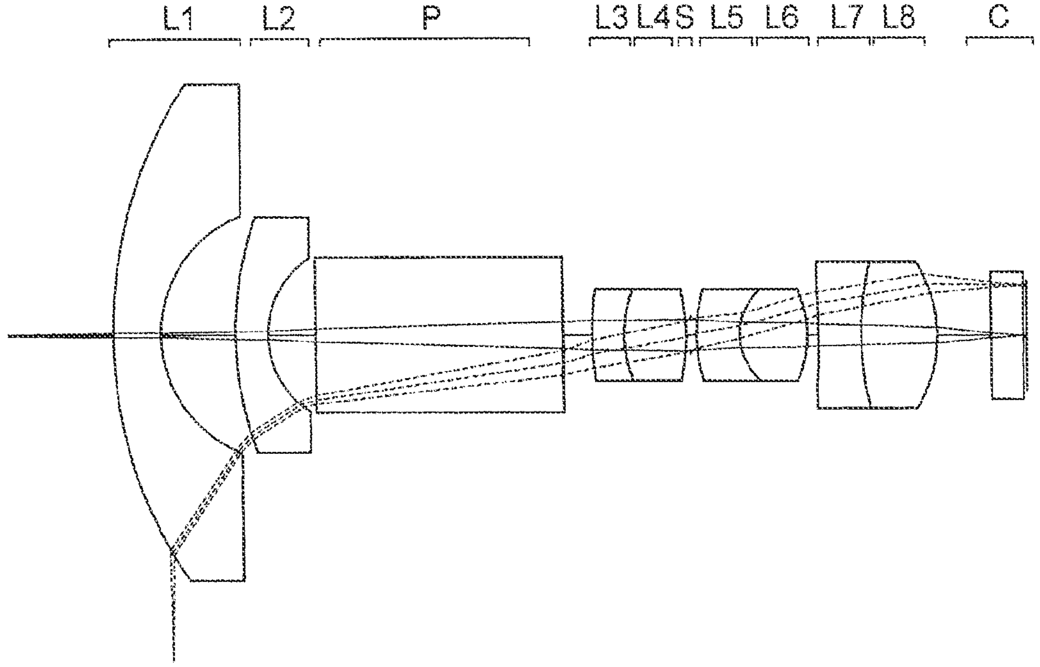

A wide-angle optical system of an example 8 will be described below. FIG. 16, FIG. 17A, and FIG. 17B are cross-sectional views of a lens arrangement of the wide-angle optical system of the example 8. FIG. 17A is cross-sectional view of a lens arrangement at a far point, and FIG. 17B is a cross-sectional view of a lens arrangement at a near point.

FIG. 27A, FIG. 27B, FIG. 27C, FIG. 28A, FIG. 28B, FIG. 28C, FIG. 28D, FIG. 28E, and FIG. 28F are aberration diagrams at the far point of the wide-angle optical system of the example 8.

FIG. 29A, FIG. 29B, FIG. 29C, FIG. 30A, FIG. 30B, FIG. 30C, FIG. 30D, FIG. 30E, and FIG. 30F are aberration diagrams at the near point of the wide-angle optical system of the example 8.

The wide-angle optical system of the example 8 includes a first optical system OBJ1, a second optical system OBJ2, an optical member P, and a cover glass C.

The first optical system OBJ1 includes a first front side lens unit FG1 and a first rear side lens unit RG1. The second optical system OBJ2 includes a second front side lens unit FG2 and a second rear side lens unit RG2.

The first front side lens unit FG1 includes a negative meniscus lens L1 of which a convex surface is directed toward an object side and a negative meniscus lens L2 of which a convex surface is directed toward the object side.

The first rear side lens unit RG1 includes a negative meniscus lens L3 of which a convex surface is directed toward the object side, a biconvex positive lens L4, a negative meniscus lens L5 *h* of which a convex surface is directed toward the object side, a biconvex positive lens L6, a biconcave negative lens L7, and a biconvex positive lens L8.

The negative meniscus lens L3 and the biconvex positive lens L4 are cemented. The negative meniscus lens L5 and the biconvex positive lens L6 are cemented. The biconcave negative lens L7 and the biconvex positive lens L8 are cemented.

The optical member P is disposed between the first front side lens unit FG1 and the first rear side lens unit RG1. The optical member 30 shown in FIG. 2B is used for the optical member P.

An aperture stop S is disposed at an interior of the first rear side lens unit RG1. More specifically, the aperture stop S is disposed between the biconvex positive lens L4 and the negative meniscus lens L5.

The cover glass C is disposed on an image side of the first rear side lens unit RG1. In other words, the cover glass C is disposed between the biconvex positive lens L8 and an image plane I.

At the time of focusing, the negative meniscus lens L3 and the biconvex positive lens L4 move along an axis of rotational symmetry. More specifically, at the time of focusing from a far point to a near point, the negative meniscus lens L3 and the biconvex positive lens L4 move toward the image side.

Figure 18:
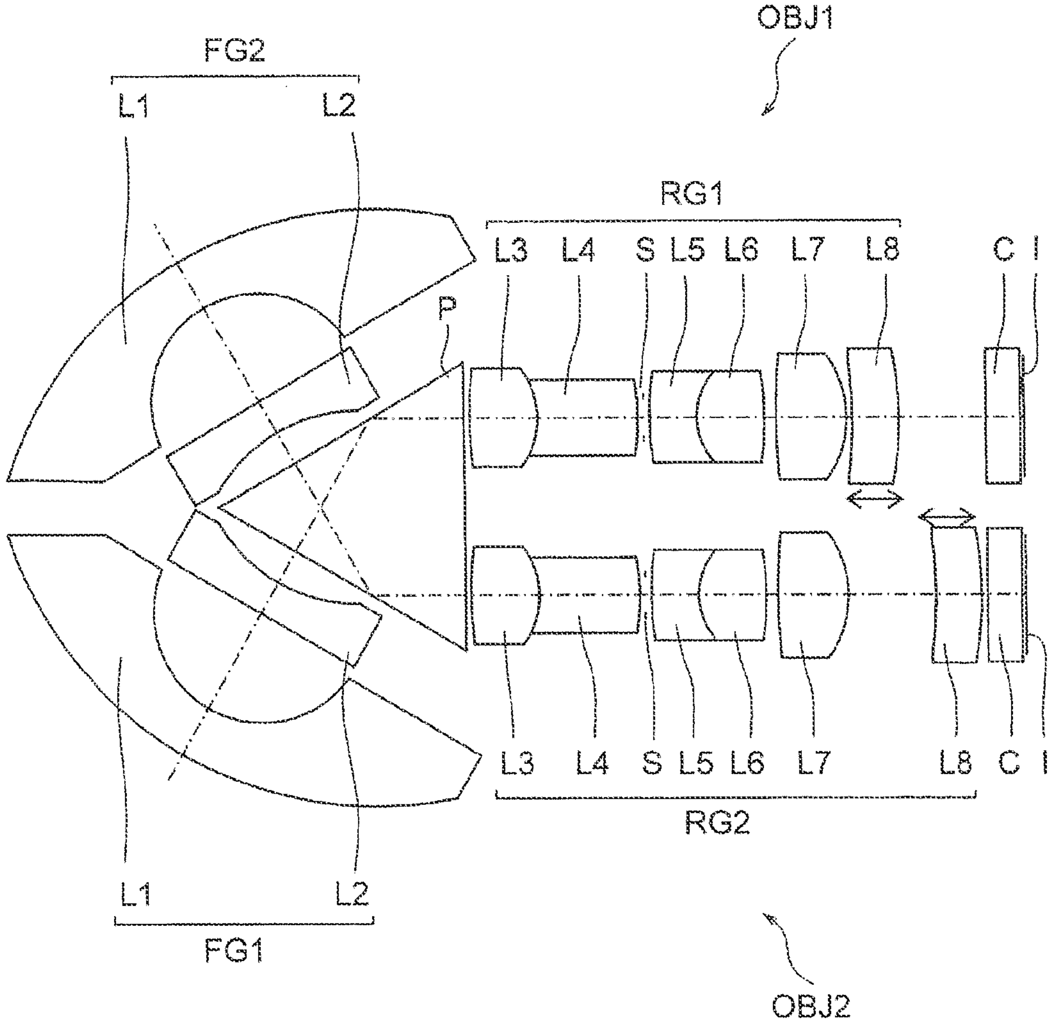
FIG. 18 is a cross-sectional view of a lens arrangement of a wide-angle optical system of an example 9.
Figure 19A:
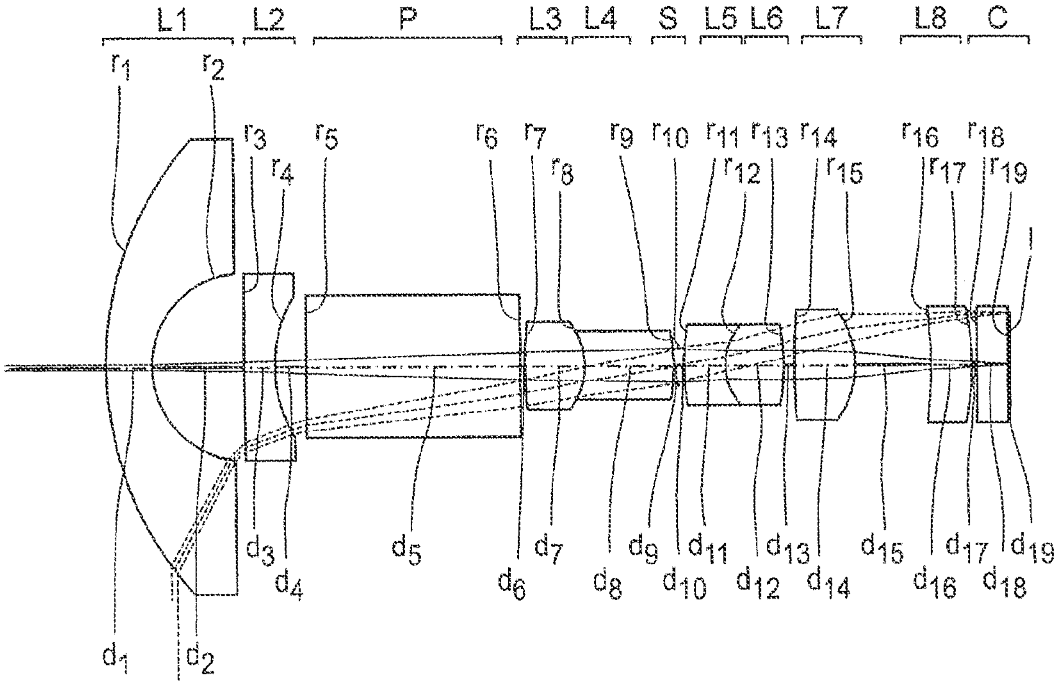
FIG. 19A and FIG. 19B are cross-sectional views of a lens arrangement of the wide-angle optical system of the example 9.
Figure 19B:
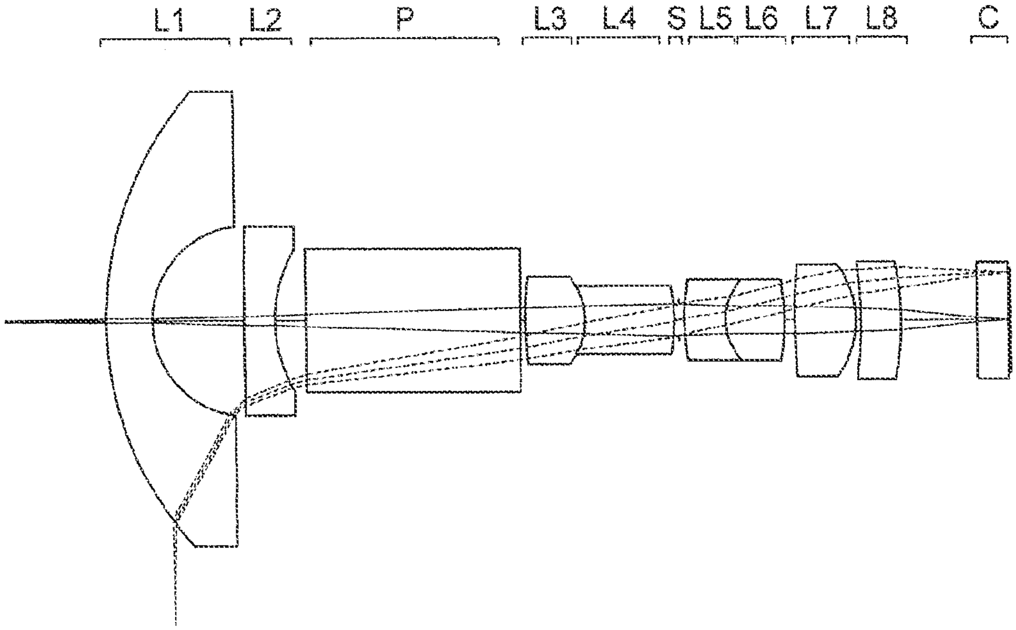

A wide-angle optical system of an example 9 will be described below. FIG. 18, FIG. 19A, and FIG. 19B cross-sectional views of a lens arrangement of the wide-angle optical system of the example 9. FIG. 19A is a cross-sectional view of a lens arrangement for a far point and FIG. 19B is a cross-sectional view of a lens arrangement for a near point.

FIG. 31A, FIG. 31B, FIG. 31C, FIG. 32A, FIG. 32B, FIG. 32C, FIG. 32D, FIG. 32E, and FIG. 32F are aberration diagrams for a far point of the wide-angle optical system of the example 9.

FIG. 33A, FIG. 33B, FIG. 33C, FIG. 34A, FIG. 34B, FIG. 34C, FIG. 34D, FIG. 34E, and FIG. 34F are aberration diagrams for a near point of the wide-angle optical system of the example 9.

The wide-angle optical system of the example 9 includes a first optical system OBJ1, a second optical system OBJ2, an optical member P, and a cover glass C.

The first optical system OBJ1 includes a first front side lens unit FG1 and a first rear side lens unit RG1. The second optical system OBJ2 includes a second front side lens unit FG2 and a second rear side lens unit RG2.

The first front side lens unit FG1 includes a negative meniscus lens L1 of which a convex surface is directed toward an object side and a negative meniscus lens L2 of which a convex surface is directed toward the object side.

The first rear side lens unit RG1 include a biconvex positive lens L3, a negative meniscus lens L4 of which a convex surface is directed toward an image side, a negative meniscus lens L5 of which a convex surface is directed toward the object side, a biconvex positive lens L6, a biconcave negative lens L7, and a positive meniscus lens L8 of which a convex surface is directed toward the image side.

The biconvex positive lens L3 and the negative meniscus lens L4 are cemented. The negative meniscus lens L5 and the biconvex positive lens L6 are cemented.

The optical member P is disposed between the first front side lens unit FG1 and the first rear side lens unit RG1. The optical member 30 shown in FIG. 2B is used for the optical member P.

An aperture stop S is disposed at an interior of the first rear side lens unit RG1. More specifically, the aperture stop S is disposed between the negative meniscus lens L4 and the negative meniscus lens L5.

The cover glass C is disposed on the image side of the first rear side lens unit RG1. In other words, the cover glass C is disposed between the meniscus lens L8 having a positive refractive power and an image plane I.

At the time of focusing, the positive meniscus lens L8 moves along an axis of rotational symmetry. More specifically, at the time of focusing from a far point to a near point, the positive meniscus lens L8 moves toward the object side.

Figure 20A:
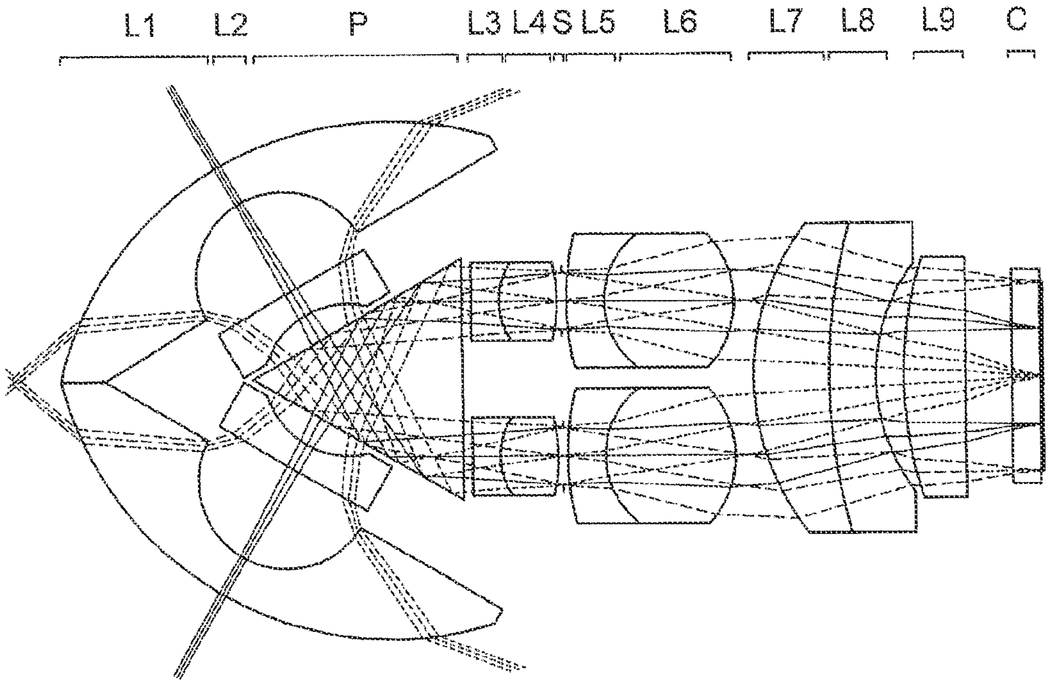
FIG. 20A and FIG. 20B are cross-sectional views of a lens arrangement of a wide-angle optical system of an example 10.
Figure 20B:
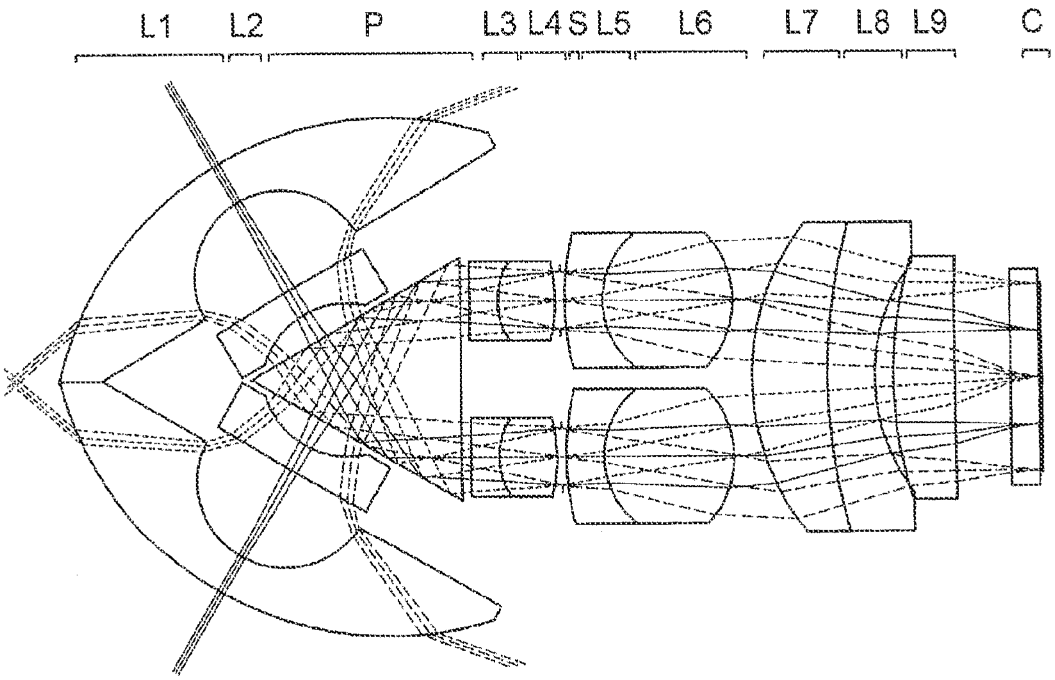

A wide-angle optical system of an example 10 will be described below. FIG. 20A and FIG. 20B are cross-sectional views of a lens arrangement of the wide-angle optical system of the example 10. FIG. 20A is a cross-sectional view of a lens arrangement for a far point and FIG. 20B is a cross-sectional view of a lens arrangement for a near point.

FIG. 35A, FIG. 35B, FIG. 35C, FIG. 36A, FIG. 36B, FIG. 36C, FIG. 36D, FIG. 36E, and FIG. 36F are aberration diagrams for a far point of the wide-angle optical system of the example 10.

FIG. 37A, FIG. 37B, FIG. 37C, FIG. 38A, FIG. 38B, FIG. 38C, FIG. 38D, FIG. 38E, and FIG. 38F are aberration diagrams for a near point of the wide-angle optical system of the example 10.

The wide-angle optical system of the example 10 being same as the optical system of the example 1, a description in detail will be omitted. In the wide-angle optical system of the example 10, at the time of focusing, the positive meniscus lens L9 moves along an axis of rotational symmetry. More specifically, at the time of focusing from a far point to a near point, the positive meniscus lens L9 moves toward the object side.

Figure 21:
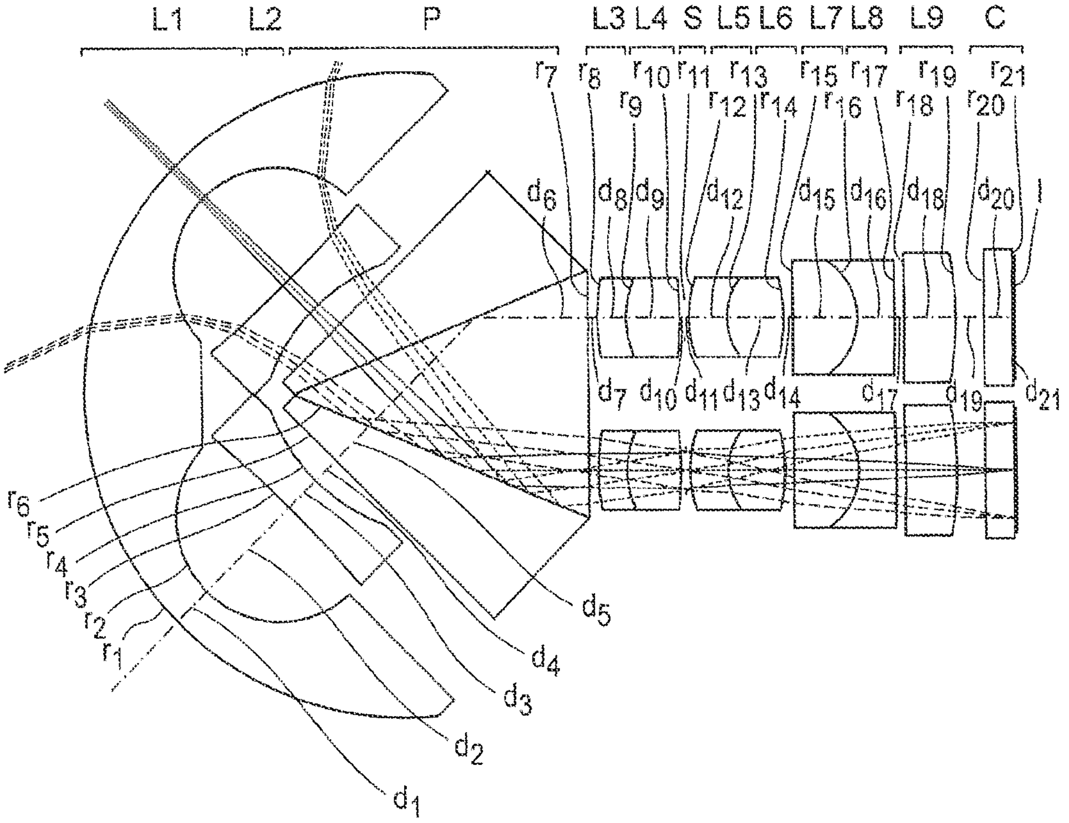
FIG. 21 is a cross-sectional view of a lens arrangement of a wide-angle optical system of an example 11.

A wide-angle optical system of an example 11 will be described below. FIG. 21 is a cross-sectional view of a lens arrangement of the wide-angle optical system of the example 11.

The wide-angle optical system of the example 11 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a biconcave negative lens L2.

The first rear side lens unit includes a negative meniscus lens L3 of which a convex surface is directed toward the object side, a biconvex positive lens L4, a negative meniscus lens L5 of which a convex surface is directed toward the object side, a biconvex positive lens L6, a positive meniscus lens L7 of which a convex surface is directed toward an image side, a negative meniscus lens L8 of which a convex surface is directed toward the image side, and a positive meniscus lens L9 of which a convex surface is directed toward the image side.

The negative meniscus lens L3 and the biconvex positive lens L4 are cemented. The negative meniscus lens L5 and the biconvex positive lens L6 are cemented. The positive meniscus lens L7 and the negative meniscus lens L8 are cemented.

The optical member P is disposed between the first front side lens unit and the first rear side lens unit. The optical member 50 shown in FIG. 3 is used for the optical member P.

An aperture stop S is disposed at an interior of the first rear side lens unit. More specifically, the aperture stop S is disposed between the biconvex positive lens L4 and the negative meniscus lens L5.

The cover glass C is disposed on the image side of the first rear side lens unit. In other words, the cover glass C is disposed between the positive meniscus lens L9 and an image plane I.

The negative meniscus lens L1 is used in both the first front side lens unit and the second front side lens unit. In the wide-angle optical system of the example 11, an object-side surface of the negative meniscus lens L1 in the first front side lens unit and an object-side surface of the negative meniscus lens L1 in the second front side lens unit are made one spherical surface.

Figure 22:
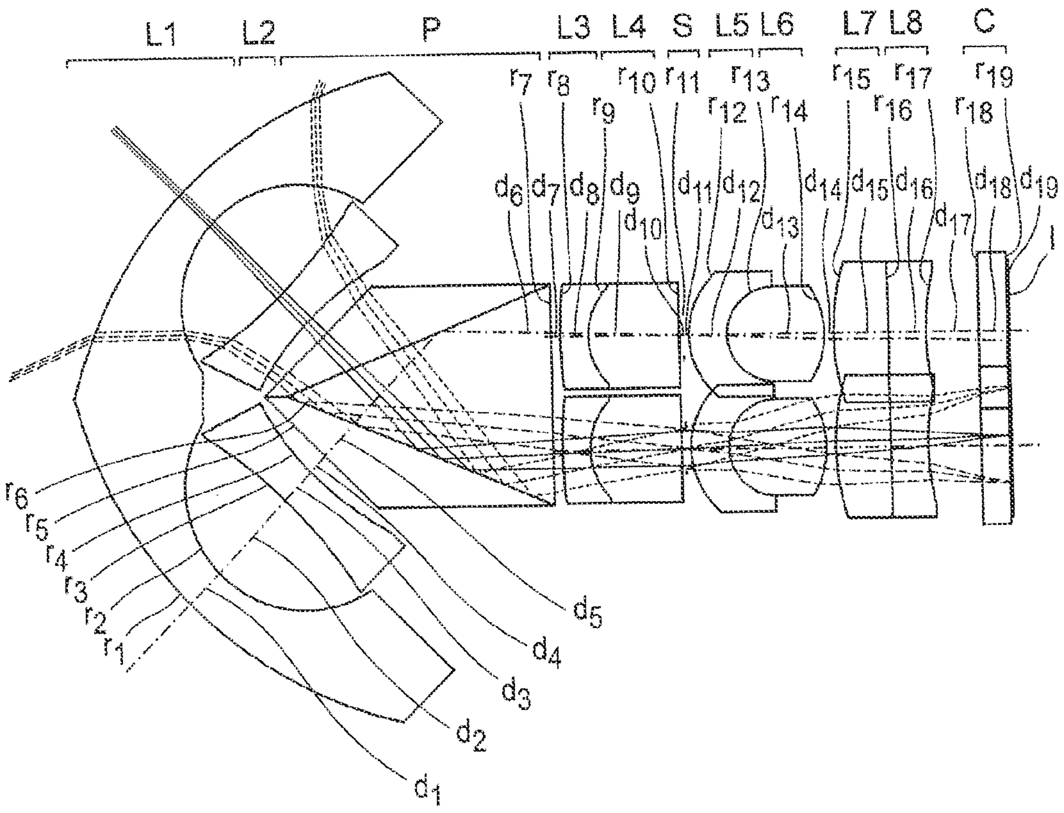
FIG. 22 is a cross-sectional view of a lens arrangement of a wide-angle optical system of an example 12.

A wide-angle optical system of an example 12 will be described below. FIG. 22 is a cross-sectional view of a lens arrangement of the wide-angle optical system of the example 12.

The wide-angle optical system of the example 12 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a biconcave negative lens L2.

The first rear side lens unit includes a negative meniscus lens L3 of which a convex surface is directed toward the object side, a positive meniscus lens L4 of which a convex surface is directed toward the object side, a negative meniscus lens L5 of which a convex surface is directed toward the object side, a biconvex positive lens L6, a biconvex positive lens L7, and a biconcave negative lens L8.

The negative meniscus lens L3 and the positive meniscus lens L4 are cemented. The negative meniscus lens L5 and the biconvex positive lens L6 are cemented. The biconvex positive lens L7 and the biconcave negative lens L8 are cemented.

The optical member P is disposed between the first front side lens unit and the first rear side lens unit. The optical member 50 shown in FIG. 3 is used for the optical member P.

An aperture stop S is disposed at an interior of the first rear side lens unit. More specifically, the aperture stop S is disposed between the positive meniscus lens L4 and a negative meniscus lens L5.

The cover glass C is disposed on an image side of the first rear side lens unit. In other words, the cover glass C is disposed between the biconcave negative lens L8 and an image plane I.

An axis of rotational symmetry of the front side lens unit and an axis of rotational symmetry of the rear side lens unit are optically coaxial. In the wide-angle optical system of the example 12, the two optically coaxial axes of rotational symmetry are shifted. Accordingly, it is possible to narrow a distance between two optical images. As a result, it is possible to use an image pickup surface of an image sensor efficiently.

In the wide-angle optical system of the example 12, on the image plane, the axis of rotational symmetry of the front side lens unit is 0.4 mm closer with respect to the axis of rotational symmetry of the rear side lens unit.

Figure 23A:
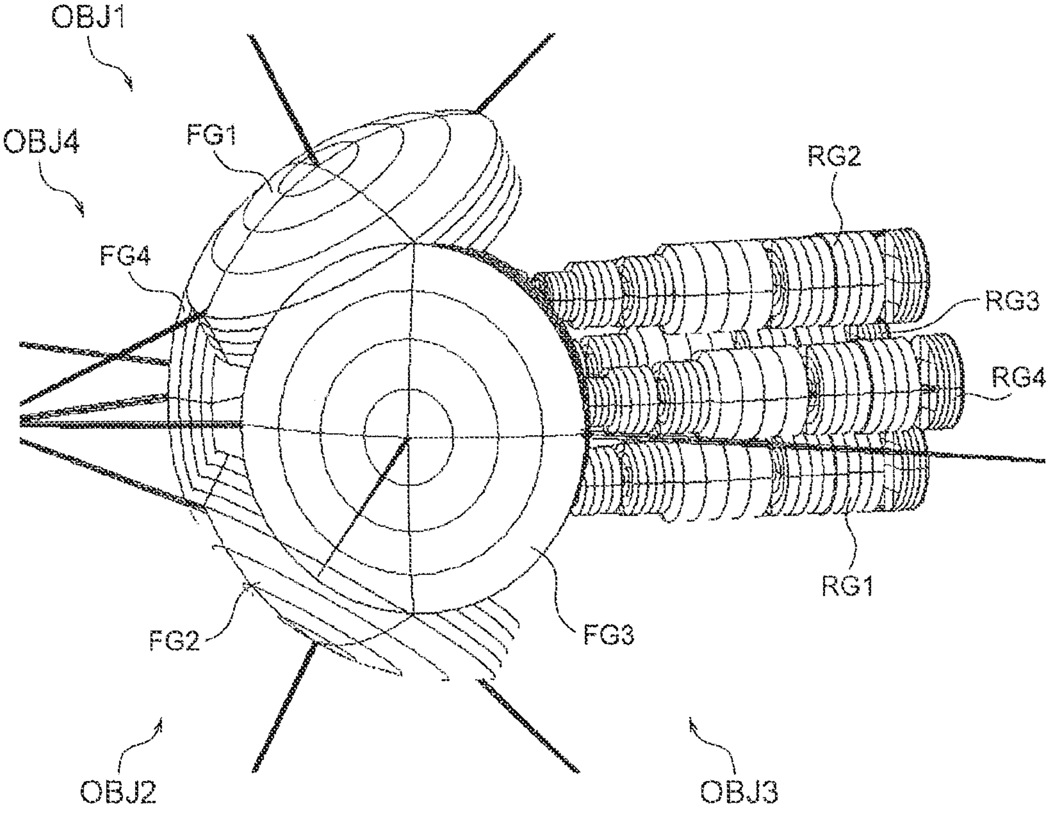
FIG. 23A and FIG. 23B are perspective views of a lens arrangement of a wide-angle optical system of an example 13.
Figure 23B:
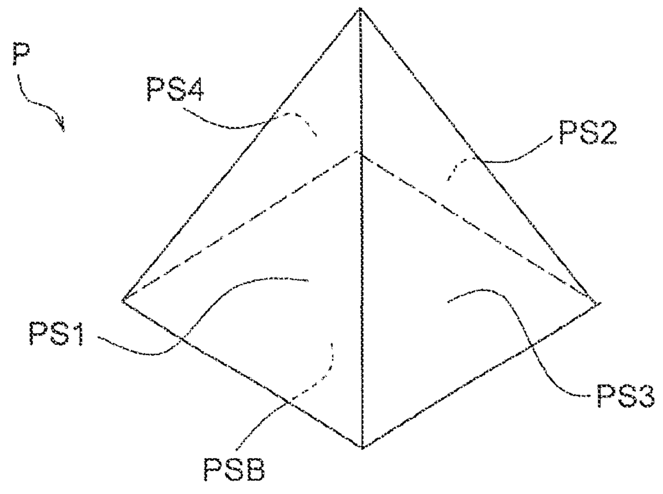
Figure 24:
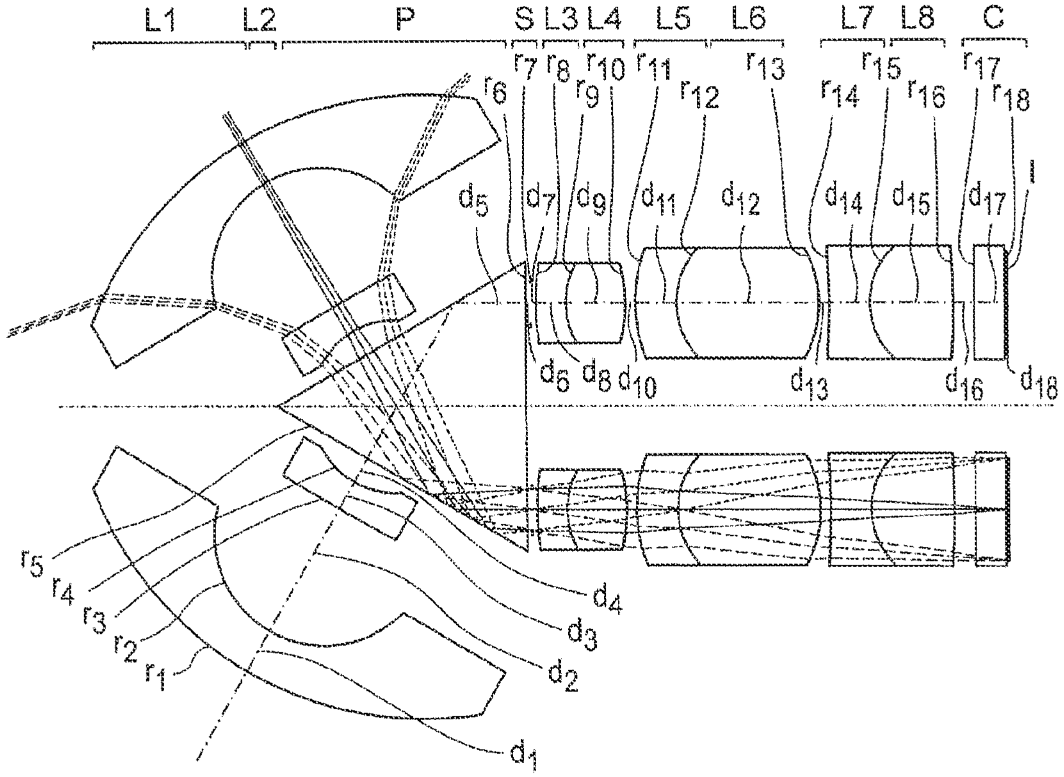
FIG. 24 is a cross-sectional view of a lens arrangement of the wide-angle optical system of the example 13.

The wide-angle optical system of the example 13 will be described below. FIG. 23A and FIG. 23B are schematic diagrams of the wide-angle optical system of the example 13. FIG. 23A is a perspective view and FIG. 23B is a diagram showing a prism. FIG. 24 is a cross-sectional view of a lens arrangement.

The wide-angle optical system of the example 13 includes a first optical system OBJ1, a second optical system OBJ2, a third optical system OBJ3, a fourth optical system OBJ4, an optical member P, and a cover glass C.

The first optical system OBJ1 includes a first front side lens unit FG1 and a first rear side lens unit RG1. The second optical system OBJ2 includes a second front side lens unit FG2 and a second rear side lens unit RG2. The third optical system OBJ3 includes a third front side lens unit FG3 and a third rear side lens unit RG3. The fourth optical system OBJ4 includes a fourth front side lens unit FG4 and a fourth rear side lens unit RG4.

The first front side lens unit FG1 includes a negative meniscus lens L1 of which a convex surface is directed toward an object side and a negative meniscus lens L2 of which a convex surface is directed toward the object side.

The first rear side lens unit RG1 includes a negative meniscus lens L3 of which a convex surface is directed toward the object side, a biconvex positive lens L4, a negative meniscus lens L5 of which a convex surface is directed toward the object side, a biconvex positive lens L6, a biconcave negative lens L7, and a biconvex positive lens L8.

The negative meniscus lens L3 and the biconvex positive lens L4 are cemented. The negative meniscus lens L5 and the biconvex positive lens L6 are cemented. The biconcave negative lens L7 and the biconvex positive lens L8 are cemented.

The optical member P is disposed between the first front side lens unit FG1 and the first rear side lens unit RG1. A shape of the optical member P is a regular quadrangular pyramid shape as shown in FIG. 23B.

The optical member P has an inclined surface PS1, an inclined surface PS2, an inclined surface PS3, and an inclined surface PS4. A pair of inclined surfaces is formed by the inclined surface PS1 and the inclined surface PS2. A pair of inclined surfaces is formed by the inclined surface PS3 and the inclined surface PS4. The four inclined surfaces are in contact with a bottom surface PSB.

An aperture stop S is disposed on the object side of the first rear side lens unit FG1. More specifically, the aperture stop S is disposed between the optical member P and the negative meniscus lens L3.

The cover glass C is disposed on an image side of the first rear side lens unit RG1. In other words, the cover glass C is disposed between the biconvex positive lens L8 and an image plane I.

In the wide-angle optical system of the example 13, a regular quadrangular pyramid shaped prism with inclined surfaces making an angle of 60° is used for the optical member P. Therefore, in the wide-angle optical system of the example 13, the front side lens units and the rear side lens units are disposed in each of four optical paths.

The wide-angle optical system of the example 13 includes two pairs of optical systems. In other words, the wide-angle optical system of the example 13 includes two pairs of the front side lens units, two pairs of the rear side lens units, and two pairs of the inclined surfaces.

The first optical system OBJ1 and the second optical system OBJ2 make one pair. The third optical system OBJ3 and the fourth optical system OBJ4 make one pair. The first front side lens unit FG1 and the second front side lens unit FG2 make one pair. The third front side lens unit FG3 and the fourth front side lens unit FG4 make one pair.

The first rear side lens unit RG1 and the second rear side lens unit RG2 make one pair. The third rear side lens unit RG3 and the fourth rear side lens unit RG4 make one pair. The inclined surface PS1 and the inclined surface PS2 make one pair. The inclined surface PS3 and the inclined surface PS4 make one pair.

Since the wide-angle optical system of the example 13 includes two pairs of optical systems, it has two pairs of optical paths, or in other words, four optical paths.

The number of the pair of optical systems is not restricted to two. The wide-angle optical system may include three pairs of optical systems for instance. In this case, the wide-angle optical system has three pairs of optical paths, or in other words, six optical paths.

Figure 25:
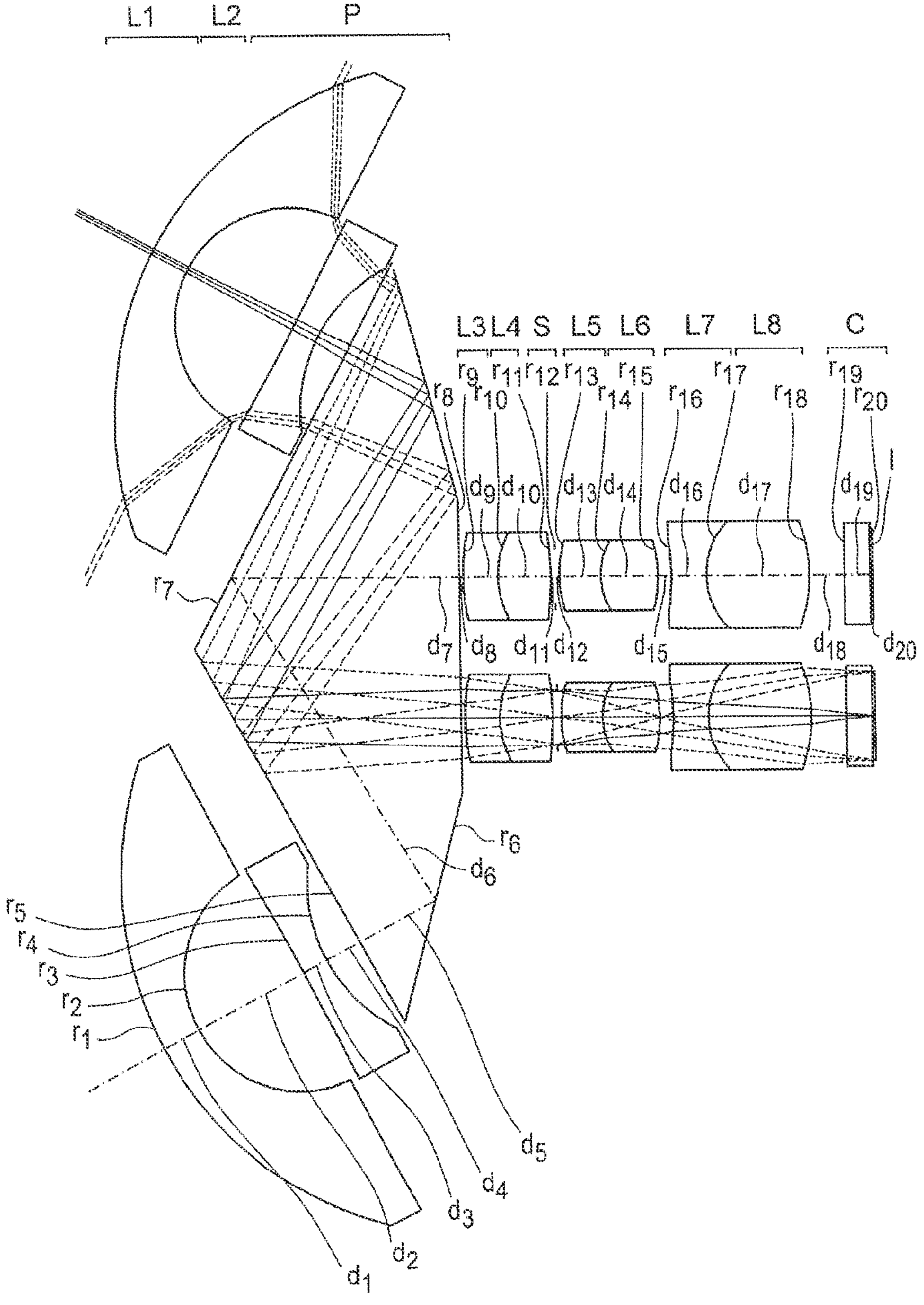
FIG. 25 is a cross-sectional view of a lens arrangement of a wide-angle optical system of an example 14.
Figure 39A:
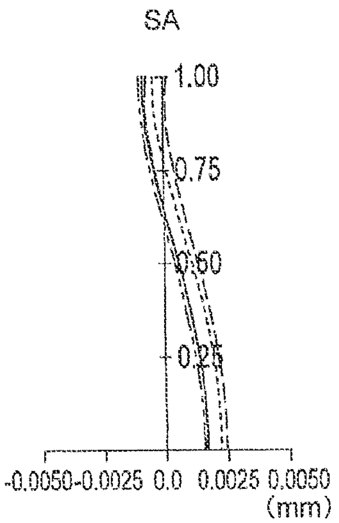
FIG. 39A, FIG. 39B, and FIG. 39C are aberration diagrams of the wide-angle optical system of the example 14.
Figure 39B:
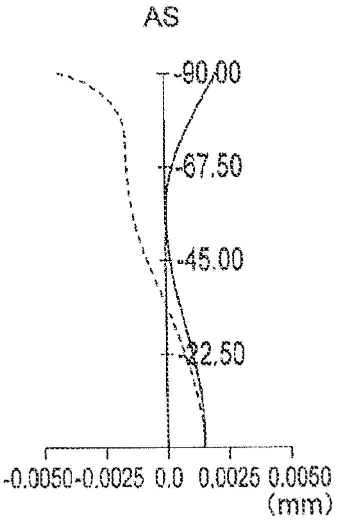
Figure 39C:
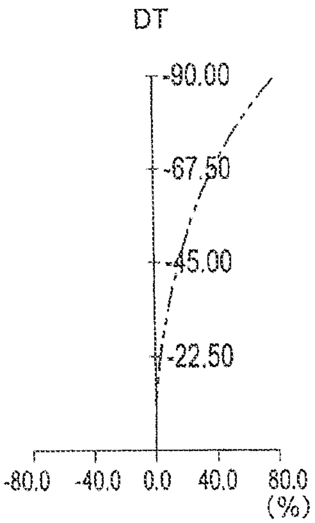

A wide-angle optical system of an example 14 will be described below. FIG. 25 is a cross-sectional view of a lens arrangement of the wide-angle optical system of the example 14. FIG. 39A, FIG. 39B, and FIG. 39C are aberration diagrams of the wide-angle optical system of the example 14.

The wide-angle optical system of the example 14 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a biconcave negative lens L2.

The first rear side lens unit includes a negative meniscus lens L3 of which a convex surface is directed toward the object side, a biconvex positive lens L4, a negative meniscus lens L5 of which a convex surface is directed toward the object side, a biconvex positive lens L6, a biconcave negative lens L7, and a biconvex positive lens L8.

The negative meniscus lens L3 and the biconvex positive lens L4 are cemented. The negative meniscus lens L5 and the biconvex positive lens L6 are cemented. The biconcave negative lens L7 and the biconvex positive lens L8 are cemented.

The optical member P is disposed between the first front side lens unit and the first rear side lens unit. An optical member having a pair of inclined surfaces, a pair of side surfaces, and a bottom surface is used for the optical member P.

An aperture stop S is disposed at an interior of the first rear side lens unit. More specifically, the aperture stop S is disposed between the biconvex positive lens L4 and the negative meniscus lens L5.

The cover glass C is disposed on an image side of the first rear side lens unit. In other words, the cover glass C is disposed between the biconvex positive lens L8 and an image plane I.

In the wide-angle optical system of the example 14, the pair of inclined surfaces is facing the front side lens unit. A pair of intermediate surfaces is located on the image side of the pair of inclined surfaces. The pair of intermediate surfaces is in contact with the bottom surface.

Lights emerged from the front side lens units are incident on the pair of inclined surfaces. Lights incident on the pair of inclined surfaces are transmitted through the pair of inclined surfaces, and reach the pair of intermediate surfaces. The pair of intermediate surfaces has a reflection effect. Lights that have reached the pair of intermediate surfaces are reflected toward the pair of inclined surfaces. Lights intersect while traveling from the pair of intermediate surfaces to the pair of inclined surfaces.

Lights that have reached the pair of inclined surfaces, after being reflected at the pair of inclined surfaces, are directed toward the bottom surface. Lights that have reached the bottom surface are transmitted through the bottom surface. Lights that have transmitted through the bottom surface are incident on the rear side lens units.

A light ray emerged from a center of a field of view and passing through an aperture stop is set to be a central principal light ray. In the wide-angle optical system of the example 14, an inclination of the intermediate surface with respect to the central principal light ray is 43°, and an inclination of the inclined surface with respect to the central principal light ray is 29°.

Figure 26:
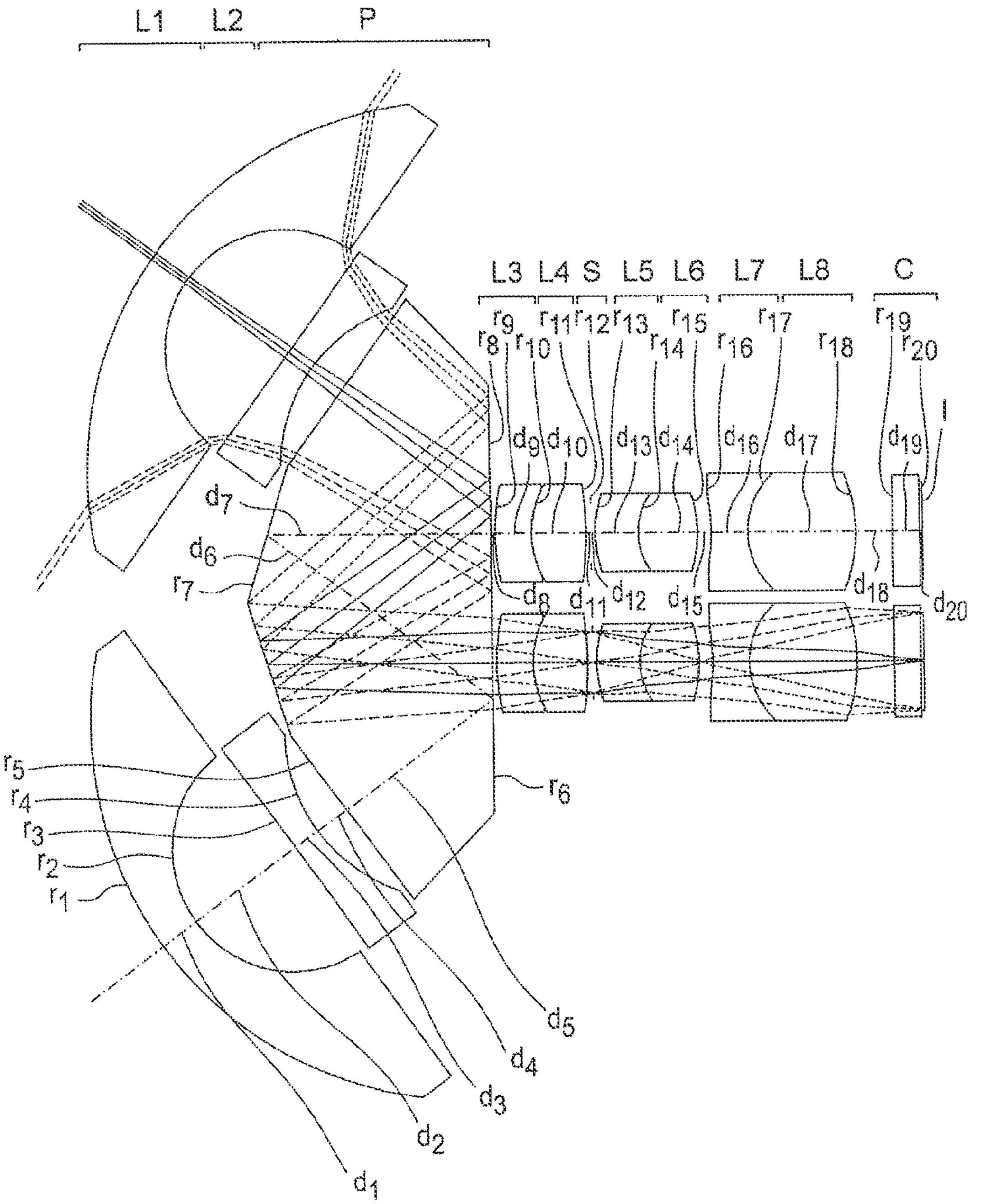
FIG. 26 is a cross-sectional view of a lens arrangement of a wide-angle optical system of an example 15.
Figures 27A, 27B, 27C:
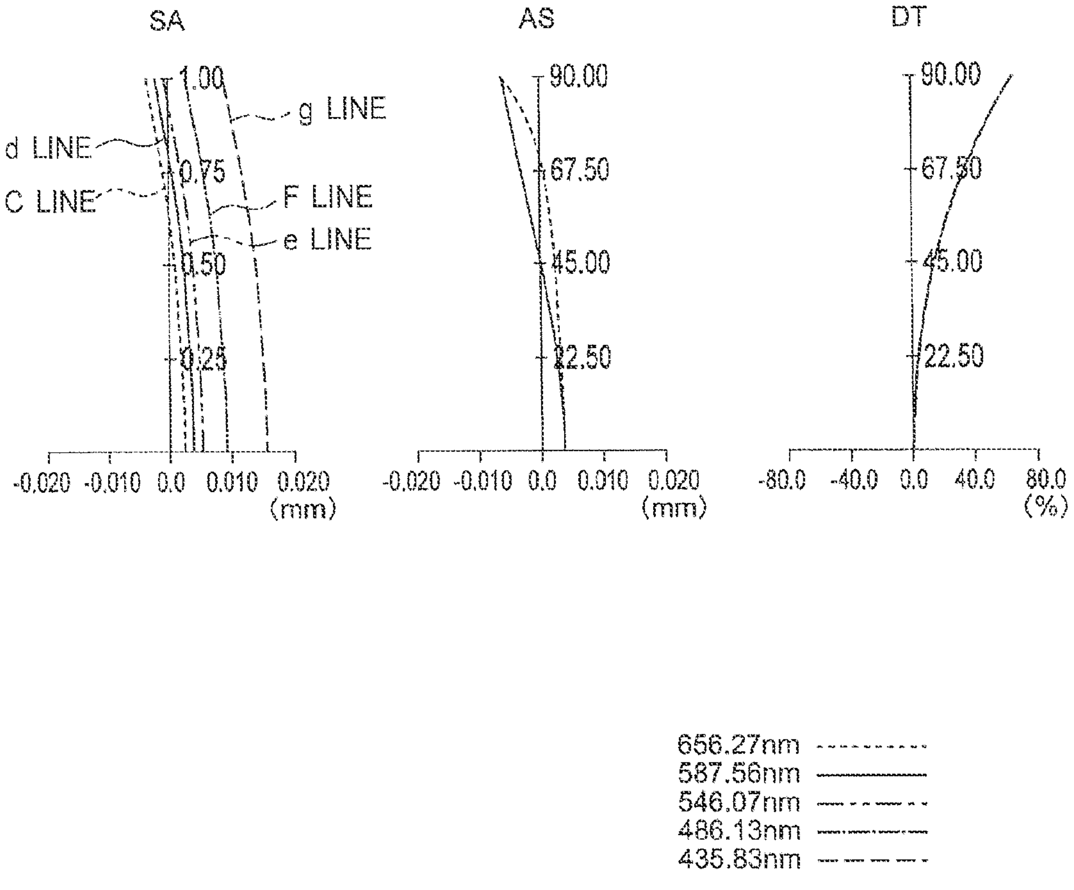
FIG. 27A, FIG. 27B, and FIG. 27C are aberration diagrams of the wide-angle optical system of the example 8.
Figure 28A:
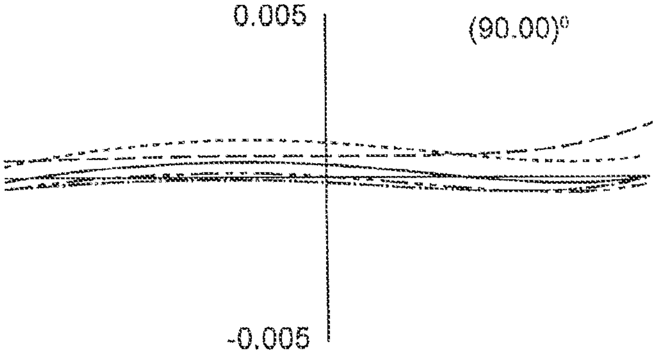
FIG. 28A, FIG. 28B, FIG. 28C, FIG. 28D, FIG. 28E, and FIG. 28F are aberration diagrams of the wide-angle optical system of the example 8.
Figure 28D:
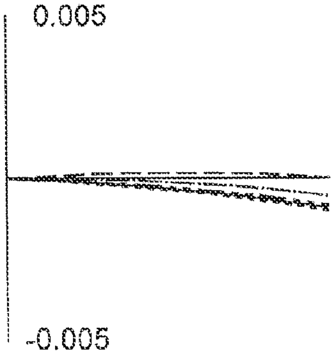
Figure 28B:
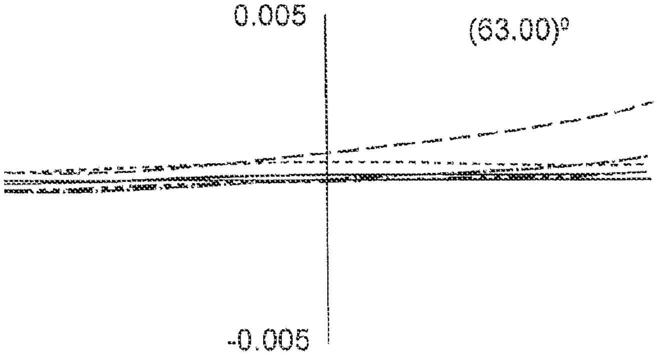
Figure 28E:
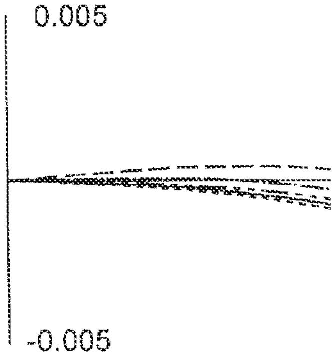
Figure 28C:
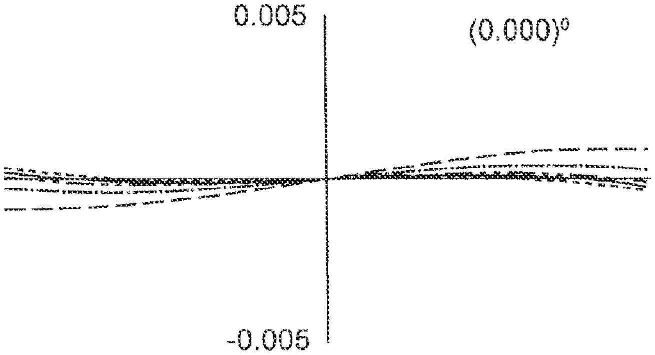
Figure 28F:
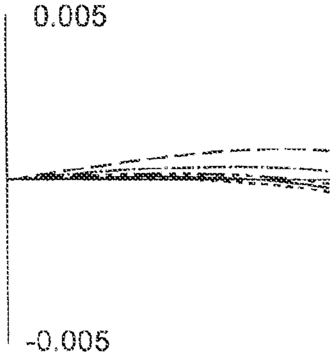
Figures 29A, 29B, 29C:
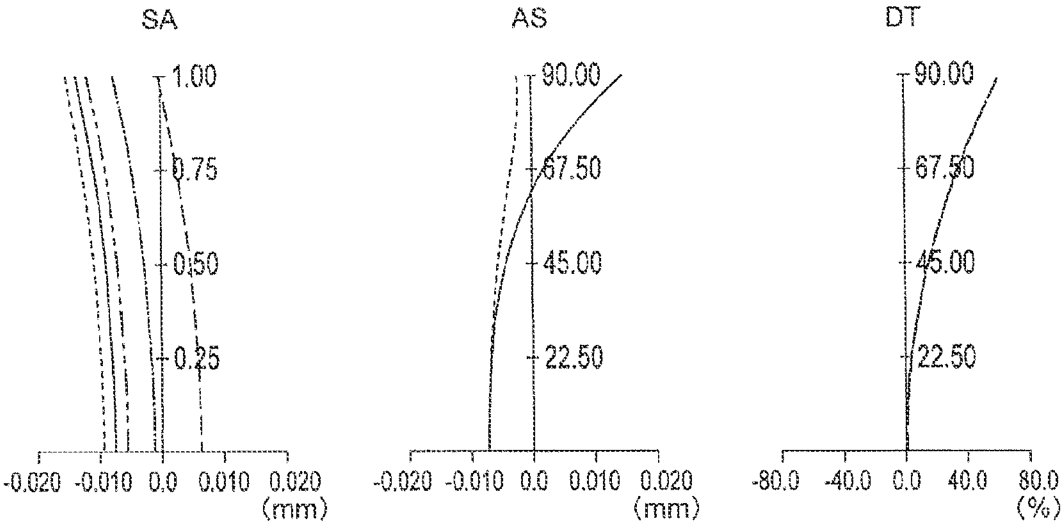
FIG. 29A, FIG. 29B, and FIG. 29C are aberration diagrams of the wide-angle optical system of the example 8.
Figure 30A:
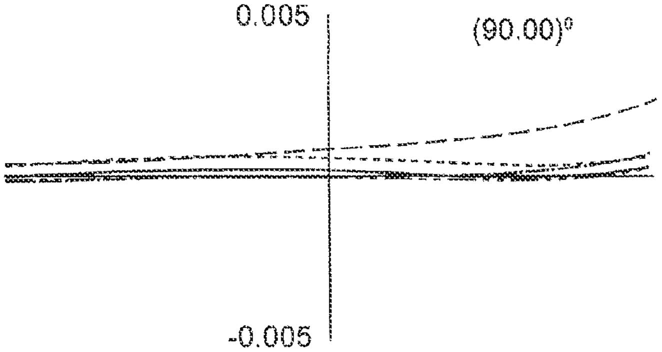
FIG. 30A, FIG. 30B, FIG. 30C, FIG. 30D, FIG. 30E, and FIG. 30F are aberration diagrams of the wide-angle optical system of the example 8.
Figure 30D:
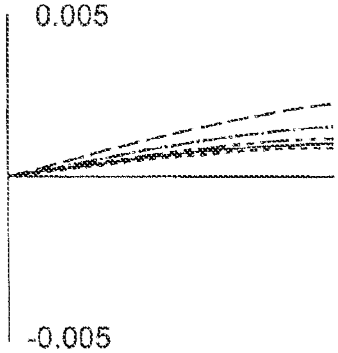
Figure 30B:
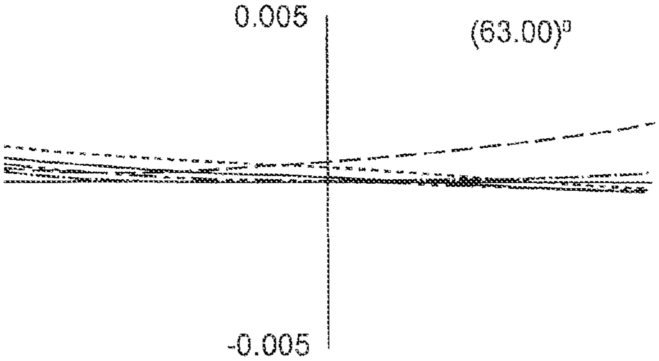
Figure 30E:
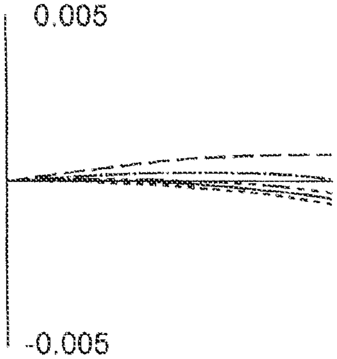
Figure 30C:
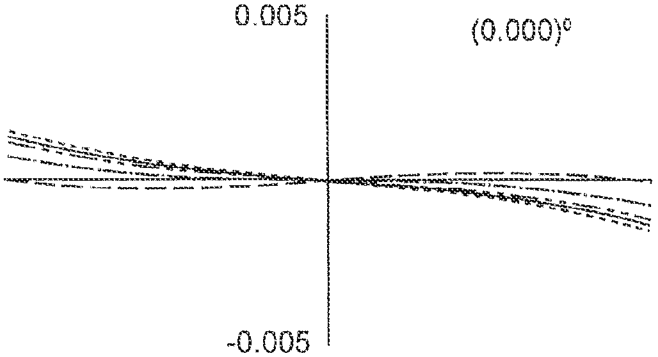
Figure 30F:
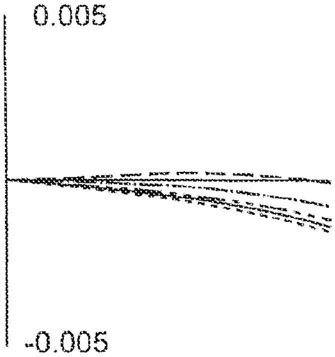
Figure 31A:
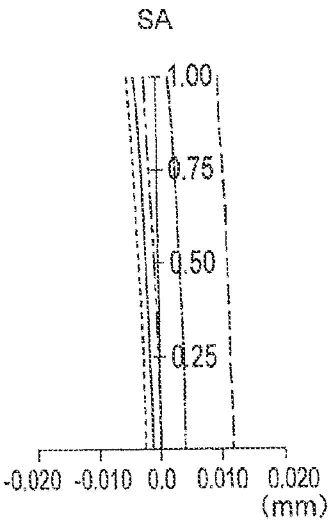
FIG. 31A, FIG. 31B, and FIG. 31C are aberration diagrams of the wide-angle optical system of the example 9.
Figure 31B:
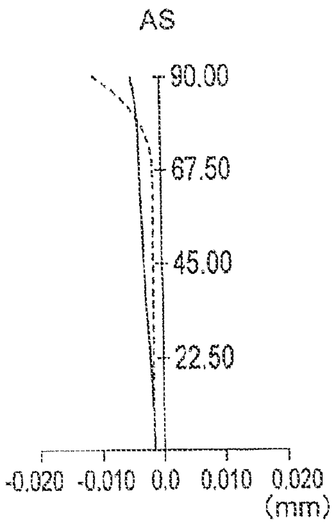
Figure 31C:
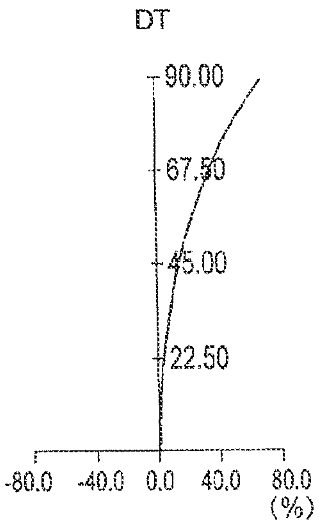
Figure 32A:
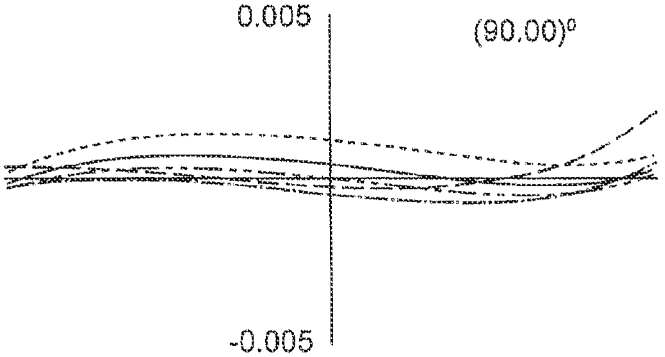
FIG. 32A, FIG. 32B, FIG. 32C, FIG. 32D, FIG. 32E, and FIG. 32F are aberration diagrams of the wide-angle optical system of the example 9.
Figure 32D:
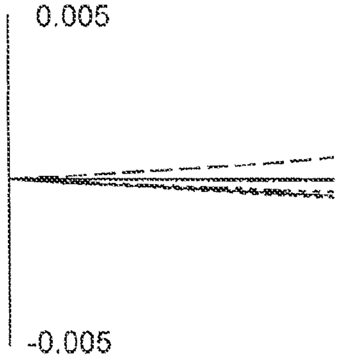
Figure 32B:
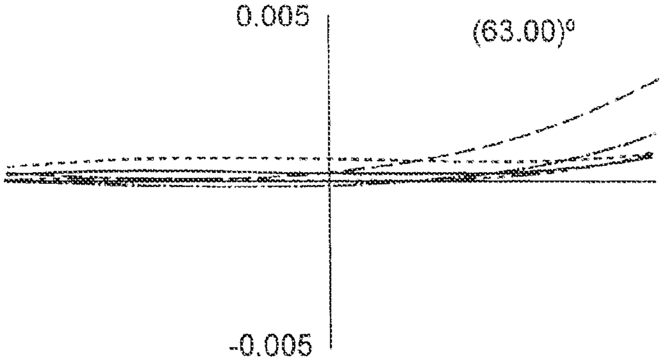
Figure 32E:
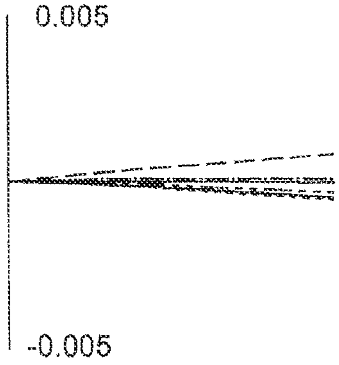
Figure 32C:
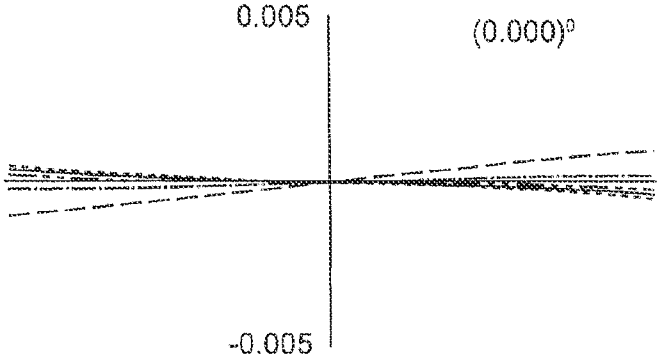
Figure 32F:
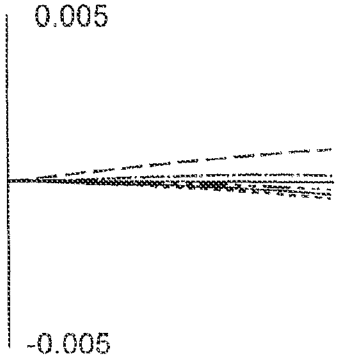
Figure 33A:
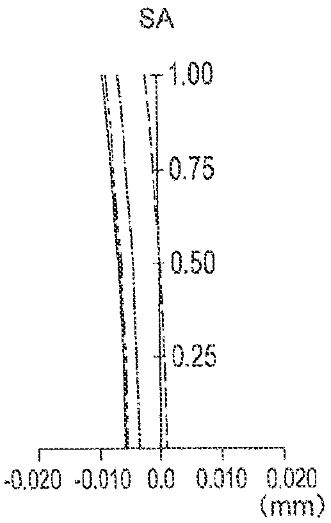
FIG. 33A, FIG. 33B, and FIG. 33C are aberration diagrams of the wide-angle optical system of the example 9.
Figure 33B:
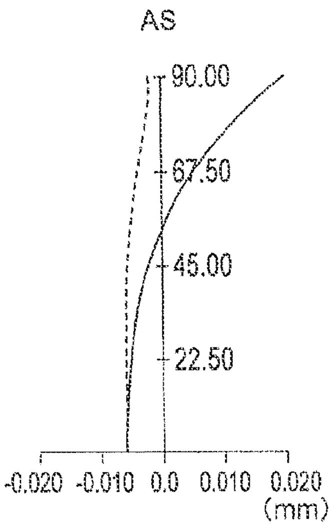
Figure 33C:
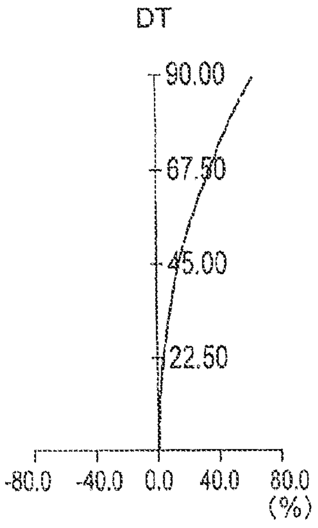
Figure 34A:
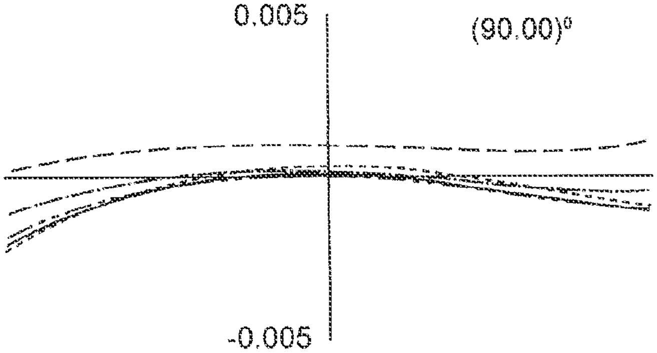
FIG. 34A, FIG. 34B, FIG. 34C, FIG. 34D, FIG. 34E, and FIG. 34F are aberration diagrams of the wide-angle optical system of the example 9.
Figure 34D:
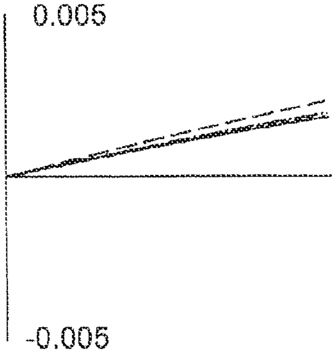
Figure 34B:
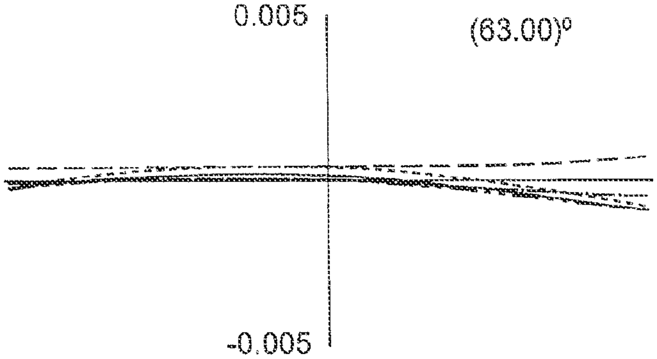
Figure 34E:
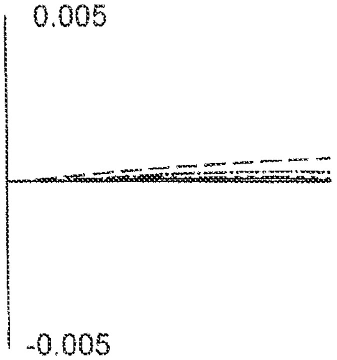
Figure 34C:
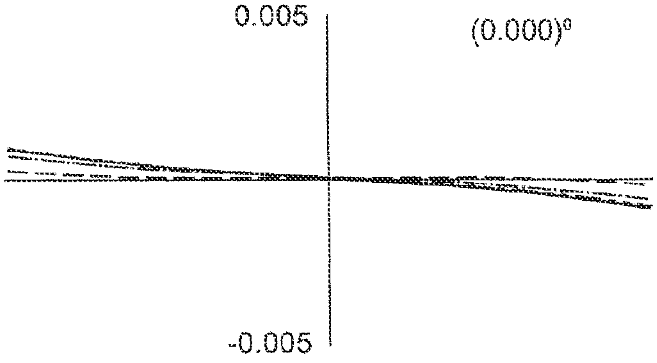
Figure 34F:
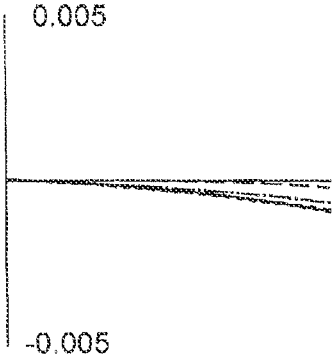
Figure 35A:
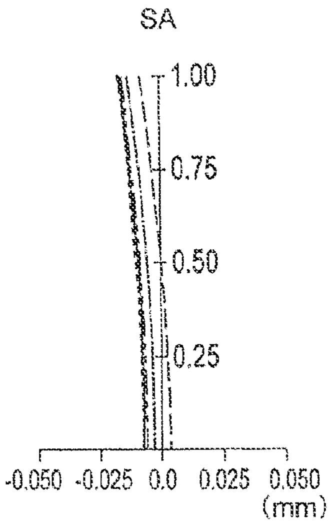
FIG. 35A, FIG. 35B, and FIG. 35C are aberration diagrams of the wide-angle optical system of the example 10.
Figure 35B:
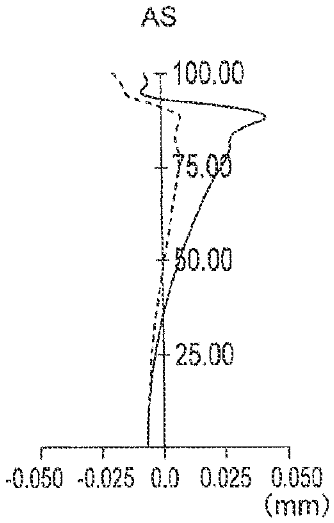
Figure 35C:
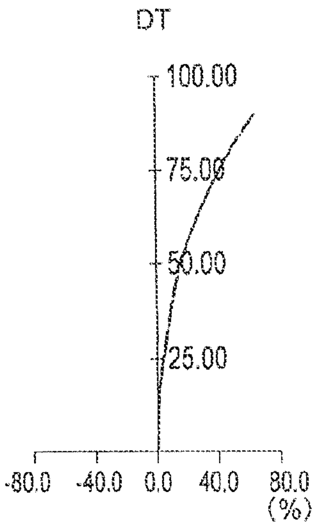
Figure 36A:
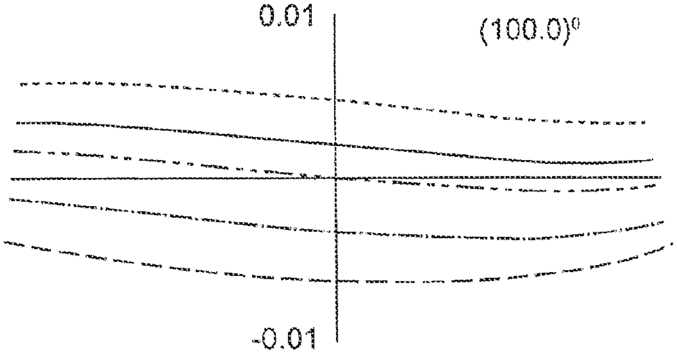
FIG. 36A, FIG. 36B, FIG. 36C, FIG. 36D, FIG. 36E, and FIG. 36F are aberration diagrams of the wide-angle optical system of the example 10.
Figure 36D:
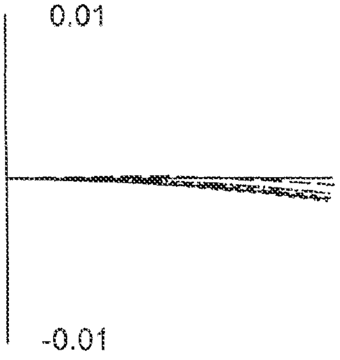
Figure 36B:
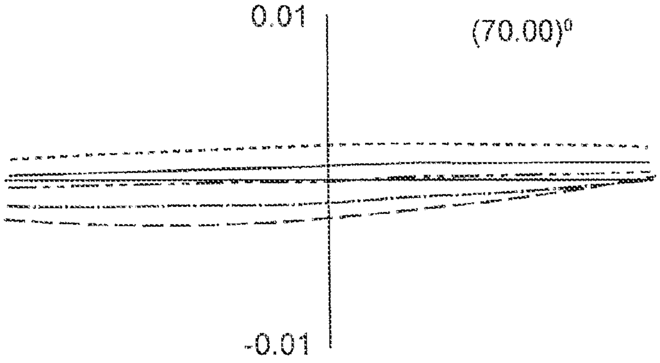
Figure 36E:
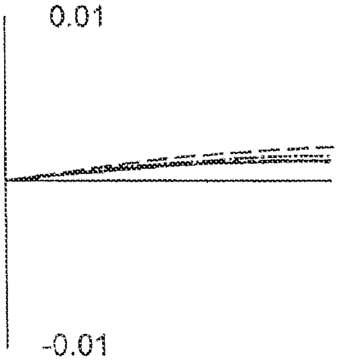
Figure 36C:
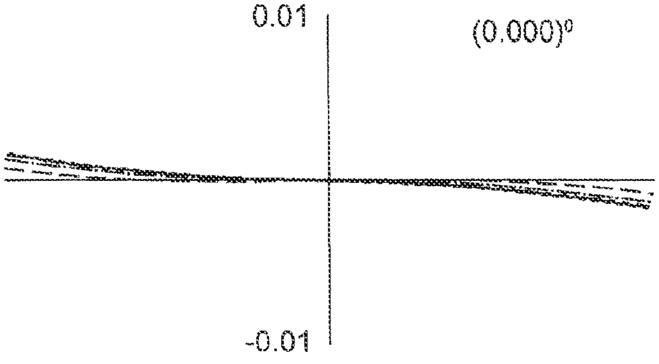
Figure 36F:
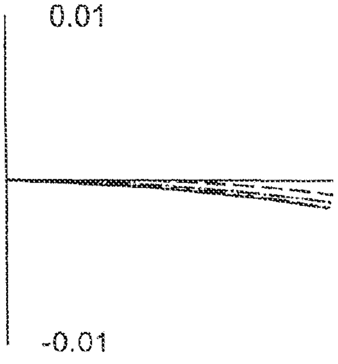
Figure 37A:
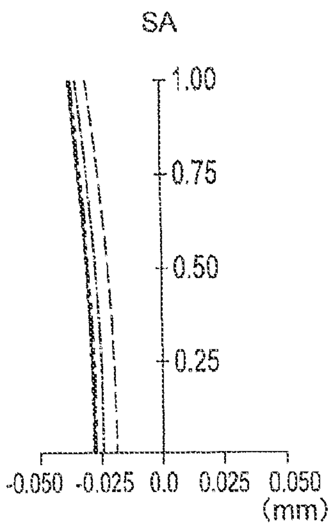
FIG. 37A, FIG. 37B, and FIG. 37C are aberration diagrams of the wide-angle optical system of the example 10.
Figure 37B:
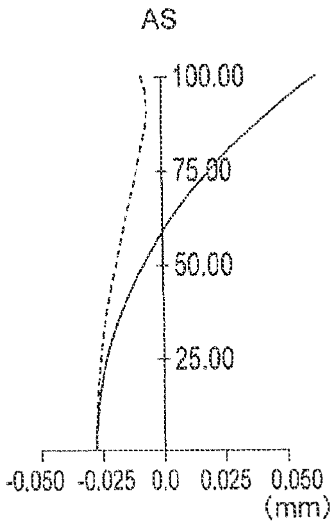
Figure 37C:
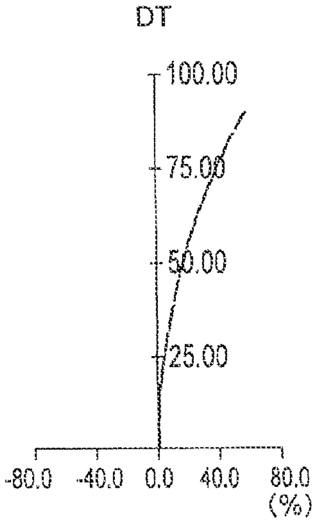
Figure 38A:
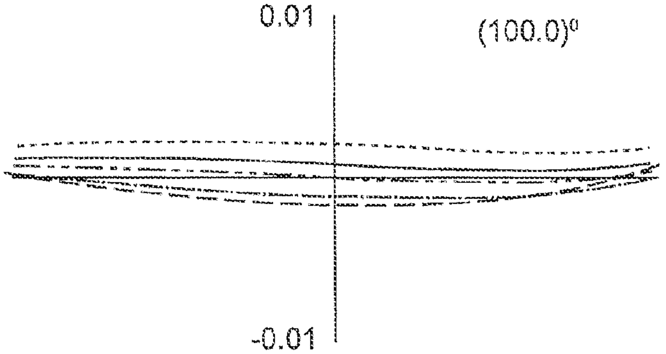
FIG. 38A, FIG. 38B, FIG. 38C, FIG. 38D, FIG. 38E, and FIG. 38F are aberration diagrams of the wide-angle optical system of the example 10.
Figure 38D:
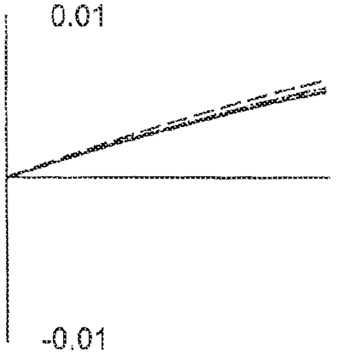
Figure 38B:
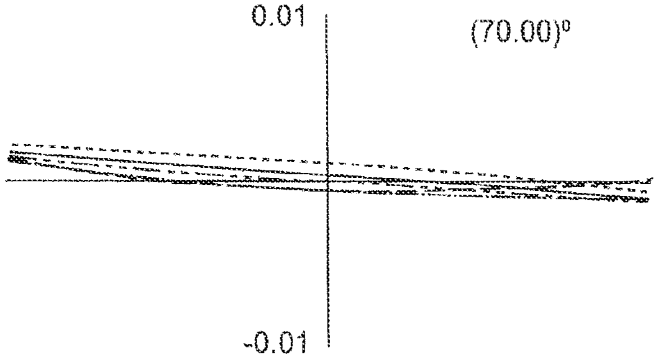
Figure 38E:
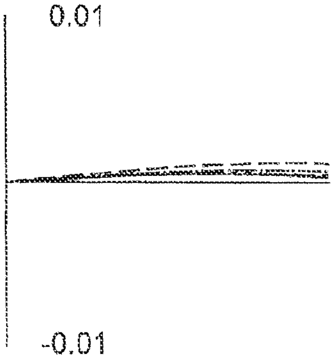
Figure 38C:
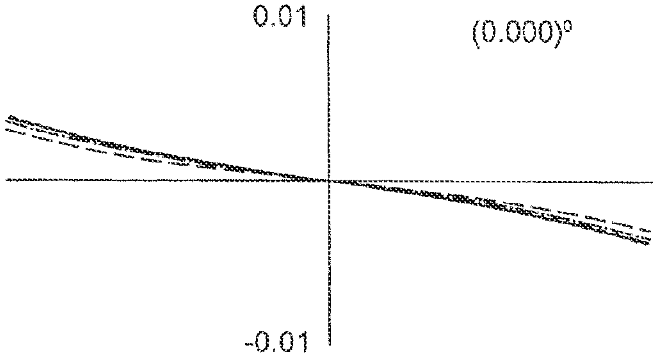
Figure 38F:
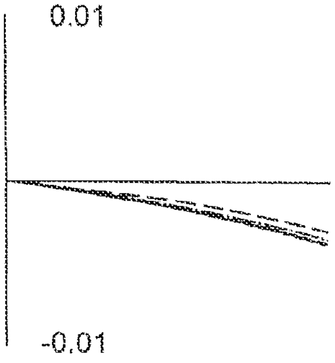
Figure 40A:
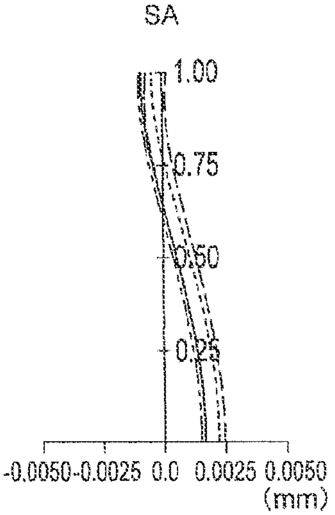
FIG. 40A, FIG. 40B, and FIG. 40C are aberration diagrams of the wide-angle optical system of the example 15.
Figure 40B:
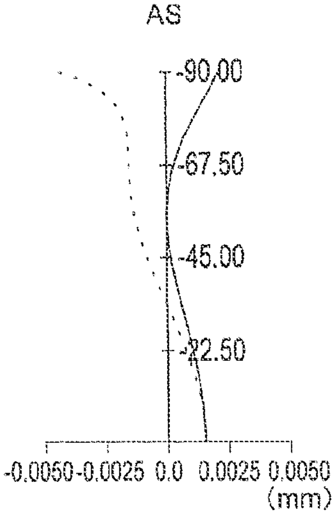
Figure 40C:
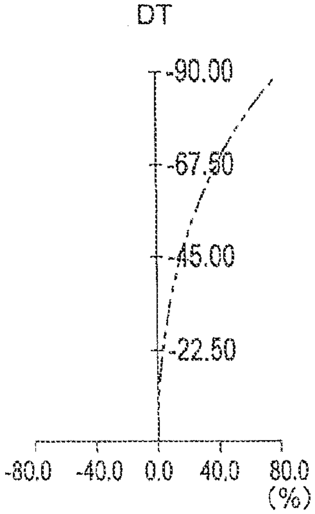

A wide-angle optical system of an example 15 will be described below. FIG. 26 is a cross-sectional view of a lens arrangement of the wide-angle optical system of the example 15. FIG. 40A, FIG. 40B, and FIG. 40C are aberration diagrams of the wide-angle optical system of the example 15.

The wide-angle optical system of the example 15 includes a first optical system, a second optical system, an optical member P, and a cover glass C. The first optical system includes a first front side lens unit and a first rear side lens unit. The second optical system includes a second front side lens unit and a second rear side lens unit.

The first front side lens unit includes a negative meniscus lens L1 of which a convex surface is directed toward an object side and a biconcave negative lens L2.

The first rear side lens unit includes a negative meniscus lens L3 of which a convex surface is directed toward the object side, a biconvex positive lens L4, a negative meniscus lens L5 of which a convex surface is directed toward the object side, a biconvex positive lens L6, a biconcave negative lens L7, and a biconvex positive lens L8.

The negative meniscus lens L3 and the biconvex positive lens L4 are cemented. The negative meniscus lens L5 and the biconvex positive lens L6 are cemented. The biconcave negative lens L7 and the biconvex positive lens L8 are cemented.

The optical member P is disposed between the first front side lens unit and the first rear side lens unit. An optical member having a pair of inclined surfaces, a pair of side surfaces, and a bottom surface is used for the optical member P.

An aperture stop S is disposed at an interior of the first rear side lens unit. More specifically, the aperture stop S is disposed between the biconvex positive lens L4 and the negative meniscus lens L5.

The cover glass C is disposed on an image side of the first rear side lens unit. In other words, the cover glass C is disposed between the biconvex positive lens L8 and an image plane I.

In the wide-angle optical system of the example 15, the pair of inclined surfaces is facing the front side lens unit. A pair of intermediate surfaces is located on the object side of the pair of inclined surfaces. The pair of intermediate surfaces is in contact with the pair of inclined surfaces. The pair of side surfaces is in contact with the bottom surface.

Lights emerged from the front side lens units are incident on the pair of inclined surfaces. Lights incident on the pair of inclined surfaces are transmitted through the pair of inclined surfaces and reach the bottom surface. The bottom surface has a reflection effect. Lights that have reached the bottom surface are reflected toward the pair of intermediate surfaces. Lights intersect while traveling from the bottom surface to the pair of intermediate surfaces.

Lights that have reached the pair of intermediate surfaces, after being reflected at the pair of intermediate surfaces, are directed toward the bottom surface. Lights that have reached the bottom surface are transmitted through the bottom surface. Lights transmitted through the bottom surface are incident on the rear side lens units.

A light ray emerged from a center of a field of view and passing through an aperture stop is set to be a central principal ray. In the wide-angle optical system of the example 15, an inclination of the bottom surface with respect to the central principal light ray is 36°, and an inclination of the intermediate surface with respect to the central principal light ray is 18°.

Numerical data of each example described above is shown below. In Surface data, r denotes radius of curvature of each lens surface, d denotes a distance between respective lens surfaces, nd denotes a refractive index of each lens for a d-line, and νd denotes an Abbe number for each lens.

In Various data, f denotes a focal length of the entire system, FNO. denotes an F number, ω denotes a half angle of view, IH denotes an image height, α denotes an angle made by the pair of inclined surfaces, θ denotes an predetermined angle. The unit of length is mm, and the unit of angle is ° (degree).

Example 1

Unit mm

| Surface data | | | | |
|---|---|---|---|---|
| Surface no. | r | d | nd | νd |
| Object plane | 10.000 | 10.000 | | |
| 1 | 3.639 | 0.450 | 1.8830 | 40.7 |
| 2 | 0.935 | 1.079 | | |
| 3 | 33.587 | 0.300 | 1.8830 | 40.7 |
| 4 | 0.912 | 0.317 | | |
| 5 | ∞ | 2.229 | 1.8830 | 40.7 |
| 6 | ∞ | 0.100 | | |
| 7 | −22.370 | 0.300 | 1.8830 | 40.7 |
| 8 | 0.716 | 0.623 | 1.7847 | 25.7 |
| 9 | −1.643 | 0.050 | | |
| 10 (Stop) | ∞ | 0.050 | | |
| 11 | 2.878 | 0.400 | 1.9229 | 18.9 |
| 12 | 0.894 | 1.377 | 1.4387 | 94.9 |
| 13 | −1.034 | 0.200 | | |
| 14 | 2.640 | 0.806 | 1.8830 | 40.7 |
| 15 | 5.915 | 0.500 | 1.9229 | 18.9 |
| 16 | 1.986 | 0.300 | | |
| 17 | 4.079 | 0.664 | 1.8830 | 40.7 |
| 18 | 116.000 | 0.500 | | |
| 19 | ∞ | 0.300 | 1.5163 | 64.1 |
| 20 | ∞ | 0.030 | | |
| Image plane | ∞ | | | |

-continued

| Various data | |
|---|---|
| f | 0.308 |
| FNO. | 4.99 |
| ω | 100.0 |
| IH | 1.00 |
| α | 60 |
| θ | 120 |

Example 2

Unit mm

Surface data

| Surface no. | r | d | nd | νd |
|---|---|---|---|---|
| Object plane | 10.000 | 10.000 | | |
| 1 | 3.601 | 0.450 | 1.8830 | 40.7 |
| 2 | 0.918 | 0.815 | | |
| 3 | 5.085 | 0.300 | 1.8830 | 40.7 |
| 4 | 1.195 | 0.402 | | |
| 5 | ∞ | 1.912 | 1.8830 | 40.7 |
| 6 | ∞ | 0.100 | | |
| 7 | 6.661 | 0.300 | 1.8830 | 40.7 |
| 8 | 0.842 | 0.602 | 1.6477 | 33.8 |
| 9 | −1.474 | 0.050 | | |
| 10 (Stop) | ∞ | 0.050 | | |
| 11 | 0.995 | 0.400 | 1.9229 | 18.9 |
| 12 | 0.597 | 0.585 | 1.4387 | 94.9 |
| 13 | −1.059 | 0.100 | | |
| 14 | 48.401 | 0.400 | 1.8467 | 23.8 |
| 15 | 0.653 | 0.657 | 1.8830 | 40.7 |
| 16 | −6.423 | 0.274 | | |
| 17 | ∞ | 0.300 | 1.5163 | 64.1 |
| 18 | ∞ | 0.030 | | |
| Image plane | ∞ | | | |

| Various data | |
|---|---|
| f | 0.323 |
| FNO. | 5.000 |
| ω | 90 |
| IH | 1.00 |
| α | 60 |
| θ | 120 |

Example 3

Unit mm

Surface data

| Surface no. | r | d | nd | νd |
|---|---|---|---|---|
| Object plane | 10.000 | 10.000 | | |
| 1 | 4.106 | 0.450 | 1.8830 | 40.7 |
| 2 | 0.816 | 0.822 | | |
| 3 | −3.319 | 0.300 | 1.8830 | 40.7 |
| 4 | 8.490 | 0.128 | | |
| 5 | ∞ | 2.900 | 1.8830 | 40.7 |
| 6 | ∞ | 0.100 | | |
| 7 | 3.264 | 0.300 | 1.8830 | 40.7 |
| 8 | 1.010 | 0.565 | 1.7847 | 25.7 |
| 9 | −3.855 | 0.050 | | |
| 10 (Stop) | ∞ | 0.050 | | |
| 11 | 1.641 | 0.400 | 1.9229 | 18.9 |
| 12 | 0.783 | 0.605 | 1.4387 | 94.9 |
| 13 | −1.767 | 0.100 | | |
| 14 | 3.566 | 0.672 | 1.8830 | 40.7 |
| 15 | −0.887 | 0.400 | 1.7618 | 26.5 |
| 16 | 1.175 | 0.138 | | |
| 17 | 2.116 | 0.677 | 1.8830 | 40.7 |
| 18 | −1.728 | 0.300 | | |
| 19 | ∞ | 0.300 | 1.5163 | 64.1 |
| 20 | ∞ | 0.030 | | |
| Image plane | ∞ | | | |

| Various data | |
|---|---|
| f | 0.363 |
| FNO. | 5.003 |
| ω | 90 |
| IH | 1.00 |
| α | 45 |
| θ | 90 |

Example 4

Unit mm

Surface data

| Surface no. | r | d | nd | νd |
|---|---|---|---|---|
| Object plane | 10.000 | 10.000 | | |
| 1 | 5.915 | 0.450 | 1.8830 | 40.7 |
| 2 | 1.001 | 0.857 | | |
| 3 | ∞ | 2.732 | 1.8830 | 40.7 |
| 4 | ∞ | 0.100 | | |
| 5 | −2.411 | 1.021 | 1.9229 | 18.9 |
| 6 | −2.040 | 0.050 | | |
| 7 (Stop) | ∞ | 0.050 | | |
| 8 | 1.643 | 1.379 | 1.4387 | 94.9 |
| 9 | −1.169 | 0.400 | 1.9229 | 18.9 |
| 10 | −2.291 | 0.050 | | |
| 11 | 1.559 | 1.020 | 1.8830 | 40.7 |
| 12 | −1.159 | 0.400 | 1.9229 | 18.9 |
| 13 | ∞ | 0.200 | | |
| 14 | ∞ | 0.300 | 1.5163 | 64.1 |
| 15 | ∞ | 0.030 | | |
| Image plane | ∞ | | | |

| Various data | |
|---|---|
| f | 0.422 |
| FNO. | 5.000 |
| ω | 90 |
| IH | 1.00 |
| α | 60 |
| θ | 120 |

Example 5

Unit mm

Surface data

| Surface no. | r | d | nd | νd |
|---|---|---|---|---|
| Object plane | 10.000 | 10.000 | | |
| 1 | 3.741 | 0.450 | 1.8830 | 40.7 |
| 2 | 0.893 | 0.977 | | |
| 3 | −3.526 | 0.300 | 1.8830 | 40.7 |
| 4 | 3.260 | 0.187 | | |
| 5 | ∞ | 5.485 | 1.5163 | 64.1 |
| 6 | ∞ | 0.100 | | |
| 7 | 2.243 | 0.300 | 1.8830 | 40.7 |
| 8 | 0.907 | 0.617 | 1.6989 | 30.1 |
| 9 | −3.122 | 0.050 | | |
| 10(Stop) | ∞ | 0.050 | | |
| 11 | 1.356 | 0.400 | 1.9229 | 18.9 |
| 12 | 0.614 | 1.200 | 1.4387 | 94.9 |
| 13 | −0.887 | 0.100 | | |

-continued

| | | | | |
|---|---|---|---|---|
| 14 | 76.731 | 0.400 | 1.8830 | 40.7 |
| 15 | 0.685 | 1.322 | 1.4875 | 70.2 |
| 16 | −1.190 | 0.100 | | |
| 17 | ∞ | 0.300 | 1.5163 | 64.1 |
| 18 | ∞ | 0.030 | | |
| Image plane | ∞ | | | |

| Various data | |
|---|---|
| f | 0.349 |
| FNO. | 5.000 |
| ω | 90 |
| IH | 1.00 |
| α | 30 |
| θ | 60 |

Example 6

Unit mm

Surface data

| Surface no. | r | d | nd | νd |
|---|---|---|---|---|
| Object plane | 10.000 | 10.000 | | |
| 1 | 3.281 | 0.450 | 1.8830 | 40.7 |
| 2 | 0.820 | 0.782 | | |
| 3 | 10.015 | 0.300 | 1.8830 | 40.7 |
| 4 | 1.209 | 0.247 | | |
| 5 | ∞ | 1.739 | 1.8830 | 40.7 |
| 6 | ∞ | 0.100 | | |
| 7 | 2.762 | 0.300 | 1.8830 | 40.7 |
| 8 | 0.581 | 0.564 | 1.6727 | 32.1 |
| 9 | −1.200 | 0.050 | | |
| 10(Stop) | ∞ | 0.050 | | |
| 11 | −7.912 | 0.400 | 1.9229 | 18.9 |
| 12 | −6.491 | 0.539 | 1.4387 | 94.9 |
| 13 | −1.353 | 0.100 | | |
| 14 | 14.435 | 0.400 | 1.9229 | 18.9 |
| 15 | 0.774 | 0.667 | 1.8830 | 40.7 |
| 16 | −2.354 | 0.050 | | |
| 17 | ∞ | 1.200 | 1.8830 | 40.7 |
| 18 | ∞ | 0.100 | | |
| 19 | ∞ | 0.300 | 1.5163 | 64.1 |
| 20 | ∞ | 0.030 | | |
| Image plane | ∞ | | | |

| Various data | |
|---|---|
| f | 0.325 |
| FNO. | 5.000 |
| ω | 90 |
| IH | 1.00 |
| α | 60 |
| θ | 120 |

Example 7

Unit mm

Surface data

| Surface no. | r | d | nd | νd |
|---|---|---|---|---|
| Object plane | 10.000 | 10.000 | | |
| 1 | 10.000 | 0.450 | 1.8830 | 40.7 |
| 2 | 2.139 | 0.396 | | |
| 3 | 2.953 | 0.300 | 1.8830 | 40.7 |
| 4 | 1.174 | 0.746 | | |
| 5 | ∞ | 3.032 | 1.8830 | 40.7 |
| 6 | ∞ | 0.100 | | |
| 7 | 4.334 | 0.300 | 1.8830 | 40.7 |

-continued

| | | | | |
|---|---|---|---|---|
| 8 | 1.063 | 1.394 | 1.6477 | 33.8 |
| 9 | −3.106 | 0.050 | | |
| 10(Stop) | ∞ | 0.050 | | |
| 11 | 1.114 | 0.400 | 1.9229 | 18.9 |
| 12 | 0.713 | 0.659 | 1.4387 | 94.9 |
| 13 | −2.318 | 0.100 | | |
| 14 | 1.947 | 0.400 | 1.8467 | 23.8 |
| 15 | 0.608 | 0.722 | 1.8830 | 40.7 |
| 16 | 2.651 | 0.203 | | |
| 17 | ∞ | 0.300 | 1.5163 | 64.1 |
| 18 | ∞ | 0.030 | | |
| Image plane | ∞ | | | |

| Various data | |
|---|---|
| f | 0.414 |
| FNO. | 5.000 |
| ω | 80 |
| IH | 1.00 |
| α | 60 |
| θ | 120 |

Example 8

Unit mm

Surface data

| Surface no. | r | d | nd | νd |
|---|---|---|---|---|
| Object plane | 10.000 | 10.000 | | |
| 1 | 4.109 | 0.450 | 1.8830 | 40.7 |
| 2 | 1.153 | 0.697 | | |
| 3 | 3.094 | 0.300 | 1.8830 | 40.7 |
| 4 | 0.830 | 0.439 | | |
| 5 | ∞ | 2.299 | 1.8830 | 40.7 |
| 6 | ∞ | Variable | | |
| 7 | 2.778 | 0.300 | 1.8830 | 40.7 |
| 8 | 1.087 | 0.569 | 1.7552 | 27.5 |
| 9 | −2.058 | Variable | | |
| 10(Stop) | ∞ | 0.050 | | |
| 11 | 1.451 | 0.400 | 1.9229 | 18.9 |
| 12 | 0.555 | 0.621 | 1.4387 | 94.9 |
| 13 | −1.000 | 0.100 | | |
| 14 | −6.761 | 0.400 | 1.9229 | 18.9 |
| 15 | 2.698 | 0.710 | 1.8830 | 40.7 |
| 16 | −1.255 | 0.500 | | |
| 17 | ∞ | 0.300 | 1.5163 | 64.1 |
| 18 | ∞ | 0.030 | | |
| Image plane | ∞ | | | |

| Various data | |
|---|---|
| f | 0.341 |
| FNO. | 5.000 |
| ω | 90 |
| IH | 1.00 |
| α | 60 |
| θ | 120 |

| | Far point (10 mm) | Near Point (2 mm) |
|---|---|---|
| d6 | 0.092 | 0.274 |
| d9 | 0.233 | 0.050 |

Example 9

Unit mm

| Surface data | | | | |
|---|---|---|---|---|
| Surface no. | r | d | nd | νd |
| Object plane | 10.000 | 10.000 | | |
| 1 | 3.323 | 0.450 | 1.8830 | 40.7 |
| 2 | 0.915 | 0.907 | | |
| 3 | 81.761 | 0.300 | 1.8830 | 40.7 |
| 4 | 1.343 | 0.301 | | |
| 5 | ∞ | 2.099 | 1.8830 | 40.7 |
| 6 | ∞ | 0.050 | | |
| 7 | 3.471 | 0.586 | 1.7847 | 25.7 |
| 8 | −0.674 | 0.858 | 1.8830 | 40.7 |
| 9 | −1.953 | 0.050 | | |
| 10(Stop) | ∞ | 0.050 | | |
| 11 | 2.358 | 0.400 | 1.9229 | 18.9 |
| 12 | 0.571 | 0.569 | 1.5481 | 45.8 |
| 13 | −2.314 | 0.100 | | |
| 14 | 6.040 | 0.600 | 1.4387 | 94.9 |
| 15 | −0.891 | Variable | | |
| 16 | −3.871 | 0.400 | 1.9229 | 18.9 |
| 17 | −2.786 | Variable | | |
| 18 | ∞ | 0.300 | 1.5163 | 64.1 |
| 19 | ∞ | 0.030 | | |
| Image plane | ∞ | | | |

| Various data | |
|---|---|
| f | 0.330 |
| FNO. | 5.000 |
| ω | 90 |
| IH | 1.00 |
| α | 60 |
| θ | 120 |

| | Far point (10 mm) | Near Point (2 mm) |
|---|---|---|
| 15 | 0.750 | 0.050 |
| 17 | 0.050 | 0.750 |

Example 10

Unit mm

| Surface data | | | | |
|---|---|---|---|---|
| Surface no. | r | d | nd | νd |
| Object plane | 10.000 | 10.000 | | |
| 1 | 3.639 | 0.450 | 1.8830 | 40.7 |
| 2 | 0.935 | 1.079 | | |
| 3 | 33.587 | 0.300 | 1.8830 | 40.7 |
| 4 | 0.912 | 0.317 | | |
| 5 | ∞ | 2.229 | 1.8830 | 40.7 |
| 6 | ∞ | 0.100 | | |
| 7 | −22.370 | 0.300 | 1.8830 | 40.7 |
| 8 | 0.716 | 0.623 | 1.7847 | 25.7 |
| 9 | −1.643 | 0.050 | | |
| 10(Stop) | ∞ | 0.050 | | |
| 11 | 2.878 | 0.400 | 1.9229 | 18.9 |
| 12 | 0.894 | 1.377 | 1.4387 | 94.9 |
| 13 | −1.034 | 0.200 | | |
| 14 | 2.640 | 0.806 | 1.8830 | 40.7 |
| 15 | 5.915 | 0.500 | 1.9229 | 18.9 |
| 16 | 1.986 | Variable | | |
| 17 | 4.079 | 0.664 | 1.8830 | 40.7 |
| 18 | 116.000 | Variable | | |
| 19 | ∞ | 0.300 | 1.5163 | 64.1 |
| 20 | ∞ | 0.030 | | |
| Image plane | ∞ | | | |

-continued

| Various data | |
|---|---|
| f | 0.308 |
| FNO. | 4.99 |
| ω | 100.0 |
| IH | 1.00 |
| α | 60 |
| θ | 120 |

| | Far point (10 mm) | Near Point (2 mm) |
|---|---|---|
| 16 | 0.300 | 0.199 |
| 18 | 0.500 | 0.601 |

Example 11

Unit mm

| Surface data | | | | |
|---|---|---|---|---|
| Surface no. | r | d | nd | νd |
| Object plane | 10.000 | 10.000 | | |
| 1 | 3.400 | 0.450 | 1.8830 | 40.7 |
| 2 | 1.092 | 1.245 | | |
| 3 | −12.942 | 0.400 | 1.8830 | 40.7 |
| 4 | 2.024 | 0.305 | | |
| 5 | ∞ | 0.500 | 1.8830 | 40.7 |
| 6 | ∞ | 2.800 | 1.8830 | 40.7 |
| 7 | ∞ | 0.100 | | |
| 8 | 2.373 | 0.300 | 1.8830 | 40.7 |
| 9 | 0.939 | 0.567 | 1.6989 | 30.1 |
| 10 | −3.620 | 0.050 | | |
| 11 (Stop) | ∞ | 0.050 | | |
| 12 | 1.255 | 0.400 | 1.9229 | 18.9 |
| 13 | 0.697 | 0.595 | 1.4387 | 94.9 |
| 14 | −1.634 | 0.100 | | |
| 15 | −14.592 | 0.681 | 1.8830 | 40.7 |
| 16 | −0.719 | 0.400 | 1.8052 | 25.4 |
| 17 | −19.699 | 0.102 | | |
| 18 | −17.286 | 0.544 | 1.8830 | 40.7 |
| 19 | −3.616 | 0.300 | | |
| 20 | ∞ | 0.300 | 1.5163 | 64.1 |
| 21 | ∞ | 0.030 | | |
| Image plane | ∞ | | | |

| Various data | |
|---|---|
| f | 0.415 |
| FNO. | 5.000 |
| ω | 70 |
| IH | 1.00 |
| α | 45 |
| θ | 90 |

Example 12

Unit mm

| Surface data | | | | |
|---|---|---|---|---|
| Surface no. | r | d | nd | νd |
| Object plane | 10.000 | 10.000 | | |
| 1 | 4.676 | 0.450 | 1.8830 | 40.7 |
| 2 | 1.274 | 1.045 | | |
| 3 | −5.185 | 0.400 | 1.8830 | 40.7 |
| 4 | 3.291 | 0.228 | | |
| 5 | ∞ | 0.500 | 1.8830 | 40.7 |
| 6 | ∞ | 2.700 | 1.8830 | 40.7 |
| 7 | ∞ | 0.100 | | |
| 8 | 5.145 | 0.300 | 1.8830 | 40.7 |
| 9 | 0.725 | 0.967 | 1.8052 | 25.4 |

-continued

| | | | | |
|---|---|---|---|---|
| 10 | 45.542 | 0.050 | | |
| 11 (Stop) | ∞ | 0.050 | | |
| 12 | 0.887 | 0.400 | 1.9229 | 18.9 |
| 13 | 0.508 | 1.030 | 1.4387 | 94.9 |
| 14 | −0.928 | 0.100 | | |
| 15 | 2.509 | 0.588 | 1.8830 | 40.7 |
| 16 | −55.714 | 0.400 | 1.9229 | 18.9 |
| 17 | 2.573 | 0.572 | | |
| 18 | ∞ | 0.300 | 1.5163 | 64.1 |
| 19 | ∞ | 0.030 | | |
| Image plane | ∞ | | | |

| Various data | |
|---|---|
| f | 0.415 |
| FNO. | 5.000 |
| ω | 70 |
| IH | 1.00 |
| α | 45 |
| θ | 90 |

Example 13

Unit mm

| Surface data | | | | |
|---|---|---|---|---|
| Surface no. | r | d | nd | νd |
| Object plane | 10.000 | 10.000 | | |
| 1 | 3.464 | 0.450 | 1.8830 | 40.7 |
| 2 | 1.073 | 1.366 | | |
| 3 | 15.117 | 0.300 | 1.9229 | 18.9 |
| 4 | 0.794 | 0.262 | | |
| 5 | ∞ | 2.432 | 1.8830 | 40.7 |
| 6 | ∞ | 0.050 | | |
| 7 (Stop) | ∞ | 0.050 | | |
| 8 | 2.249 | 0.300 | 1.8830 | 40.7 |
| 9 | 0.788 | 0.582 | 1.6989 | 30.1 |
| 10 | −1.565 | 0.100 | | |
| 11 | 1.469 | 0.400 | 1.9229 | 18.9 |
| 12 | 0.767 | 1.388 | 1.4387 | 94.9 |
| 13 | −1.100 | 0.100 | | |
| 14 | −5.943 | 0.400 | 1.9229 | 18.9 |
| 15 | 0.735 | 0.812 | 1.8830 | 40.7 |
| 16 | −8.029 | 0.209 | | |
| 17 | ∞ | 0.300 | 1.5163 | 64.1 |
| 18 | ∞ | 0.030 | | |
| Image plane | ∞ | | | |

| Various data | |
|---|---|
| f | 0.362 |
| FNO. | 5.000 |
| ω | 80 |
| IH | 1.00 |
| α | 60 |
| θ | 120 |

Example 14

Unit mm

| Surface data | | | | |
|---|---|---|---|---|
| Surface no. | r | d | nd | νd |
| Object plane | 10.000 | 10.000 | | |
| 1 | 4.071 | 0.450 | 1.8830 | 40.7 |
| 2 | 1.313 | 1.363 | | |
| 3 | −48.229 | 0.300 | 1.8830 | 40.7 |
| 4 | 1.823 | 0.399 | | |
| 5 | ∞ | 1.030 | 1.8830 | 40.7 |
| 6 | ∞ | 4.300 | 1.8830 | 40.7 |
| 7 | ∞ | 2.600 | 1.8830 | 40.7 |
| 8 | ∞ | 0.050 | | |
| 9 | 2.385 | 0.400 | 1.8830 | 40.7 |
| 10 | 0.995 | 0.600 | 1.6477 | 33.8 |
| 11 | −3.569 | 0.050 | | |
| 12 (Stop) | ∞ | 0.050 | | |
| 13 | 1.254 | 0.470 | 1.9229 | 18.9 |
| 14 | 0.710 | 0.647 | 1.4387 | 94.9 |
| 15 | −1.313 | 0.147 | | |
| 16 | −2.568 | 0.400 | 2.0033 | 28.3 |
| 17 | 0.837 | 1.188 | 1.8830 | 40.7 |
| 18 | −1.606 | 0.400 | | |
| 19 | ∞ | 0.300 | 1.5163 | 64.1 |
| 20 | ∞ | 0.030 | | |
| Image plane | ∞ | | | |

| Various data | |
|---|---|
| f | 0.323 |
| FNO. | 3.68 |
| ω | 90 |
| IH | 1.00 |
| α | 122 |
| θ | 56 |

Example 15

Unit mm

| Surface data | | | | |
|---|---|---|---|---|
| Surface no. | r | d | nd | νd |
| Object plane | 10.000 | 10.000 | | |
| 1 | 4.071 | 0.450 | 1.8830 | 40.7 |
| 2 | 1.313 | 1.363 | | |
| 3 | −48.229 | 0.300 | 1.8830 | 40.7 |
| 4 | 1.823 | 0.399 | | |
| 5 | ∞ | 2.060 | 1.8830 | 40.7 |
| 6 | ∞ | 3.240 | 1.8830 | 40.7 |
| 7 | ∞ | 2.630 | 1.8830 | 40.7 |
| 8 | ∞ | 0.050 | | |
| 9 | 2.385 | 0.400 | 1.8830 | 40.7 |
| 10 | 0.995 | 0.600 | 1.6477 | 33.8 |
| 11 | −3.569 | 0.050 | | |
| 12 (Stop) | ∞ | 0.050 | | |
| 13 | 1.254 | 0.470 | 1.9229 | 18.9 |
| 14 | 0.710 | 0.647 | 1.4387 | 94.9 |
| 15 | −1.313 | 0.147 | | |
| 16 | −2.568 | 0.400 | 2.0033 | 28.3 |
| 17 | 0.837 | 1.188 | 1.8830 | 40.7 |
| 18 | −1.606 | 0.400 | | |
| 19 | ∞ | 0.300 | 1.5163 | 64.1 |
| 20 | ∞ | 0.030 | | |
| Image plane | ∞ | | | |

| Various data | |
|---|---|
| f | 0.323 |
| FNO. | 3.68 |
| ω | 90 |
| IH | 1.00 |
| α | 144 |
| θ | 72 |

Next, the values of conditional expressions in each example are shown below.

| | Example1 | Example2 | Example3 | Example4 |
|---|---|---|---|---|
| (1) D5/L | 0.15 | 0.19 | 0.19 | 0.27 |
| (2) HB | 2.60 | 2.25 | 2.25 | 3.20 |
| (3) HB/VB | 1.30 | 1.25 | 1.41 | 1.60 |
| (4) HB/D | 1.58 | 1.61 | 1.61 | 1.60 |
| (5) α | 60 | 60 | 45 | 60 |

| | Example5 | Example6 | Example7 | Example8 |
|---|---|---|---|---|
| (1) D5/L | 0.32 | 0.15 | 0.30 | 0.21 |
| (2) HB | 2.80 | 2.00 | 3.50 | 2.70 |
| (3) HB/VB | 1.56 | 1.25 | 1.17 | 1.35 |
| (4) HB/D | 1.75 | 1.67 | 1.75 | 1.80 |
| (5) α | 30 | 60 | 60 | 60 |

| | Example9 | Example10 | Example11 | Example12 |
|---|---|---|---|---|
| (1) D5/L | 0.17 | 0.15 | 0.21 | 0.20 |
| (2) HB | 2.40 | 2.60 | 2.60 | 2.30 |
| (3) HB/VB | 1.20 | 1.30 | 1.18 | 0.96 |
| (4) HB/D | 1.60 | 1.58 | 1.63 | 1.44 |
| (5) α | 60 | 60 | 45 | 45 |

| | Example13 | Example14 | Example15 |
|---|---|---|---|
| (1) D5/L | 0.17 | 0.24 | 0.24 |
| (2) HB | 2.80 | 3.30 | 5.00 |
| (3) HB/VB | 1.00 | 1.65 | 2.50 |
| (4) HB/D | 1.40 | 2.06 | 3.57 |
| (5) α | 60 | 122 | 144 |

Figure 41:
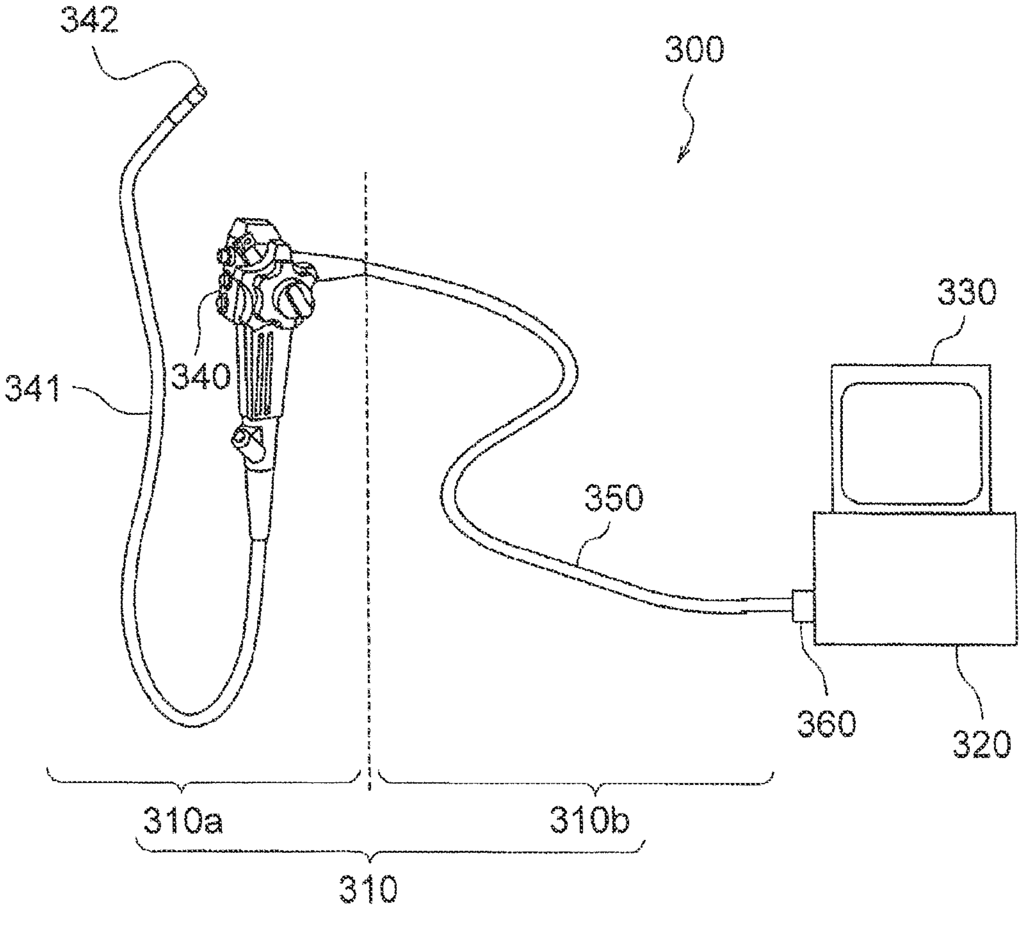
FIG. 41 is a diagram showing a schematic configuration of an endoscope and an endoscope system.

An example of an image pickup apparatus and an image pickup system will be described below. Here, the image pickup apparatus is an endoscope and the image pickup system is an endoscope system. FIG. 41 is a diagram showing a schematic configuration of an endoscope and an endoscope system.

An endoscope system 300 is an observation system in which an electronic endoscope is used. The endoscope system 300 includes an electronic endoscope 310 and an image processing unit 320. The electronic endoscope 310 includes a scope section 310*a* and a connecting cord section 310*b*. Moreover, a display unit 330 is connected to the image processing unit 320.

The scope section 310*a* is mainly divided into an operating portion 340 and an inserting portion 341. The inserting portion 341 is long and slender, and can be inserted into a body cavity of a patient. Moreover, the inserting portion 341 is formed of a flexible member. An observer can carry out various operations by an angle knob that is provided to the operating portion 340.

Moreover, the connecting cord section 310 *b* is extended from the operating portion 340. The connecting cord section 301*b* includes a universal cord 350. The universal cord 350 is connected to the image processing unit 320 via a connector 360.

The universal cord 350 is used for transceiving of various types of signals. Various types of signals include signals such as a power-supply voltage signal and a CCD (charge coupled device) driving signal. These signals are transmitted from a power supply unit and a video processor to the scope section 310*a*. Moreover, various types of signals include a video signal. This signal is transmitted from the scope section 310*a* to the video processor.

Peripheral equipment such as a VTR (video tape recorder) deck and a video printer can be connected to the video processor inside the image processing unit 320. The video processor carries out signal processing on a video signal from the scope section 310*a*. On the basis of the video signal, an endoscope image is displayed on a display screen of the display unit 330.

Figure 42:
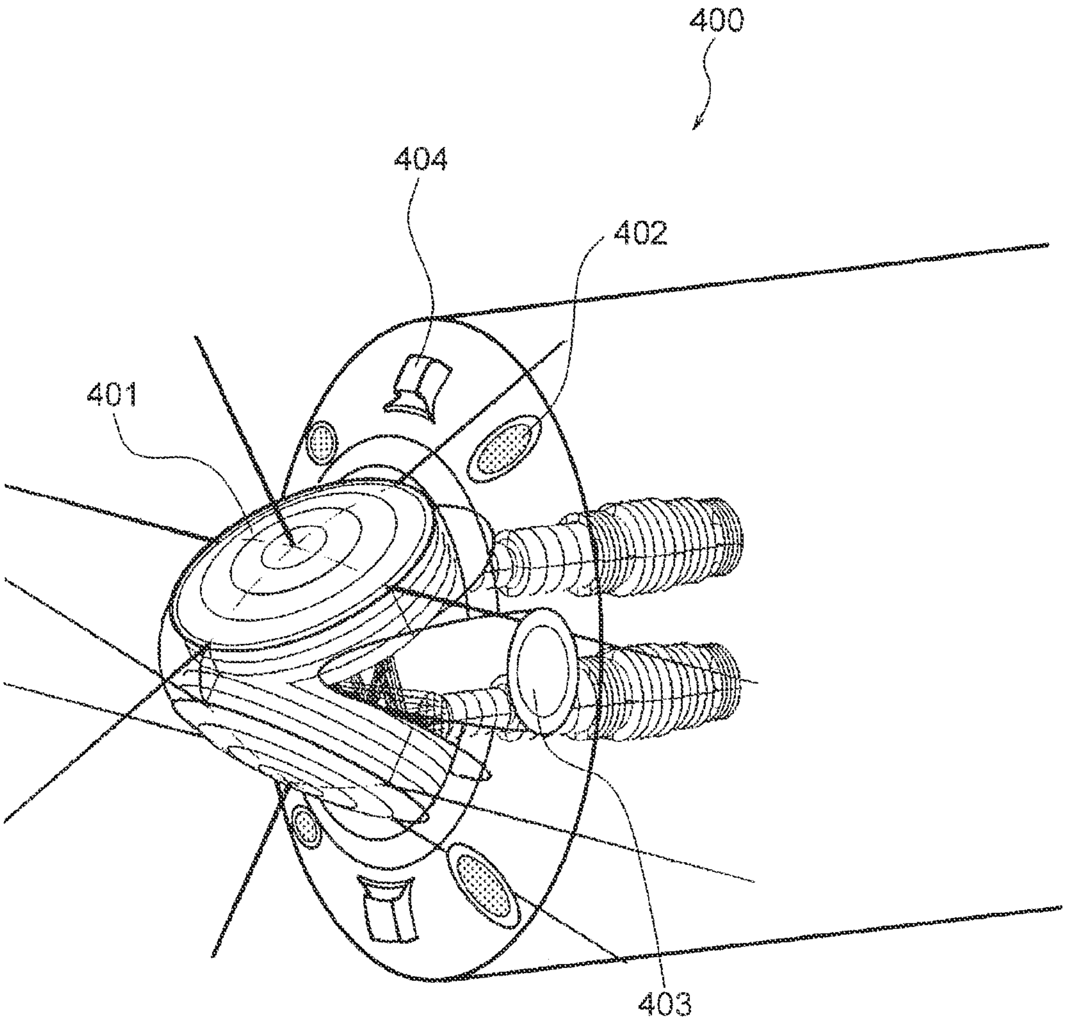
FIG. 42 is a perspective view of a front-end portion.
Figure 43:
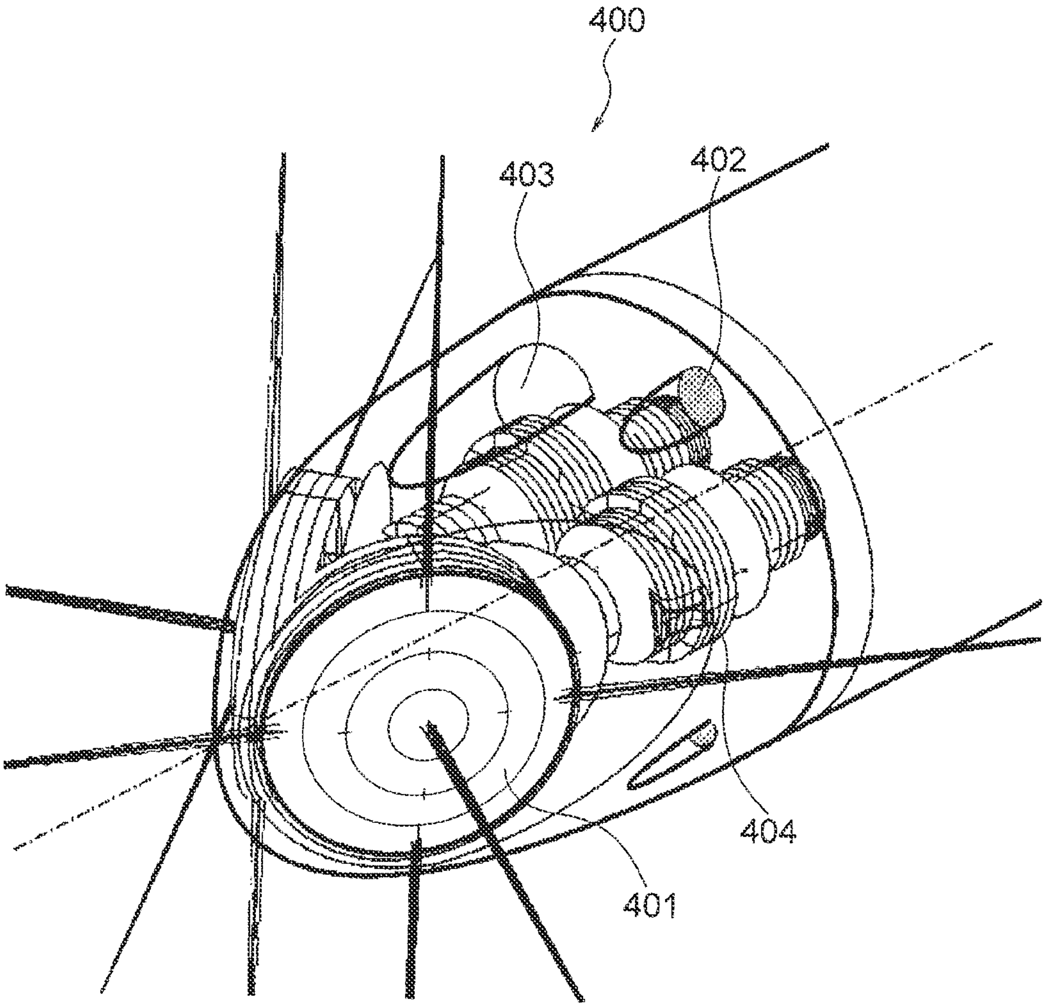
FIG. 43 is a perspective view of a front-end portion.

The wide-angle optical system of the present embodiment is disposed in the front-end portion 342. FIG. 42 and FIG. 43 are perspective views of a front-end portion. FIG. 43 is a diagram when the front-end portion in FIG. 42 is rotated through 90 degrees.

A front-end portion 400 includes an optical system 401 and an illuminating optical system 402. Moreover, a forceps hole 403 and a cleaning nozzle 404 are provided to the front-end portion 400. The wide-angle optical system of the present embodiment is used for the optical system 401. Accordingly, in an electronic endoscope 310, it is possible to observe a wide field of view having in which an aberration is corrected favorably.

Moreover, in an endoscope system 300, it is possible to acquire an image having a wide field of view in which an aberration is corrected favorably. When two images having a parallax are acquired, it is possible to carry out stereoscopic viewing of an object.

Following disclosure is included in the present disclosure.

(Appended Mode 1)

A wide-angle optical system comprising:

a first optical system;

a second optical system; and an optical member, wherein the first optical system includes a first front side lens unit having a negative refractive power and a first rear side lens unit having at least one positive lens, the second optical system includes a second front side lens unit in which an optical system same as the first front side lens unit is used, and a second rear side lens unit in which an optical system same as the first rear side lens unit is used, the optical member is formed of a medium having a refractive index larger than 1, and has a plurality of optical surfaces, the plurality of optical surfaces includes a first object-side surface, a second object-side surface, and an image-side surface positioned nearest to an image, the first object-side surface and the second object-side surface are face-to-face, a distance between the first object-side surface and the second object-side surface narrows as moving farther from the image-side surface, in a first optical path, the first front side lens unit, the first object-side surface, the image-side surface, and the first rear side lens unit are positioned in order from the object side, in a second optical path, the second front side lens unit, the second object-side surface, the image-side surface, and the second rear side lens unit are disposed in this order, reflection occurs in each of the first optical path and the second optical path, and the first optical path and the second optical path intersect at an interior of the optical member, and are parallel on an image side of the image-side surface.

(Appended Mode 2)

The wide-angle optical system according to appended mode 1, wherein in the first optical path, the second object-side surface is positioned in an optical path from the first object-side surface up to the image-side surface, in the second optical path, the first object-side surface is positioned in an optical path from the second object-side surface up to the image-side surface, and reflection occurs in an optical path from the first object-side surface up to the image-side surface and an optical path from the second object-side surface up to the image-side surface.

(Appended Mode 3)

The wide-angle optical system according to appended mode 2, wherein the plurality of optical surfaces includes a first intermediate surface and a second intermediate surface, the first intermediate surface and the second intermediate surface are face-to-face, in the first optical path, the first intermediate surface is positioned in an optical path from the first object-side surface up to the second object-side surface, in the second optical path, the second intermediate surface is positioned in an optical path from the second object-side surface up to the first object-side surface, and reflection occurs at the first intermediate surface and the second intermediate surface.

(Appended Mode 4)

The wide-angle optical system according to appended mode 1, wherein the plurality of optical surfaces includes a first intermediate surface and a second intermediate surface, the first intermediate surface and the second intermediate surface are face-to-face, in the first optical path, the first intermediate surface is positioned in an optical path from the first object-side surface up to the second object-side surface, in the second optical path, the second intermediate surface is positioned in an optical path from the second object-side surface up to the first object-side surface, and reflection occurs at the first intermediate surface, the second intermediate surface, and the image-side surface.

According to the present disclosure, it is possible to provide a wide-angle optical system which, while being small-sized, enables to achieve a wide field of view in which an aberration is corrected favorably, and an image pickup apparatus, and an image pickup system.

The present disclosure is suitable for a wide-angle optical system which, while being small-sized, enables to achieve a wide field of view in which an aberration is corrected favorably, and an image pickup apparatus, and an image pickup system.

What is claimed is:

1. A wide-angle optical system comprising:

at least a pair of front side lens units, each of the pair of front side lens units has a negative refractive power;

an optical member comprising:

at least a pair of planar inclined surfaces disposed such that a line intersecting the at least pair of planar inclined surfaces is formed on an object side; and a bottom surface; and at least a pair of rear side lens units, each of the at least pair of rear side lens units includes at least one positive lens positioned on an axis of rotational symmetry, and the axis of rotational symmetry for each of the at least pair of rear side lens units are parallel to each other;

wherein the wide-angle optical system has at least two optical paths, intersection of two light rays and reflection of the two light rays occur at the optical member, the intersection and the reflection occur after the two light rays are transmitted through the pair of planar inclined surfaces and before the two light rays are transmitted through the bottom surface, and following conditional expression (1) is satisfied:

$$2\ \text{mm} < HB < 10\ \text{mm} \quad (1)$$

where,

HB denotes a length in a transverse direction of the bottom surface, where the transverse direction is a direction orthogonal to the axis of rotational symmetry of each of the at least pair of rear side lens units.

2. The wide-angle optical system according to claim 1, wherein:

the optical member comprises a pair of intermediate surfaces; and reflection of a first light ray of the two light rays occurs at a first intermediate surface in the pair of intermediate surfaces, reflection of a second light ray of the two light rays occurs at a second intermediate surface in the pair of intermediate surfaces, reflection of the first light ray occurs at the bottom surface, before the reflection of the first light ray occurs at the first intermediate surface, and reflection of the second light ray occurs at the bottom surface, before the reflection of the second light ray occurs at the second intermediate surface.

3. The wide-angle optical system according to claim 1, wherein the reflection of the one light ray of the two light rays occurs at the inclined surface through which an other light ray is transmitted, and the reflection of the other light ray of the two light rays occurs at the inclined surface through which the one light ray is transmitted.

4. The wide-angle optical system according to claim 1, wherein the at least pair of front side lens units, the at least pair of rear side lens units, and the at least pair of planar inclined surfaces are disposed symmetrically with respect to a predetermined plane, and the predetermined plane is a plane which is orthogonal to the bottom surface, and which includes the line of intersection.

5. The wide-angle optical system according to claim 1, wherein the at least pair of front side lens units each include a negative meniscus lens of which a convex surface is directed toward the object side, the at least pair of rear side lens units each include at least one cemented lens having a positive refractive power, and the cemented lens includes the positive lens and a negative lens.

6. The wide-angle optical system according to claim 1, wherein the at least pair of rear side lens units each include the positive lens and one cemented lens having a positive refractive power.

7. The wide-angle optical system according to claim 1, wherein following conditional expression (1) is satisfied:

$$0.1 < D5/L < 0.35 \quad (1)$$

where,

D5 denotes a distance when a predetermined distance is subjected to air conversion, and L denotes an overall length of the wide-angle optical system, where the predetermined distance is a distance from a lens surface nearest to an image in the at least pair of front side lens units up to a lens surface nearest to an object in the at least pair of rear side lens units, and the overall length is a distance from an optical surface positioned nearest to the object up to the image plane.

8. The wide-angle optical system according to claim 1, wherein the image plane on which a pair of optical images is formed is a single plane.

9. The wide-angle optical system according to claim 1, wherein the at least pair of rear side lens units each include a lens which moves along the axis of rotational symmetry.

10. The wide-angle optical system according to claim 1, wherein the optical member comprises a pair of intermediate surfaces;

reflection of a first light ray of the two light rays occurs at a first intermediate surface of the pair of intermediate surfaces, reflection of a second light ray of the two light rays occurs at a second intermediate surface of the pair of intermediate surfaces, reflection of the first light ray occurs at the first intermediate surface, before the reflection of the first light ray occurs at the inclined surface through which the other light ray is transmitted, and reflection of the second light ray occurs at the second intermediate surface, before the reflection of the second light ray occurs at the inclined surface through which the first light ray is transmitted.

11. The wide-angle optical system according to claim 1, wherein following conditional expression (3) is satisfied:

$$0.5<HB/VB<2 \quad (3)$$

where,

HB denotes a length in a transverse direction of the bottom surface, and

VB denotes a length in a longitudinal direction of the bottom surface, where the transverse direction is a direction orthogonal to the axis of rotational symmetry of each of the at least pair of rear side lens units, and the longitudinal direction is a direction orthogonal to the transverse direction.

12. The wide-angle optical system according to claim 1, wherein following conditional expression (4) is satisfied:

$$1<HB/D<3 \quad (4)$$

where,

HB denotes a length in a transverse direction of the bottom surface, and

D denotes a distance between the axis of rotational symmetry of each of the at least pair of rear side lens units, where the transverse direction is a direction orthogonal to the two axes of rotational symmetry.

13. The wide-angle optical system according to claim 1, wherein the at least pair of front side lens units each include at least two negative meniscus lenses.

14. The wide-angle optical system according to claim 1, wherein a common lens unit which includes at least one cemented lens is disposed on an image side of the at least pair of rear side lens units, and an axis of rotational symmetry of the common lens unit is in a plane which includes the axis of rotational symmetry of each of the at least pair of rear side lens units and is located to be equidistant from the axes of rotational symmetry of each of the at least pair of rear side lens units.

15. The wide-angle optical system according to claim 1, wherein following conditional expression (5) is satisfied:

$$40^\circ<\alpha<70^\circ \quad (5)$$

where, $\alpha$ denotes an angle made by the pair of planar inclined surfaces.

16. The wide-angle optical system according to claim 1, wherein a shape of the optical member is a pyramid.

17. An image pickup apparatus comprising:

a wide-angle optical system according to claim 1; and an image sensor configured to acquire two images having a parallax from the wide-angle optical system.

18. An image pickup system comprising:

an image pickup apparatus according to claim 17;

a processor comprising hardware; and a display;

wherein the processor is configured to:

generate an image for stereoscopic vision from the two images; and display the image on a display.

19. The wide-angle optical system according to claim 1, wherein the optical member is disposed between the front side lens units and the rear side lens units.

20. The wide-angle optical system according to claim 1, wherein in the two optical paths, each of the two light rays is transmitted through a different front side lens unit of the at least pair of front side lens units, then transmitted through a different inclined surface of the at least pair of planar inclined surfaces, then transmitted through the bottom surface, then transmitted through a different rear side lens unit of the at least pair of rear side lens units, and reaches an image plane.

* * * * *